US012274365B2

(12) United States Patent
Brykalski et al.

(10) Patent No.: US 12,274,365 B2
(45) Date of Patent: Apr. 15, 2025

(54) CLIMATE CONTROLLED BED WITH FLUID DISTRIBUTION MEMBER

(71) Applicant: Sleep Number Corporation, Minneapolis, MN (US)

(72) Inventors: Michael J. Brykalski, South Lyon, MI (US); John Terech, Milan, MI (US); Dusko Petrovski, Northville, MI (US)

(73) Assignee: Sleep Number Corporation, Minneapolis, MN (US)

( * ) Notice: Subject to any disclaimer, the term of this patent is extended or adjusted under 35 U.S.C. 154(b) by 0 days.

(21) Appl. No.: 18/590,238

(22) Filed: Feb. 28, 2024

(65) Prior Publication Data

US 2024/0324786 A1 Oct. 3, 2024

Related U.S. Application Data

(63) Continuation of application No. 17/717,785, filed on Apr. 11, 2022, now Pat. No. 12,016,466, which is a continuation of application No. 16/296,731, filed on Mar. 8, 2019, now Pat. No. 11,297,953, which is a continuation of application No. 15/467,830, filed on Mar. 23, 2017, now Pat. No. 10,226,134, which is a (Continued)

(51) Int. Cl.
*A47C 21/04* (2006.01)
*A61G 7/05* (2006.01)

(52) U.S. Cl.
CPC ............ *A47C 21/04* (2013.01); *A47C 21/044* (2013.01); *A47C 21/048* (2013.01); *A61G 7/05* (2013.01); *A61G 2203/46* (2013.01)

(58) Field of Classification Search
CPC ....... A47C 21/00; A47C 21/04; A47C 21/044; A47C 21/048; A61G 7/00; A61G 7/05; A61G 2203/00; A61G 2203/46
See application file for complete search history.

(56) References Cited

U.S. PATENT DOCUMENTS 96,989 A 11/1869 Somes
771,461 A 10/1904 Clifford (Continued)

FOREIGN PATENT DOCUMENTS

CA 979490 12/1975
CN 101219025 7/2008

(Continued)

OTHER PUBLICATIONS

U.S. Appl. No. 18/590,238, filed Feb. 28, 2024, Brykalski et al.

(Continued)

*Primary Examiner* — Fredrick C Conley
(74) *Attorney, Agent, or Firm* — Fish & Richardson P.C.

(57) ABSTRACT

According to certain arrangements, a climate controlled bed includes an upper portion comprising a core with a top core surface and a bottom core surface. The core includes at least one passageway extending from the top core surface to the bottom core surface. The upper portion of the bed further includes at least one fluid distribution member positioned above the core, wherein the fluid distribution member is in fluid communication with at least one passageway of the core. The fluid distribution member is configured to at least partially distribute fluid within said fluid distribution member.

36 Claims, 49 Drawing Sheets

Related U.S. Application Data continuation of application No. 14/320,145, filed on Jun. 30, 2014, now Pat. No. 9,622,588, which is a continuation of application No. 13/861,852, filed on Apr. 12, 2013, now Pat. No. 8,782,830, which is a continuation of application No. 13/475,719, filed on May 18, 2012, now Pat. No. 8,418,286, which is a continuation of application No. 12/505,355, filed on Jul. 17, 2009, now Pat. No. 8,181,290.

(60) Provisional application No. 61/082,163, filed on Jul. 18, 2008.

(56) References Cited

U.S. PATENT DOCUMENTS

| | | | |
|---|---|---|---|
| 1,142,876 | A | 6/1915 | Davis et al. |
| 1,777,982 | A | 6/1929 | Popp |
| 1,839,156 | A | 12/1931 | Lumpkin |
| 2,362,259 | A | 11/1944 | Findley |
| 2,363,168 | A | 11/1944 | Findley |
| 2,461,432 | A | 2/1949 | Mitchell |
| 2,462,984 | A | 3/1949 | Maddison |
| 2,493,067 | A | 1/1950 | Goldsmith |
| 2,512,559 | A | 5/1950 | Williams |
| 2,519,241 | A | 8/1950 | Findley |
| 2,782,834 | A | 2/1957 | Vigo |
| 2,791,956 | A | 5/1957 | Guest |
| 2,807,809 | A | 10/1957 | Kottemann |
| 2,813,708 | A | 11/1957 | Frey |
| 2,884,956 | A | 5/1959 | Perlin |
| 2,931,286 | A | 4/1960 | Fry, Sr. et al. |
| 2,959,017 | A | 11/1960 | Gilman et al. |
| 2,976,700 | A | 3/1961 | Jackson |
| 2,984,077 | A | 5/1961 | Gaskill |
| 3,019,609 | A | 2/1962 | Pietsch |
| 3,030,145 | A | 4/1962 | Kottemann |
| 3,039,817 | A | 6/1962 | Taylor |
| 3,077,079 | A | 2/1963 | Pietsch |
| 3,085,405 | A | 4/1963 | Frantti |
| 3,090,206 | A | 5/1963 | Anders |
| 3,136,577 | A | 6/1964 | Richard |
| 3,137,142 | A | 6/1964 | Venema |
| 3,137,523 | A | 6/1964 | Karner |
| 3,138,934 | A | 6/1964 | Roane |
| 3,178,894 | A | 4/1965 | Mole et al. |
| 3,186,240 | A | 6/1965 | Daubert |
| 3,197,342 | A | 7/1965 | Neild |
| 3,209,380 | A | 10/1965 | Watsky |
| 3,212,275 | A | 10/1965 | Tillman |
| 3,240,628 | A | 3/1966 | Sonntag, Jr. |
| 3,253,649 | A | 5/1966 | Laing |
| 3,266,064 | A | 8/1966 | Figman |
| 3,298,195 | A | 1/1967 | Raskhodoff |
| 3,325,312 | A | 6/1967 | Sonntag, Jr. |
| 3,326,727 | A | 6/1967 | Fritts |
| 3,351,498 | A | 11/1967 | Shinn et al. |
| 3,392,535 | A | 7/1968 | De Castelet |
| 3,486,177 | A | 12/1969 | Marshack |
| 3,529,310 | A | 9/1970 | Olmo |
| 3,550,523 | A | 12/1970 | Segal |
| 3,599,437 | A | 8/1971 | Panas |
| 3,615,870 | A | 10/1971 | Crouthamel |
| 3,627,299 | A | 12/1971 | Schwartze et al. |
| 3,632,451 | A | 1/1972 | Abbott |
| 3,640,456 | A | 2/1972 | Sturgis |
| 3,644,950 | A | 2/1972 | Lindsay, Jr. |
| 3,648,469 | A | 3/1972 | Chapman |
| 3,653,083 | A | 4/1972 | Lapidus |
| 3,681,797 | A | 8/1972 | Messner |
| 3,703,141 | A | 11/1972 | Pernoud |
| 3,767,470 | A | 10/1973 | Hines |
| 3,778,851 | A | 12/1973 | Howorth |
| 3,786,230 | A | 1/1974 | Brandenburg, Jr. |
| 3,819,418 | A | 6/1974 | Winkler et al. |
| 3,839,876 | A | 10/1974 | Privas |
| 3,870,568 | A | 3/1975 | Oesterhelt et al. |
| 3,876,860 | A | 4/1975 | Nomura et al. |
| 3,899,054 | A | 8/1975 | Huntress et al. |
| 3,902,923 | A | 9/1975 | Evans et al. |
| 3,916,151 | A | 10/1975 | Reix |
| 3,926,052 | A | 12/1975 | Bechtel |
| 3,927,299 | A | 12/1975 | Sturgis |
| 3,928,876 | A | 12/1975 | Starr |
| 4,002,108 | A | 1/1977 | Drori |
| 4,044,824 | A | 8/1977 | Eskeli |
| 4,124,794 | A | 11/1978 | Eder |
| 4,195,687 | A | 4/1980 | Taziker |
| 4,223,205 | A | 9/1980 | Sturgis |
| 4,224,565 | A | 9/1980 | Sosniak et al. |
| 4,281,516 | A | 8/1981 | Berthet et al. |
| 4,315,599 | A | 2/1982 | Biancardi |
| 4,336,444 | A | 6/1982 | Bice et al. |
| 4,338,944 | A | 7/1982 | Arkans |
| 4,391,009 | A | 7/1983 | Schild et al. |
| 4,413,857 | A | 11/1983 | Hayashi |
| 4,423,308 | A | 12/1983 | Callaway et al. |
| 4,437,702 | A | 3/1984 | Agosta |
| 4,438,070 | A | 3/1984 | Stephens et al. |
| 4,459,428 | A | 7/1984 | Chou |
| 4,491,173 | A | 1/1985 | Demand |
| 4,493,939 | A | 1/1985 | Blaske et al. |
| 4,497,973 | A | 2/1985 | Heath et al. |
| 4,506,510 | A | 3/1985 | Tircot |
| 4,518,700 | A | 5/1985 | Stephens |
| 4,518,847 | A | 5/1985 | Horst, Sr. et al. |
| 4,549,134 | A | 10/1985 | Weiss |
| 4,554,968 | A | 11/1985 | Haas |
| 4,563,387 | A | 1/1986 | Takagi et al. |
| 4,567,351 | A | 1/1986 | Kitagawa et al. |
| 4,572,430 | A | 2/1986 | Takagi et al. |
| 4,665,707 | A | 5/1987 | Hamilton |
| 4,671,567 | A | 6/1987 | Frobose |
| 4,685,727 | A | 8/1987 | Cremer et al. |
| 4,704,320 | A | 11/1987 | Mizunoya et al. |
| 4,711,294 | A | 12/1987 | Jacobs et al. |
| 4,712,832 | A | 12/1987 | Antolini et al. |
| 4,777,802 | A | 10/1988 | Feher |
| 4,782,664 | A | 11/1988 | Sterna et al. |
| 4,791,274 | A | 12/1988 | Horst |
| 4,793,651 | A | 12/1988 | Inagaki et al. |
| 4,802,929 | A | 2/1989 | Schock |
| 4,812,733 | A | 3/1989 | Tobey |
| 4,823,554 | A | 4/1989 | Trachtenberg et al. |
| 4,825,488 | A | 5/1989 | Bedford |
| 4,828,627 | A | 5/1989 | Connery |
| 4,853,992 | A | 8/1989 | Yu |
| 4,859,250 | A | 8/1989 | Buist |
| 4,867,230 | A | 9/1989 | Voss |
| 4,901,383 | A | 2/1990 | Yang et al. |
| 4,905,475 | A | 3/1990 | Tuomi |
| 4,923,248 | A | 5/1990 | Feher |
| 4,947,648 | A | 8/1990 | Harwell et al. |
| 4,969,684 | A | 11/1990 | Zarotti |
| 4,981,324 | A | 1/1991 | Law |
| 4,984,316 | A | 1/1991 | Simpson et al. |
| 4,988,847 | A | 1/1991 | Argos et al. |
| 4,997,230 | A | 3/1991 | Spitalnick |
| 5,002,336 | A | 3/1991 | Feher |
| 5,012,325 | A | 4/1991 | Mansuria et al. |
| 5,014,909 | A | 5/1991 | Yasuo |
| 5,016,304 | A | 5/1991 | Ryhiner |
| 5,022,462 | A | 6/1991 | Flint et al. |
| 5,057,490 | A | 10/1991 | Skertic |
| 5,070,937 | A | 12/1991 | Mougin et al. |
| 5,077,709 | A | 12/1991 | Feher |
| 5,088,790 | A | 2/1992 | Wainwright et al. |
| 5,102,189 | A | 4/1992 | Saito et al. |
| 5,106,161 | A | 4/1992 | Meiller |
| 5,111,025 | A | 5/1992 | Barma et al. |
| 5,111,664 | A | 5/1992 | Yang |
| 5,117,638 | A | 6/1992 | Feher |
| 5,119,640 | A | 6/1992 | Conrad |
| 5,125,238 | A | 6/1992 | Ragan et al. |

(56) References Cited

U.S. PATENT DOCUMENTS

| | | | |
|---|---|---|---|
| 5,148,977 | A | 9/1992 | Hibino et al. |
| 5,166,777 | A | 11/1992 | Kataoka |
| 5,184,612 | A | 2/1993 | Augustine |
| 5,187,349 | A | 2/1993 | Curhan et al. |
| 5,188,286 | A | 2/1993 | Pence, IV |
| 5,255,735 | A | 10/1993 | Raghava et al. |
| 5,256,857 | A | 10/1993 | Curhan et al. |
| 5,265,599 | A | 11/1993 | Stephenson et al. |
| 5,278,936 | A | 1/1994 | Shao |
| 5,279,128 | A | 1/1994 | Tomatsu et al. |
| 5,305,483 | A | 4/1994 | Watkins |
| 5,335,381 | A | 8/1994 | Chang |
| 5,350,417 | A | 9/1994 | Augustine et al. |
| 5,367,728 | A | 11/1994 | Chang |
| 5,372,402 | A | 12/1994 | Kuo |
| 5,375,421 | A | 12/1994 | Hsieh |
| 5,382,075 | A | 1/1995 | Shih |
| 5,385,382 | A | 1/1995 | Single, II et al. |
| 5,409,547 | A | 4/1995 | Watanabe et al. |
| 5,413,166 | A | 5/1995 | Kerner et al. |
| 5,416,935 | A | 5/1995 | Nieh |
| 5,419,489 | A | 5/1995 | Burd |
| 5,419,780 | A | 5/1995 | Suski |
| 5,430,322 | A | 7/1995 | Koyanagi et al. |
| 5,433,741 | A | 7/1995 | Truglio |
| 5,448,788 | A | 9/1995 | Wu |
| 5,448,891 | A | 9/1995 | Nakagiri et al. |
| 5,456,081 | A | 10/1995 | Chrysler et al. |
| 5,473,783 | A | 12/1995 | Allen |
| 5,493,742 | A | 2/1996 | Klearman |
| 5,493,864 | A | 2/1996 | Pomerence et al. |
| 5,505,520 | A | 4/1996 | Frusti et al. |
| 5,515,238 | A | 5/1996 | Fritz et al. |
| 5,524,439 | A | 6/1996 | Gallup et al. |
| 5,542,503 | A | 8/1996 | Dunn et al. |
| 5,544,487 | A | 8/1996 | Attey et al. |
| 5,544,488 | A | 8/1996 | Reid |
| 5,546,618 | A | 8/1996 | Beedy et al. |
| 5,555,732 | A | 9/1996 | Whiticar |
| 5,557,813 | A | 9/1996 | Steed et al. |
| 5,561,981 | A | 10/1996 | Quisenberry et al. |
| 5,564,141 | A | 10/1996 | Anderson |
| 5,566,409 | A | 10/1996 | Klearman |
| 5,576,512 | A | 11/1996 | Doke |
| 5,584,084 | A | 12/1996 | Klearman et al. |
| 5,584,183 | A | 12/1996 | Wright et al. |
| 5,597,200 | A | 1/1997 | Gregory et al. |
| 5,601,399 | A | 2/1997 | Okpara et al. |
| 5,606,639 | A | 2/1997 | Lehoe et al. |
| 5,613,729 | A | 3/1997 | Summer, Jr. |
| 5,613,730 | A | 3/1997 | Buie et al. |
| 5,623,828 | A | 4/1997 | Harrington |
| 5,626,021 | A | 5/1997 | Karunasiri et al. |
| 5,626,386 | A | 5/1997 | Lush |
| 5,634,342 | A | 6/1997 | Peeters et al. |
| 5,637,921 | A | 6/1997 | Burward-Hoy |
| 5,640,728 | A | 6/1997 | Graebe |
| 5,642,539 | A | 7/1997 | Kuo |
| 5,645,314 | A | 7/1997 | Liou |
| 5,650,904 | A | 7/1997 | Gilley et al. |
| 5,653,741 | A | 8/1997 | Grant |
| 5,667,622 | A | 9/1997 | Hasegawa et al. |
| 5,675,852 | A | 10/1997 | Watkins |
| 5,690,849 | A | 11/1997 | DeVilbiss et al. |
| 5,692,952 | A | 12/1997 | Chih-Hung |
| 5,697,113 | A | 12/1997 | Shatz et al. |
| 5,704,213 | A | 1/1998 | Smith et al. |
| 5,713,137 | A | 2/1998 | Fujita |
| 5,715,695 | A | 2/1998 | Lord |
| 5,721,804 | A | 2/1998 | Greene, III |
| 5,724,818 | A | 3/1998 | Iwata et al. |
| 5,729,981 | A | 3/1998 | Markus et al. |
| 5,761,908 | A | 6/1998 | Oas et al. |
| 5,761,909 | A | 6/1998 | Hughes et al. |
| 5,794,289 | A | 8/1998 | Wortman et al. |
| 5,798,583 | A | 8/1998 | Morita |
| 5,802,855 | A | 9/1998 | Yamaguchi et al. |
| 5,802,856 | A | 9/1998 | Schaper et al. |
| 5,822,993 | A | 10/1998 | Attey |
| 5,827,424 | A | 10/1998 | Gillis et al. |
| 5,833,321 | A | 11/1998 | Kim et al. |
| 5,850,741 | A | 12/1998 | Feher |
| 5,865,031 | A | 2/1999 | Itakura |
| 5,871,151 | A | 2/1999 | Fiedrich |
| 5,884,485 | A | 3/1999 | Yamaguchi et al. |
| 5,884,486 | A | 3/1999 | Hughes et al. |
| 5,887,304 | A | 3/1999 | von der Heyde |
| 5,888,261 | A | 3/1999 | Fortune |
| 5,895,964 | A | 4/1999 | Nakayama |
| 5,902,014 | A | 5/1999 | Dinkel et al. |
| 5,921,100 | A | 7/1999 | Yoshinori et al. |
| 5,921,314 | A | 7/1999 | Schuller et al. |
| 5,921,858 | A | 7/1999 | Kawai et al. |
| 5,924,289 | A | 7/1999 | Bishop, II |
| 5,924,766 | A | 7/1999 | Esaki et al. |
| 5,924,767 | A | 7/1999 | Pietryga |
| 5,926,884 | A | 7/1999 | Biggie et al. |
| 5,927,817 | A | 7/1999 | Ekman et al. |
| 5,934,748 | A | 8/1999 | Faust et al. |
| 5,936,192 | A | 8/1999 | Tauchi |
| 5,937,908 | A | 8/1999 | Inoshiri et al. |
| 5,948,303 | A | 9/1999 | Larson |
| 5,950,067 | A | 9/1999 | Maegawa et al. |
| 5,952,728 | A | 9/1999 | Imanishi et al. |
| 5,960,496 | A | 10/1999 | Boyd |
| 5,963,997 | A | 10/1999 | Hagopian |
| 5,987,893 | A | 11/1999 | Schultz-Harder et al. |
| 5,988,568 | A | 11/1999 | Drews |
| 5,992,154 | A | 11/1999 | Kawada et al. |
| 5,994,637 | A | 11/1999 | Imanishi et al. |
| 5,995,711 | A | 11/1999 | Fukuoka et al. |
| 6,000,225 | A | 12/1999 | Ghoshal |
| 6,003,950 | A | 12/1999 | Larsson |
| 6,006,524 | A | 12/1999 | Park |
| 6,019,420 | A | 2/2000 | Faust et al. |
| 6,038,865 | A | 3/2000 | Watanabe et al. |
| 6,048,024 | A | 4/2000 | Walllman |
| 6,049,655 | A | 4/2000 | Vazirani |
| 6,052,853 | A | 4/2000 | Schmid |
| 6,053,163 | A | 4/2000 | Bass |
| 6,059,018 | A | 5/2000 | Yoshinori et al. |
| 6,062,641 | A | 5/2000 | Suzuki et al. |
| 6,072,924 | A | 6/2000 | Sato et al. |
| 6,072,938 | A | 6/2000 | Peterson et al. |
| 6,073,998 | A | 6/2000 | Siarkowski et al. |
| 6,079,485 | A | 6/2000 | Esaki et al. |
| 6,084,172 | A | 7/2000 | Kishi et al. |
| 6,085,369 | A | 7/2000 | Feher |
| 6,086,831 | A | 7/2000 | Harness et al. |
| 6,087,638 | A | 7/2000 | Silverbrook |
| 6,094,919 | A | 8/2000 | Bhatia |
| 6,097,088 | A | 8/2000 | Sakuragi |
| 6,100,463 | A | 8/2000 | Ladd et al. |
| 6,101,815 | A | 8/2000 | Van Oort et al. |
| 6,105,373 | A | 8/2000 | Watanabe et al. |
| 6,109,688 | A | 8/2000 | Wurz et al. |
| 6,112,525 | A | 9/2000 | Yoshida et al. |
| 6,112,531 | A | 9/2000 | Yamaguchi |
| 6,116,029 | A | 9/2000 | Krawec |
| 6,119,463 | A | 9/2000 | Bell |
| 6,120,370 | A | 9/2000 | Asou et al. |
| 6,127,619 | A | 10/2000 | Xi et al. |
| 6,141,969 | A | 11/2000 | Launchbury et al. |
| 6,145,925 | A | 11/2000 | Eksin et al. |
| 6,148,457 | A | 11/2000 | Sul |
| 6,158,224 | A | 12/2000 | Hu et al. |
| 6,161,241 | A | 12/2000 | Zysman |
| 6,161,388 | A | 12/2000 | Ghoshal |
| 6,164,076 | A | 12/2000 | Chu et al. |
| 6,164,719 | A | 12/2000 | Rauh |
| 6,171,333 | B1 | 1/2001 | Nelson et al. |
| 6,178,292 | B1 | 1/2001 | Fukuoka et al. |
| 6,179,706 | B1 | 1/2001 | Yoshinori et al. |
| 6,186,592 | B1 | 2/2001 | Orizakis et al. |

(56) References Cited

U.S. PATENT DOCUMENTS

| | | | |
|---|---|---|---|
| 6,189,966 | B1 | 2/2001 | Faust et al. |
| 6,189,967 | B1 | 2/2001 | Short |
| 6,196,627 | B1 | 3/2001 | Faust et al. |
| 6,196,839 | B1 | 3/2001 | Ross |
| 6,206,465 | B1 | 3/2001 | Faust et al. |
| 6,213,198 | B1 | 4/2001 | Shikata et al. |
| 6,222,243 | B1 | 4/2001 | Kishi et al. |
| 6,223,539 | B1 | 5/2001 | Bell |
| 6,233,768 | B1 | 5/2001 | Harding |
| 6,233,959 | B1 | 5/2001 | Kang et al. |
| 6,243,894 | B1 | 6/2001 | Kosumsuppamala et al. |
| 6,250,083 | B1 | 6/2001 | Chou |
| 6,256,821 | B1 | 7/2001 | Boyd |
| 6,256,996 | B1 | 7/2001 | Ghoshal |
| 6,262,357 | B1 | 7/2001 | Johnson et al. |
| 6,263,530 | B1 | 7/2001 | Feher |
| 6,266,962 | B1 | 7/2001 | Ghoshal |
| 6,282,907 | B1 | 9/2001 | Ghoshal |
| 6,289,982 | B1 | 9/2001 | Naji |
| 6,291,803 | B1 | 9/2001 | Fourrey |
| 6,306,673 | B1 | 10/2001 | Imanishi et al. |
| 6,326,610 | B1 | 12/2001 | Muramatsu et al. |
| 6,336,237 | B1 | 1/2002 | Schmid |
| 6,338,251 | B1 | 1/2002 | Ghoshal |
| 6,341,395 | B1 | 1/2002 | Chao |
| 6,347,521 | B1 | 2/2002 | Kadotani et al. |
| 6,378,311 | B1 | 4/2002 | McCordic |
| 6,385,976 | B1 | 5/2002 | Yamamura et al. |
| 6,391,676 | B1 | 5/2002 | Tsuzaki et al. |
| 6,393,842 | B2 | 5/2002 | Kim et al. |
| 6,400,013 | B1 | 6/2002 | Tsuzaki et al. |
| 6,402,470 | B1 | 6/2002 | Kvasnak et al. |
| 6,410,971 | B1 | 6/2002 | Otey |
| 6,425,527 | B1 | 7/2002 | Smole |
| 6,427,449 | B1 | 8/2002 | Logan et al. |
| 6,430,763 | B2 | 8/2002 | Kosumsuppamala et al. |
| 6,434,328 | B2 | 8/2002 | Rutherford |
| 6,438,775 | B1 | 8/2002 | Koenig |
| 6,452,740 | B1 | 9/2002 | Ghoshal |
| 6,470,696 | B1 | 10/2002 | Palfy et al. |
| 6,474,073 | B1 | 11/2002 | Uetsuji et al. |
| 6,481,801 | B1 | 11/2002 | Schmale |
| 6,487,739 | B1 | 12/2002 | Harker |
| 6,489,551 | B2 | 12/2002 | Chu et al. |
| 6,490,879 | B1 | 12/2002 | Lloyd et al. |
| 6,492,585 | B1 | 12/2002 | Zamboni et al. |
| 6,493,888 | B1 | 12/2002 | Salvatini et al. |
| 6,493,889 | B2 | 12/2002 | Kocurek |
| 6,497,720 | B1 | 12/2002 | Augustine et al. |
| 6,509,704 | B1 | 1/2003 | Brown |
| 6,511,125 | B1 | 1/2003 | Gendron |
| 6,511,501 | B1 | 1/2003 | Augustine et al. |
| 6,539,725 | B2 | 4/2003 | Bell |
| 6,541,737 | B1 | 4/2003 | Eksin et al. |
| 6,541,743 | B2 | 4/2003 | Chen |
| 6,546,576 | B1 | 4/2003 | Lin |
| 6,548,894 | B2 | 4/2003 | Chu et al. |
| 6,552,256 | B2 | 4/2003 | Shakouri et al. |
| RE38,128 | E | 6/2003 | Gallup et al. |
| 6,571,564 | B2 | 6/2003 | Upadhye et al. |
| 6,573,596 | B2 | 6/2003 | Saika |
| 6,574,967 | B1 | 6/2003 | Park et al. |
| 6,580,025 | B2 | 6/2003 | Guy |
| 6,581,224 | B2 | 6/2003 | Yoon |
| 6,581,225 | B1 | 6/2003 | Imai |
| 6,583,638 | B2 | 6/2003 | Costello et al. |
| 6,596,018 | B2 | 7/2003 | Endo et al. |
| 6,598,251 | B2 | 7/2003 | Habboub et al. |
| 6,598,405 | B2 | 7/2003 | Bell |
| 6,604,576 | B2 | 8/2003 | Noda et al. |
| 6,604,785 | B2 | 8/2003 | Bargheer et al. |
| 6,605,955 | B1 | 8/2003 | Costello et al. |
| 6,606,754 | B1 | 8/2003 | Flick |
| 6,606,866 | B2 | 8/2003 | Bell |
| 6,619,044 | B2 | 9/2003 | Batchelor et al. |
| 6,619,736 | B2 | 9/2003 | Stowe et al. |
| 6,625,990 | B2 | 9/2003 | Bell |
| 6,626,488 | B2 | 9/2003 | Pfahler |
| 6,629,724 | B2 | 10/2003 | Ekern et al. |
| 6,637,210 | B2 | 10/2003 | Bell |
| 6,644,735 | B2 | 11/2003 | Bargheer et al. |
| 6,672,076 | B2 | 1/2004 | Bell |
| 6,676,207 | B2 | 1/2004 | Rauh et al. |
| 6,684,437 | B2 | 2/2004 | Koenig |
| 6,686,532 | B1 | 2/2004 | Macris |
| 6,687,937 | B2 | 2/2004 | Harker |
| 6,695,402 | B2 | 2/2004 | Sloan, Jr. |
| 6,700,052 | B2 | 3/2004 | Bell |
| 6,705,089 | B2 | 3/2004 | Chu et al. |
| 6,708,352 | B2 | 3/2004 | Salvatini et al. |
| 6,711,767 | B2 | 3/2004 | Klamm |
| 6,711,904 | B1 | 3/2004 | Law et al. |
| 6,719,039 | B2 | 4/2004 | Calaman et al. |
| 6,725,669 | B2 | 4/2004 | Melaragni |
| 6,727,422 | B2 | 4/2004 | Macris |
| 6,730,115 | B1 | 5/2004 | Heaton |
| 6,739,138 | B2 | 5/2004 | Saunders et al. |
| 6,739,655 | B1 | 5/2004 | Schwochert et al. |
| 6,743,972 | B2 | 6/2004 | Macris |
| 6,761,399 | B2 | 7/2004 | Bargheer et al. |
| 6,764,502 | B2 | 7/2004 | Bieberich |
| 6,767,766 | B2 | 7/2004 | Chu et al. |
| 6,772,825 | B2 | 8/2004 | Lachenbuch et al. |
| 6,772,829 | B2 | 8/2004 | Lebrun |
| 6,774,346 | B2 | 8/2004 | Clothier |
| 6,779,592 | B1 | 8/2004 | Ichigaya |
| 6,782,574 | B2 | 8/2004 | Tatton et al. |
| 6,786,541 | B2 | 9/2004 | Haupt et al. |
| 6,786,545 | B2 | 9/2004 | Bargheer et al. |
| 6,790,481 | B2 | 9/2004 | Bishop et al. |
| 6,804,966 | B1 | 10/2004 | Chu et al. |
| 6,808,230 | B2 | 10/2004 | Buss et al. |
| 6,812,395 | B2 | 11/2004 | Bell |
| 6,815,814 | B2 | 11/2004 | Chu et al. |
| 6,817,191 | B2 | 11/2004 | Watanabe |
| 6,817,197 | B1 | 11/2004 | Padfield |
| 6,817,675 | B2 | 11/2004 | Buss et al. |
| 6,818,817 | B2 | 11/2004 | Macris |
| 6,823,678 | B1 | 11/2004 | Li |
| 6,828,528 | B2 | 12/2004 | Stowe et al. |
| 6,834,509 | B2 | 12/2004 | Palfy et al. |
| 6,840,305 | B2 | 1/2005 | Zheng et al. |
| 6,840,576 | B2 | 1/2005 | Ekern et al. |
| 6,841,957 | B2 | 1/2005 | Brown |
| 6,845,622 | B2 | 1/2005 | Sauciuc et al. |
| 6,855,158 | B2 | 2/2005 | Stolpmann |
| 6,855,880 | B2 | 2/2005 | Feher |
| 6,857,697 | B2 | 2/2005 | Brennan et al. |
| 6,857,954 | B2 | 2/2005 | Luedtke |
| 6,868,690 | B2 | 3/2005 | Faqih |
| 6,871,365 | B2 | 3/2005 | Flick et al. |
| 6,886,351 | B2 | 5/2005 | Palfy et al. |
| 6,892,807 | B2 | 5/2005 | Fristedt et al. |
| 6,893,086 | B2 | 5/2005 | Bajic et al. |
| 6,904,629 | B2 | 6/2005 | Wu |
| 6,907,633 | B2 | 6/2005 | Paolini et al. |
| 6,907,739 | B2 | 6/2005 | Bell |
| 6,923,216 | B2 | 8/2005 | Extrand et al. |
| 6,935,122 | B2 | 8/2005 | Huang |
| 6,954,944 | B2 | 10/2005 | Feher |
| 6,959,555 | B2 | 11/2005 | Bell |
| 6,962,195 | B2 | 11/2005 | Smith et al. |
| 6,963,053 | B2 | 11/2005 | Lutz |
| 6,967,309 | B2 | 11/2005 | Wyatt et al. |
| 6,976,734 | B2 | 12/2005 | Stoewe |
| 6,977,360 | B2 | 12/2005 | Weiss |
| 6,981,380 | B2 | 1/2006 | Chrysler et al. |
| 6,990,701 | B1 | 1/2006 | Litvak |
| 7,000,490 | B1 | 2/2006 | Micheels |
| 7,036,163 | B2 | 5/2006 | Schmid |
| 7,036,575 | B1 | 5/2006 | Rodney et al. |
| 7,040,710 | B2 | 5/2006 | White et al. |
| 7,052,091 | B2 | 5/2006 | Bajic et al. |
| 7,063,163 | B2 | 6/2006 | Steele et al. |

(56) References Cited

U.S. PATENT DOCUMENTS 7,066,306 B2 6/2006 Gavin
7,070,231 B1 7/2006 Wong
7,070,232 B2 7/2006 Minegishi et al.
7,075,034 B2 7/2006 Bargheer et al.
7,082,772 B2 8/2006 Welch
7,084,502 B2 8/2006 Bettner et al.
7,100,978 B2 9/2006 Ekern et al.
7,108,319 B2 9/2006 Hartwich et al.
7,111,465 B2 9/2006 Bell
7,114,771 B2 10/2006 Lofy et al.
7,124,593 B2 10/2006 Feher
7,131,689 B2 11/2006 Brennan et al.
7,134,715 B1 11/2006 Fristedt et al.
7,141,763 B2 11/2006 Moroz
7,147,279 B2 12/2006 Bevan et al.
7,165,281 B2 1/2007 Larssson et al.
7,165,282 B2 1/2007 Watson
7,168,758 B2 1/2007 Bevan et al.
7,178,344 B2 2/2007 Bell
7,181,786 B2 2/2007 Schoettle
7,181,787 B2 2/2007 Wu
7,201,441 B2 4/2007 Stoewe et al.
7,213,876 B2 5/2007 Stoewe
7,220,048 B2 5/2007 Kohlgruber et al.
7,224,059 B2 5/2007 Shimada et al.
7,231,772 B2 6/2007 Bell
7,240,386 B1 7/2007 McKay et al.
7,244,887 B2 7/2007 Miley
7,246,496 B2 7/2007 Goenka et al.
7,272,936 B2 9/2007 Feher
7,273,981 B2 9/2007 Bell
7,296,315 B2 11/2007 Tatton et al.
7,299,639 B2 11/2007 Leija et al.
7,337,615 B2 3/2008 Reidy
7,338,117 B2 3/2008 Iqbal et al.
7,340,907 B2 3/2008 Vogh et al.
7,355,146 B2 4/2008 Angelis et al.
7,356,912 B2 4/2008 Iqbal
7,360,365 B2 4/2008 Codecasa et al.
7,360,416 B2 4/2008 Manaka et al.
7,370,479 B2 5/2008 Pfannenberg
7,370,911 B2 5/2008 Bajic et al.
7,380,586 B2 6/2008 Gawthrop
7,425,034 B2 9/2008 Bajie et al.
7,426,835 B2 9/2008 Bell et al.
7,462,028 B2 12/2008 Cherala et al.
7,467,435 B1 12/2008 McKay et al.
7,469,432 B2 12/2008 Chambers
7,475,464 B2 1/2009 Lofy et al.
7,475,938 B2 1/2009 Stoewe et al.
7,478,869 B2 1/2009 Lazanja et al.
7,480,950 B2 1/2009 Feher
7,506,924 B2 3/2009 Bargheer et al.
7,506,938 B2 3/2009 Brennan et al.
7,513,273 B2 4/2009 Bivin
7,555,792 B2 7/2009 Heaton et al.
7,581,785 B2 9/2009 Heckmann et al.
7,587,901 B2 9/2009 Petrovski
7,587,902 B2 9/2009 Bell
7,591,507 B2 9/2009 Giffin et al.
7,608,777 B2 10/2009 Bell et al.
7,621,594 B2 11/2009 Hartmann et al.
7,640,754 B2 1/2010 Wolas
7,650,658 B1 1/2010 McKay et al.
7,665,803 B2 2/2010 Wolas
7,708,338 B2 5/2010 Wolas
7,712,164 B2 5/2010 Chambers
RE41,765 E 9/2010 Gregory et al.
7,827,620 B2 11/2010 Feher
7,827,805 B2 11/2010 Comiskey et al.
7,862,113 B2 1/2011 Knoll
7,866,017 B2 1/2011 Knoll
7,877,827 B2 2/2011 Marquette et al.
7,892,271 B2 2/2011 Schock et al.
7,908,687 B2 3/2011 Ward et al.
7,913,332 B1 3/2011 Barnhart
7,914,611 B2 3/2011 Vrzalik et al.
7,918,103 B1 4/2011 Purvis
7,937,789 B2 5/2011 Feher
7,950,084 B1 5/2011 McKay et al.
7,963,594 B2 6/2011 Wolas
7,966,835 B2 6/2011 Petrovski
7,969,738 B2 6/2011 Koo
7,975,331 B2 7/2011 Flocard et al.
7,996,936 B2 8/2011 Marquette et al.
8,065,763 B2 11/2011 Brykalski et al.
8,104,295 B2 1/2012 Lofy
8,118,920 B2 2/2012 Vrzalik et al.
8,143,554 B2 3/2012 Lofy
8,181,290 B2 5/2012 Brykalski et al.
8,191,187 B2 6/2012 Brykalski et al.
8,222,511 B2 7/2012 Lofy
8,256,236 B2 9/2012 Lofy
8,332,975 B2 12/2012 Brykalski et al.
8,353,069 B1 1/2013 Miller
8,359,684 B2 1/2013 Toon
8,359,871 B2 1/2013 Woods et al.
8,372,182 B2 2/2013 Wrzalik et al.
8,402,579 B2 3/2013 Marquette et al.
8,418,286 B2 4/2013 Brykalski et al.
8,434,314 B2 5/2013 Comiskey et al.
8,438,863 B2 5/2013 Lofy
RE44,272 E 6/2013 Bell
8,505,320 B2 8/2013 Lofy
8,516,842 B2 8/2013 Petrovski
8,539,624 B2 9/2013 Terech et al.
8,575,518 B2 11/2013 Walsh
8,621,687 B2 1/2014 Brykalski et al.
8,732,874 B2 5/2014 Brykalski et al.
8,739,339 B1 6/2014 McKay et al.
8,782,830 B2 7/2014 Brykalski et al.
8,893,329 B2 11/2014 Petrovski et al.
8,955,337 B2 2/2015 Parish et al.
9,105,808 B2 8/2015 Petrovksi
9,105,809 B2 8/2015 Lofy
9,121,414 B2 9/2015 Lofy et al.
9,125,497 B2 9/2015 Brykalski et al.
9,131,780 B2 9/2015 Lachenbruch et al.
9,131,781 B2 9/2015 Zaiss et al.
9,138,064 B2 9/2015 Tursi, Jr. et al.
9,186,479 B1 11/2015 Franceschetti et al.
9,198,796 B2 12/2015 Pierre et al.
9,222,685 B2 12/2015 Lachenbruch
9,247,831 B2 2/2016 Miles et al.
9,254,231 B2 2/2016 Vrzalik et al.
9,310,112 B2 4/2016 Bell et al.
9,326,616 B2 5/2016 DeFranks et al.
9,335,073 B2 5/2016 Lofy
9,392,875 B2 7/2016 Wyl
9,445,524 B2 9/2016 Lofy et al.
9,451,723 B2 9/2016 Lofy et al.
9,474,384 B2 10/2016 Rawls-Meehan et al.
9,510,687 B2 12/2016 Lachenbruch
9,572,433 B2 2/2017 Lachenbruch et al.
9,596,945 B2 3/2017 Ghanei et al.
9,603,459 B2 3/2017 Brykalski et al.
9,622,588 B2 4/2017 Brykalski et al.
9,651,279 B2 5/2017 Lofy
9,662,962 B2 5/2017 Steinman et al.
9,685,599 B2 6/2017 Petrovski et al.
9,694,156 B2 7/2017 Franceschetti et al.
9,756,952 B2 9/2017 Alletto, Jr. et al.
9,756,953 B2 9/2017 DeFranks et al.
9,797,632 B2 10/2017 Parish et al.
9,814,641 B2 11/2017 Brykalski et al.
9,820,581 B2 11/2017 Alletto et al.
9,835,344 B2 12/2017 Vrzalik et al.
9,844,277 B2 12/2017 Parish et al.
9,854,921 B2 1/2018 DeFranks et al.
9,888,782 B1 2/2018 Jannke
9,907,407 B2 3/2018 Aramli
9,913,770 B2 3/2018 Lachenbruch et al.
9,943,172 B2 4/2018 Lachenbruch et al.
9,974,394 B2 5/2018 Brykalski et al.

(56) References Cited

U.S. PATENT DOCUMENTS

| | | | |
|---|---|---|---|
| 9,981,107 | B2 | 5/2018 | Franceschetti et al. |
| 9,989,267 | B2 | 6/2018 | Brykalski et al. |
| 10,005,337 | B2 | 6/2018 | Petrovski |
| 10,045,630 | B2 | 8/2018 | Parish et al. |
| 10,047,981 | B2 | 8/2018 | Parish et al. |
| 10,051,973 | B2 | 8/2018 | Morgan et al. |
| 10,104,982 | B2 | 10/2018 | Alletto et al. |
| 10,161,642 | B2 | 12/2018 | Giraud et al. |
| 10,194,752 | B2 | 2/2019 | Zaiss et al. |
| 10,226,134 | B2 | 3/2019 | Brykalski et al. |
| 10,405,667 | B2 | 9/2019 | Comiskey et al. |
| 10,675,198 | B2 | 6/2020 | Brykalski et al. |
| 10,772,438 | B2 | 9/2020 | Griffith et al. |
| 11,020,298 | B2 | 6/2021 | Brykalski et al. |
| 11,045,371 | B2 | 6/2021 | Brykalski et al. |
| 11,083,308 | B2 | 8/2021 | Zaiss et al. |
| 2001/0005990 | A1 | 7/2001 | Kim et al. |
| 2001/0014212 | A1 | 8/2001 | Rutherford |
| 2001/0028185 | A1 | 10/2001 | Stowe et al. |
| 2002/0017102 | A1 | 2/2002 | Bell |
| 2002/0062854 | A1 | 5/2002 | Sharp |
| 2002/0083528 | A1 | 7/2002 | Fisher et al. |
| 2002/0092308 | A1 | 7/2002 | Bell |
| 2002/0100121 | A1 | 8/2002 | Kocurek |
| 2002/0108380 | A1 | 8/2002 | Nelsen et al. |
| 2002/0121094 | A1 | 9/2002 | VanHoudt |
| 2003/0019044 | A1 | 1/2003 | Larsson et al. |
| 2003/0039298 | A1 | 2/2003 | Eriksson et al. |
| 2003/0041892 | A1 | 3/2003 | Fleurial et al. |
| 2003/0070235 | A1 | 4/2003 | Suzuki et al. |
| 2003/0084511 | A1 | 5/2003 | Salvatini et al. |
| 2003/0110779 | A1 | 6/2003 | Otey et al. |
| 2003/0133492 | A1 | 7/2003 | Watanabe |
| 2003/0145380 | A1 | 8/2003 | Schmid |
| 2003/0150060 | A1 | 8/2003 | Huang |
| 2003/0160479 | A1 | 8/2003 | Minuth et al. |
| 2003/0188382 | A1 | 10/2003 | Klamm et al. |
| 2003/0214160 | A1 | 11/2003 | Brennan et al. |
| 2003/0234247 | A1 | 12/2003 | Stern |
| 2004/0090093 | A1 | 5/2004 | Kamiya et al. |
| 2004/0098991 | A1 | 5/2004 | Heyes |
| 2004/0113549 | A1 | 6/2004 | Roberts et al. |
| 2004/0139758 | A1 | 7/2004 | Kamiya et al. |
| 2004/0164594 | A1 | 8/2004 | Stoewe et al. |
| 2004/0177622 | A1 | 9/2004 | Harvie |
| 2004/0177876 | A1 | 9/2004 | Hightower |
| 2004/0177877 | A1 | 9/2004 | Hightower |
| 2004/0195870 | A1 | 10/2004 | Bohlender |
| 2004/0238022 | A1 | 12/2004 | Hiller et al. |
| 2004/0255364 | A1 | 12/2004 | Feher |
| 2005/0011009 | A1 | 1/2005 | Wu |
| 2005/0012204 | A1 | 1/2005 | Strnad |
| 2005/0056310 | A1 | 3/2005 | Shikata et al. |
| 2005/0067862 | A1 | 3/2005 | Iqbal et al. |
| 2005/0072165 | A1 | 4/2005 | Bell |
| 2005/0076944 | A1 | 4/2005 | Kanatzidis et al. |
| 2005/0078451 | A1 | 4/2005 | Sauciuc et al. |
| 2005/0086739 | A1 | 4/2005 | Wu |
| 2005/0121065 | A1 | 6/2005 | Otey |
| 2005/0126184 | A1 | 6/2005 | Cauchy |
| 2005/0145285 | A1 | 7/2005 | Extrand |
| 2005/0161072 | A1 | 7/2005 | Esser et al. |
| 2005/0173950 | A1 | 8/2005 | Bajic et al. |
| 2005/0200166 | A1 | 9/2005 | Noh |
| 2005/0220167 | A1 | 10/2005 | Kanai et al. |
| 2005/0251120 | A1 | 11/2005 | Anderson et al. |
| 2005/0257532 | A1 | 11/2005 | Ikeda et al. |
| 2005/0268956 | A1 | 12/2005 | Take |
| 2005/0278863 | A1 | 12/2005 | Bahash et al. |
| 2005/0285438 | A1 | 12/2005 | Ishima et al. |
| 2005/0288749 | A1 | 12/2005 | Lachenbruch |
| 2006/0005548 | A1 | 1/2006 | Ruckstuhl |
| 2006/0005944 | A1 | 1/2006 | Wang et al. |
| 2006/0053529 | A1 | 3/2006 | Feher |
| 2006/0053558 | A1 | 3/2006 | Ye |
| 2006/0078319 | A1 | 4/2006 | Maran |
| 2006/0080778 | A1 | 4/2006 | Chambers |
| 2006/0087160 | A1 | 4/2006 | Dong et al. |
| 2006/0102224 | A1 | 5/2006 | Chen et al. |
| 2006/0118158 | A1 | 6/2006 | Zhang et al. |
| 2006/0123799 | A1 | 6/2006 | Tateyama et al. |
| 2006/0130490 | A1 | 6/2006 | Petrovski |
| 2006/0137099 | A1 | 6/2006 | Feher |
| 2006/0137358 | A1 | 6/2006 | Feher |
| 2006/0157102 | A1 | 7/2006 | Nakajima et al. |
| 2006/0158011 | A1 | 7/2006 | Marlovits et al. |
| 2006/0162074 | A1 | 7/2006 | Bader |
| 2006/0175877 | A1 | 8/2006 | Alionte et al. |
| 2006/0197363 | A1 | 9/2006 | Lofy et al. |
| 2006/0200398 | A1 | 9/2006 | Botton et al. |
| 2006/0201161 | A1 | 9/2006 | Hirai et al. |
| 2006/0201162 | A1 | 9/2006 | Hsieh |
| 2006/0214480 | A1 | 9/2006 | Terech |
| 2006/0219699 | A1 | 10/2006 | Geisel et al. |
| 2006/0225441 | A1 | 10/2006 | Goenka et al. |
| 2006/0225773 | A1 | 10/2006 | Venkatasubramanian et al. |
| 2006/0237166 | A1 | 10/2006 | Otey et al. |
| 2006/0243317 | A1 | 11/2006 | Venkatasubramanian |
| 2006/0244289 | A1 | 11/2006 | Bedro |
| 2006/0273646 | A1 | 12/2006 | Comiskey et al. |
| 2007/0017666 | A1 | 1/2007 | Goenka et al. |
| 2007/0035162 | A1 | 2/2007 | Bier et al. |
| 2007/0040421 | A1 | 2/2007 | Zuzga et al. |
| 2007/0069554 | A1 | 3/2007 | Comiskey et al. |
| 2007/0086757 | A1 | 4/2007 | Feher |
| 2007/0095378 | A1 | 5/2007 | Ito et al. |
| 2007/0095383 | A1 | 5/2007 | Tajima |
| 2007/0101602 | A1 | 5/2007 | Bae et al. |
| 2007/0107450 | A1 | 5/2007 | Sasao et al. |
| 2007/0138844 | A1 | 6/2007 | Kim |
| 2007/0145808 | A1 | 6/2007 | Minuth et al. |
| 2007/0157630 | A1 | 7/2007 | Kadle et al. |
| 2007/0158981 | A1 | 7/2007 | Almasi et al. |
| 2007/0163269 | A1 | 7/2007 | Chung et al. |
| 2007/0190712 | A1 | 8/2007 | Lin et al. |
| 2007/0193279 | A1 | 8/2007 | Yoneno et al. |
| 2007/0200398 | A1 | 8/2007 | Wolas et al. |
| 2007/0204629 | A1 | 9/2007 | Lofy |
| 2007/0214956 | A1 | 9/2007 | Carlson et al. |
| 2007/0227158 | A1 | 10/2007 | Kuchimachi |
| 2007/0234742 | A1 | 10/2007 | Aoki et al. |
| 2007/0241592 | A1 | 10/2007 | Giffin et al. |
| 2007/0251016 | A1 | 11/2007 | Feher |
| 2007/0256722 | A1 | 11/2007 | Kondoh |
| 2007/0261412 | A1 | 11/2007 | Heine |
| 2007/0261413 | A1 | 11/2007 | Hatamian et al. |
| 2007/0261548 | A1 | 11/2007 | Vrzalik et al. |
| 2007/0262621 | A1 | 11/2007 | Dong et al. |
| 2007/0277313 | A1 | 12/2007 | Terech |
| 2007/0296251 | A1 | 12/2007 | Krobok et al. |
| 2008/0000025 | A1 | 1/2008 | Feher |
| 2008/0022694 | A1 | 1/2008 | Anderson et al. |
| 2008/0023056 | A1 | 1/2008 | Kambe et al. |
| 2008/0028536 | A1 | 2/2008 | Hadden-Cook |
| 2008/0028768 | A1 | 2/2008 | Goenka |
| 2008/0028769 | A1 | 2/2008 | Goenka |
| 2008/0047598 | A1 | 2/2008 | Lofy |
| 2008/0053108 | A1 | 3/2008 | Wen |
| 2008/0053509 | A1 | 3/2008 | Flitsch et al. |
| 2008/0008409 | A1 | 4/2008 | Wolas |
| 2008/0078186 | A1 | 4/2008 | Cao |
| 2008/0084095 | A1 | 4/2008 | Wolas |
| 2008/0087316 | A1 | 4/2008 | Inaba et al. |
| 2008/0100101 | A1 | 5/2008 | Wolas |
| 2008/0143152 | A1 | 6/2008 | Wolas |
| 2008/0148481 | A1* | 6/2008 | Brykalski ............ A47C 21/048 5/423 |
| 2008/0154518 | A1 | 6/2008 | Manaka et al. |
| 2008/0155990 | A1 | 7/2008 | Gupta et al. |
| 2008/0163916 | A1 | 7/2008 | Tsuneoka et al. |
| 2008/0164733 | A1 | 7/2008 | Giffin et al. |
| 2008/0166224 | A1 | 7/2008 | Giffin et al. |
| 2008/0173022 | A1 | 7/2008 | Petrovski |
| 2008/0223841 | A1 | 9/2008 | Lofy |

(56) References Cited

U.S. PATENT DOCUMENTS

2008/0245092 A1 10/2008 Forsberg et al.
2008/0263776 A1 10/2008 O'Reagan et al.
2008/0289677 A1 11/2008 Bell et al.
2008/0307796 A1 12/2008 Bell et al.
2009/0000031 A1 1/2009 Feher
2009/0000310 A1 1/2009 Bell et al.
2009/0015042 A1 1/2009 Bargheer et al.
2009/0025770 A1 1/2009 Lofy
2009/0026813 A1 1/2009 Lofy
2009/0033130 A1 2/2009 Marquette et al.
2009/0064411 A1 3/2009 Marquette
2009/0106907 A1 4/2009 Chambers
2009/0126109 A1 5/2009 Lee
2009/0126110 A1 5/2009 Feher
2009/0178700 A1 7/2009 Heremans et al.
2009/0193814 A1 8/2009 Lofy
2009/0211619 A1 8/2009 Sharp et al.
2009/0218855 A1 9/2009 Wolas
2009/0235969 A1 9/2009 Heremans et al.
2009/0269584 A1 10/2009 Bell et al.
2009/0293488 A1 12/2009 Coughlan, III et al.
2010/0001558 A1 1/2010 Petrovski
2010/0011502 A1* 1/2010 Brykalski ............ A47C 21/044 5/423
2010/0132379 A1 6/2010 Wu
2010/0132380 A1 6/2010 Robinson, II
2010/0133883 A1 6/2010 Walker
2010/0146700 A1 6/2010 Wolas
2010/0154437 A1 6/2010 Nepsha
2010/0154911 A1 6/2010 Yoskowitz
2010/0193498 A1 8/2010 Walsh
2010/0198322 A1 8/2010 Joseph
2010/0235991 A1 9/2010 Ward et al.
2010/0307168 A1 12/2010 Kohl et al.
2010/0325796 A1 12/2010 Lachenbruch et al.
2011/0010850 A1 1/2011 Frias
2011/0041246 A1 2/2011 Li et al.
2011/0048033 A1 3/2011 Comiskey et al.
2011/0066217 A1 3/2011 Diller et al.
2011/0101741 A1 5/2011 Kolich
2011/0107514 A1 5/2011 Brykalski et al.
2011/0115635 A1 5/2011 Petrovski et al.
2011/0247143 A1 10/2011 Richards et al.
2011/0253340 A1 10/2011 Petrovski
2011/0258778 A1 10/2011 Brykalski et al.
2011/0271994 A1 11/2011 Gilley
2011/0289684 A1 12/2011 Parish et al.
2011/0296611 A1 12/2011 Marquette et al.
2011/0314837 A1 12/2011 Parish et al.
2012/0003510 A1 1/2012 Hour
2012/0017371 A1 1/2012 Pollard
2012/0080911 A1 4/2012 Brykalski et al.
2012/0104000 A1 5/2012 Lofy
2012/0114512 A1 5/2012 Lofy et al.
2012/0131748 A1 5/2012 Brykalski et al.
2012/0261399 A1 10/2012 Lofy
2012/0289761 A1 11/2012 Boyden et al.
2012/0319439 A1 12/2012 Lofy
2013/0086923 A1 4/2013 Petrovski et al.
2013/0097776 A1 4/2013 Brykalski et al.
2013/0097777 A1 4/2013 Marquette et al.
2013/0125563 A1 5/2013 Jun
2013/0145549 A1 6/2013 Piegdon et al.
2013/0198954 A1 8/2013 Brykalski et al.
2013/0206852 A1 8/2013 Brykalski et al.
2013/0227783 A1 9/2013 Brykalski et al.
2013/0239592 A1 9/2013 Lofy
2013/0263380 A1 10/2013 Young et al.
2013/0269106 A1* 10/2013 Brykalski ............. A47C 7/744 5/423
2013/0298330 A1 11/2013 Lachenbruch et al.
2014/0007594 A1 1/2014 Lofy
2014/0026320 A1 1/2014 Marquette et al.
2014/0030082 A1 1/2014 Helmenstein
2014/0033441 A1 2/2014 Morgan et al.
2014/0062392 A1 3/2014 Lofy et al.
2014/0090513 A1 4/2014 Zhang et al.
2014/0090829 A1 4/2014 Petrovski
2014/0130516 A1 5/2014 Lofy
2014/0131343 A1 5/2014 Walsh
2014/0137569 A1 5/2014 Parish et al.
2014/0159442 A1 6/2014 Helmenstein
2014/0180493 A1 6/2014 Csonti et al.
2014/0182061 A1 7/2014 Zaiss et al.
2014/0187140 A1 7/2014 Lazanja et al.
2014/0189951 A1 7/2014 DeFranks et al.
2014/0194959 A1 7/2014 Fries et al.
2014/0237719 A1 8/2014 Brykalski et al.
2014/0250918 A1 9/2014 Lofy
2014/0260331 A1 9/2014 Lofy et al.
2014/0305625 A1 10/2014 Petrovski
2014/0310874 A1 10/2014 Brykalski et al.
2014/0338366 A1 11/2014 Adldinger et al.
2015/0013346 A1 1/2015 Lofy
2015/0121902 A1 5/2015 Steinman
2015/0176870 A1 6/2015 Inaba et al.
2015/0238020 A1 8/2015 Petrovski et al.
2015/0289667 A1* 10/2015 Oakhill .................. A47C 27/18 5/423
2015/0351556 A1 12/2015 Franceschetti et al.
2015/0351700 A1 12/2015 Franceschetti et al.
2015/0352313 A1 12/2015 Franceschetti et al.
2015/0355605 A1 12/2015 Franceschetti et al.
2015/0355612 A1 12/2015 Franceschetti et al.
2016/0030234 A1 2/2016 Lofy et al.
2016/0053772 A1 2/2016 Lofy et al.
2016/0066701 A1 3/2016 Diller et al.
2016/0150891 A1 6/2016 Brykalski et al.
2016/0198861 A1* 7/2016 DeFranks .............. A47C 27/05 5/423
2016/0320104 A1 11/2016 Lofy
2017/0028165 A1 2/2017 Franceschetti et al.
2017/0071359 A1 3/2017 Petrovski et al.
2017/0273470 A1 9/2017 Brykalski et al.
2017/0280883 A1 10/2017 Diller
2017/0318979 A1 11/2017 Rawls-Meehan et al.
2018/0027981 A1 2/2018 Sherman et al.
2018/0098637 A1 4/2018 Griese et al.
2018/0140489 A1 5/2018 Marquette et al.
2018/0242753 A1 8/2018 Ghanei et al.
2018/0289172 A1 10/2018 Alletto et al.
2020/0337470 A1 10/2020 Sayadi et al.
2021/0037987 A1 2/2021 Griffith et al.
2021/0038453 A1 2/2021 Brykalski et al.
2021/0204706 A1 7/2021 Karschnik et al.
2021/0204709 A1 7/2021 Grabinger et al.
2021/0204710 A1 7/2021 Grabinger et al.
2021/0204711 A1 7/2021 Karschnik et al.
2021/0204712 A1 7/2021 Karschnik et al.
2021/0204713 A1 7/2021 Karschnik et al.
2021/0204714 A1 7/2021 Karschnik et al.
2021/0204715 A1 7/2021 Karschnik et al.
2021/0204716 A1 7/2021 Karschnik et al.
2021/0204719 A1 7/2021 Grabinger et al.
2021/0204720 A1 7/2021 Karschnik et al.
2021/0322237 A1 10/2021 Brykalski et al.
2021/0322238 A1 10/2021 Brykalski et al.
2021/0401185 A1 12/2021 Zaiss et al.
2022/0261020 A1 8/2022 Molina et al.
2022/0273115 A1 9/2022 Pedersen et al.
2022/0287473 A1 9/2022 Karschnik et al.
2023/0063576 A1 3/2023 Grabinger et al.
2023/0066140 A1 3/2023 Karschnik et al.
2023/0111398 A1 4/2023 Grabinger et al.
2023/0142653 A1 5/2023 Brykalski et al.
2023/0240450 A1 8/2023 Griffith et al.
2023/0276948 A1 9/2023 Karschnik et al.
2023/0372169 A1 11/2023 Molina et al.
2023/0404278 A1 12/2023 Karschnik et al.
2023/0404279 A1 12/2023 Karschnik et al.
2024/0009049 A1 1/2024 Brykalski et al.

(56) References Cited

U.S. PATENT DOCUMENTS

| | | | |
|---|---|---|---|
| 2024/0090677 A1 | 3/2024 | VerBockel et al. | |
| 2024/0090678 A1 | 3/2024 | Saycocie et al. | |

FOREIGN PATENT DOCUMENTS

| | | |
|---|---|---|
| DE | 19503291 | 8/1996 |
| DE | 19912764 | 9/2000 |
| DE | 29911519 | 11/2000 |
| DE | 10238552 | 8/2001 |
| DE | 10115242 | 10/2002 |
| DE | 20120516 | 4/2003 |
| DE | 102009036332 | 2/2011 |
| EP | 0617946 | 3/1994 |
| EP | 0411375 | 5/1994 |
| EP | 0621026 | 10/1994 |
| EP | 0834421 | 4/1998 |
| EP | 0862901 | 9/1998 |
| EP | 0878150 | 11/1998 |
| EP | 1064905 | 1/2001 |
| EP | 1645258 | 4/2006 |
| EP | 1804616 | 2/2012 |
| EP | 2073669 | 11/2012 |
| EP | 2921083 | 9/2015 |
| FR | 1327862 | 5/1963 |
| FR | 2790430 | 9/2000 |
| FR | 2893826 | 6/2007 |
| GB | 874660 | 8/1961 |
| GB | 978057 | 12/1964 |
| GB | 2351352 | 12/2000 |
| JP | S56-97416 | 8/1981 |
| JP | 60-080044 | 5/1985 |
| JP | 60-085297 | 5/1985 |
| JP | S61-103122 | 7/1986 |
| JP | S62-193457 | 12/1987 |
| JP | 01-281344 | 11/1989 |
| JP | H02-011144 | 1/1990 |
| JP | 04-052470 | 6/1990 |
| JP | H04-108411 | 4/1992 |
| JP | 04-165234 | 6/1992 |
| JP | 05-026762 | 2/1993 |
| JP | 05-277020 | 10/1993 |
| JP | H06-14825 | 1/1994 |
| JP | H06-343664 | 12/1994 |
| JP | H07-003403 | 1/1995 |
| JP | H09-140506 | 6/1997 |
| JP | H09-154669 | 6/1997 |
| JP | H10-165259 | 6/1998 |
| JP | 10-227508 | 8/1998 |
| JP | 10-297243 | 11/1998 |
| JP | 10-332883 | 12/1998 |
| JP | H11-266968 | 10/1999 |
| JP | 2000-060681 | 2/2000 |
| JP | 2000-164945 | 6/2000 |
| JP | 2001-174028 | 6/2001 |
| JP | 2001-208405 | 8/2001 |
| JP | 3086307 | 6/2002 |
| JP | 2002-227798 | 8/2002 |
| JP | 2003-204087 | 7/2003 |
| JP | 2003-254636 | 9/2003 |
| JP | 2004-055621 | 2/2004 |
| JP | 2004-174138 | 6/2004 |
| JP | 2005-079210 | 2/2005 |
| JP | 2005-333083 | 12/2005 |
| JP | 2006-001392 | 1/2006 |
| JP | 2006-076398 | 3/2006 |
| KR | 2001-0060500 | 7/2001 |
| LU | 66619 | 2/1973 |
| RU | 2297207 | 4/2007 |
| WO | WO 1994/020801 | 9/1994 |
| WO | WO 1995/014899 | 6/1995 |
| WO | WO 1995/031688 | 11/1995 |
| WO | WO 1996/005475 | 2/1996 |
| WO | WO 1997/017930 | 5/1997 |
| WO | WO 1998/007898 | 2/1998 |
| WO | WO 1999/002074 | 1/1999 |
| WO | WO 1999/058907 | 11/1999 |
| WO | WO 2001/078643 | 10/2001 |
| WO | WO 2001/084982 | 11/2001 |
| WO | WO 2002/011968 | 2/2002 |
| WO | WO 2002/053400 | 7/2002 |
| WO | WO 2002/058165 | 7/2002 |
| WO | WO 2003/014634 | 2/2003 |
| WO | WO 2003/051666 | 6/2003 |
| WO | WO 2003/063257 | 7/2003 |
| WO | WO 2004/011861 | 2/2004 |
| WO | WO 2005/115794 | 12/2005 |
| WO | WO 2005/120295 | 12/2005 |
| WO | WO 2006/078394 | 7/2006 |
| WO | WO 2007/060371 | 5/2007 |
| WO | WO 2007/089789 | 8/2007 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2009/015235 | 1/2009 |
| WO | WO 2009/036077 | 3/2009 |
| WO | WO 2009/097572 | 8/2009 |
| WO | WO 2010/009422 | 1/2010 |
| WO | WO 2010/088405 | 8/2010 |
| WO | WO 2010/129803 | 11/2010 |
| WO | WO 2011/026040 | 3/2011 |
| WO | WO 2011/150427 | 12/2011 |
| WO | WO 2011/156643 | 12/2011 |
| WO | WO 2012/061777 | 5/2012 |
| WO | WO 2013/052823 | 4/2013 |
| WO | WO 2014/164887 | 10/2014 |
| WO | WO 2015/188156 | 12/2015 |

OTHER PUBLICATIONS

U.S. Appl. No. 18/619,474, filed Mar. 28, 2024, Griffith et al.

Car Advantage Online: The Climate Control Seat System, online article dated Aug. 27, 2001, 2 pages.

EP European Search Report in European Appln. No. 07844306.6, dated Mar. 8, 2011, 5 pages.

EP Extended European Search Report in European Appln No. 13159826.0, dated Jun. 3, 2013, 5 pages.

EP Extended European Search Report in European Appln No. 13159829.4, dated May 16, 2013, 4 pages.

EP Extended European Search Report in European Appln. No. 12186706.3, dated Feb. 11, 2013, 5 pages.

EP Extended European Search Report in European Appln. No. 14198493.0, dated Jun. 5, 2015, 5 pages.

Feher, Steve, "Stirling Air Conditioned Variable Temperature Seat (SVTS) and Comparison with Thermoelectric Air Conditioned Variable Temperature Seat (VTS)," SAE Technical Paper Series, International Congress and Exposition, No. 980661, Feb. 23-26, 1998, pp. 1-9, 11 pages.

Feher, Steve, "Thermoelectric Air Conditioned Variable Temperature Seat (VTS) & Effect Upon Vehicle Occupant Comfort, Vehicle Energy Efficiency, and Vehicle Environment Compatibility," SAE Technical Paper, Apr. 1993, pp. 341-349.

International Preliminary Report on Patentability received in PCT Application No. PCT/US2009/051035, dated Jan. 27, 2011, 6 pages.

International Search Report for PCT/US2009/051035 mailed Oct. 8, 2009 (PCT/US2009/051035 is the corresponding PCT of the present application), 9 pages.

Lofy, J. et al., "Thermoelectrics for Environmental Control in Automobiles", Proceeding of Twenty-First International Conference on Thermoelectrics (ICT 2002), published 2002, pp. 471-476.

Murph, "Kuchofuku's Air Conditioned Bed, Clothing Line", as posted Jun. 29, 2007 to http://www.https://www.engadget.com/2007-06-29-kuchofukus-air-conditioned-bed-clothing-line.html, 5 pages.

Okamoto et. al., "The Effects of a Newly Designed Air Mattress upon Sleep and Bed Climate," Applied Human Science, vol. 16 (1997), No. 4 pp. 161-166, 2 pages (Abstract).

Photographs and accompanying description of a component of a climate control seat assembly system sold prior to Dec. 20, 2003, 3 pages.

(56) References Cited

OTHER PUBLICATIONS

Photographs and accompanying description of a component of a climate control seat assembly system sold prior to Nov. 1, 2005, 3 pages.
Photographs and accompanying description of climate control seat assembly system components publicly disclosed as early as Jan. 1998, 7 pages.
Product information for "Kuchofuku's air conditioned bed, clothing line," retrieved on Oct. 11, 2007 from http://www.engadget.com/2007/06/29/kuchofukus-air-conditioned-bed-clothing-line/, 5 pages.
Product information for "SleepDeep™," retrieved on or about Jun. 2008 from http://www.sleepdeep.se, 2 pages.
Product information for a "Thermo-Electric Cooling & Heating Seat Cushion," retrieved on May 12, 2008 from http://www.coolorheat.com/, 2 pages.
Product information retrieved on Jan. 30, 2007 from http://store.yahoo.co.jp/maruhachi/28tbe20567.html, 3 pages (no English translation available).
Winder et al., "Heat-retaining Mattress for Temperature Control in Surgery", Br. Med. J., Jan. 17, 1970, 1:168.

* cited by examiner

CLIMATE CONTROLLED BED WITH FLUID DISTRIBUTION MEMBER

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Field of the Inventions

This application relates to climate control, and more specifically, to climate control of a bed or similar device.

Description of the Related Art

Temperature-conditioned and/or ambient air for environmental control of living or working space is typically provided to relatively extensive areas, such as entire buildings, selected offices, suites of rooms within a building or the like. In the case of enclosed areas, such as homes, offices, libraries and the like, the interior space is typically cooled or heated as a unit. There are many situations, however, in which more selective or restrictive air temperature modification is desirable. For example, it is often desirable to provide an individualized climate control for a bed or other seating device so that desired heating or cooling can be achieved. For example, a bed situated within a hot, poorly-ventilated environment can be uncomfortable to the occupant. Furthermore, even with normal air-conditioning, on a hot day, the bed occupant's back and other pressure points may remain sweaty while lying down. In the winter time, it is highly desirable to have the ability to quickly warm the bed of the occupant to facilitate the occupant's comfort, especially where heating units are unlikely to warm the indoor space as quickly. Therefore, a need exists to provide a climate-controlled bed assembly.

SUMMARY

According to certain arrangements, a climate controlled bed includes an upper portion comprising a core with a top core surface and a bottom core surface. The core includes at least one passageway extending from the top core surface to the bottom core surface. The upper portion of the bed further includes at least one fluid distribution member positioned above the core, wherein the fluid distribution member is in fluid communication with at least one passageway of the core. The fluid distribution member is configured to at least partially distribute fluid within said fluid distribution member. The upper portion of the bed further comprises at least one comfort layer positioned adjacent to the fluid distribution member. The bed also includes a lower portion configured to support the upper portion and at least one fluid module configured to selectively transfer air to or from the fluid distribution member of the upper portion. In some arrangements, the fluid module includes a fluid transfer device and a thermoelectric device for selectively thermally conditioning fluids being transferred by the fluid transfer device.

According to some embodiments, a climate controlled bed includes an upper portion comprising a core having a top core surface and a bottom core surface. The core includes one or more passageways extending from the top core surface to the bottom core surface. The upper portion of the bed further includes at least one fluid distribution member, having one or more spacers, in fluid communication with the passageway of the core and at least one comfort layer positioned adjacent to the fluid distribution member. In some embodiments, the bed additionally includes a lower portion configured to support the upper portion and at least one fluid module configured to selectively transfer air to or from the fluid distribution member of the upper portion.

In some embodiments, the spacer composes a spacer fabric, a spacer material and/or any other member that is configured to generally allow fluid to pass therethrough. In one embodiment, the spacer is generally positioned within a recess of the fluid distribution member. In other arrangements, the upper portion further comprises a barrier layer positioned underneath the spacer, the barrier layer being generally impermeable to fluids. In some embodiments, the barrier layer comprises a tight woven fabric, a film and/or the like.

According to some arrangements, the fluid distribution member is divided into at least two hydraulically isolated zones, each of said zones comprising a spacer. In one embodiment, each of the zones is in fluid communication with a different fluid module, so that each zone can be separately controlled. In other embodiments, the fluid distribution member is divided into two or more zones using sew seams, stitching, glue beads and/or any other flow blocking member or features.

In some arrangements, the fluid module is positioned within an interior of the lower portion of the bed. In one embodiment, the fluid module comprises a blower, fan or other fluid transfer device. In other embodiments, the fluid module additionally comprises a thermoelectric device configured to selectively heat or cool fluid being transferred by the fluid transfer device.

According to some embodiments, a passageway insert is generally positioned within at least one of the passageways of the core. In one embodiment, a passageway insert comprises one or more bellows, liners (e.g., fabric liners), coatings (e.g., liquid coatings), films and/or the like. In other arrangements, the lower portion includes a top surface comprising at least one lower portion opening being configured to align with and be in fluid communication with a passageway of the core. In one arrangement, one of the lower portion opening and the passageway comprises a fitting, the fitting being adapted to fit within the other of the lower portion opening and the passageway when the lower portion and the upper portion of are properly aligned.

In some embodiments, the comfort layer comprises a quilt layer or other cushioned material. In some arrangements, the core comprises closed-cell foam and/or other types of foam. In other arrangements, the fluid distribution member comprises foam. In one embodiment, the comfort layer is generally positioned above the fluid distribution member. In other arrangements, an additional comfort layer is generally positioned between the fluid distribution member and the core. In some embodiments, the bed further includes one or more flow diverters located adjacent to the fluid distribution member, wherein the flow diverters are configured to improve the distribution of a volume of air within an interior of the fluid distribution member.

According to some embodiments, the bed additionally includes a mam controller configured to control at least the operation of the fluid module. In other arrangements, the climate controlled bed assembly further comprises one or more temperature sensors configured to detect a temperature of a fluid being transferred by the fluid module. In other embodiments, the bed assembly can include one or more humidity sensors and/or other types of sensors configured to detect a property of a fluid, either in lieu of or in addition to a temperature sensor. In one embodiment, the bed additionally includes at least one remote controller configured to allow a user to selectively adjust at least one operating parameter of the bed. In some arrangements, the remote controller is wireless. In other embodiments, the remote controller is hardwired to one or more portions or components of the bed. In some arrangements, a single upper portion is positioned generally on top of at least two lower portions. In some embodiments, the fluid module is configured to deliver air or other fluid toward an occupant positioned on the bed. In other arrangements, the fluid module is configured to draw air or other fluid away an occupant positioned on the bed.

According to other embodiments, a climate controlled bed includes an upper portion comprising a core with a top core surface and a bottom core surface, a passageway configured to deliver fluid from one of the top core surface and the bottom core surface to the other of the top core surface and the bottom core surface, one or more fluid distribution members in fluid communication with the passageway and at least one comfort layer positioned adjacent to the fluid distribution member. In one embodiment, the fluid distribution member includes one or more spacers. The climate controlled bed further includes a lower portion configured to support the upper portion and at least one fluid module configured to selectively transfer air to or from the fluid distribution member of the upper portion through the passageway. In some embodiments, passageway is routed through the core. In other arrangements, the passageway is external or separate from the core, or is routed around the core.

In accordance with some embodiments of the present inventions, a climate controlled bed comprises a cushion member having an outer surface comprising a first side for supporting an occupant and a second side, the first side and the second side generally facing in opposite directions, the cushion member having at least one recessed area along its first side or its second side. In one embodiment, the bed further includes a support structure having a top side configured to support the cushion member, a bottom side and an interior space generally located between the top side and the bottom side, the top side and the bottom side of the support structure generally facing in opposite directions, a flow conditioning member at least partially positioned with the recessed area of the cushion member, an air-permeable topper member positioned along the first side of the cushion member and a fluid temperature regulation system. The fluid temperature regulation system includes a fluid transfer device, a thermoelectric device (TED) and a conduit system generally configured to transfer a fluid from the fluid transfer device to the thermoelectric device. The fluid temperature regulation system is configured to receive a volume of fluid and deliver it to the flow conditioning member and the topper member.

In one embodiment, a temperature control member for use in a climate controlled bed includes a resilient cushion material comprising at least one recessed area along its surface, at least one layer of a porous material, the layer being configured to at least partially fit within the recessed area of the cushion and a topper member being positioned adjacent to the cushion and the layer of porous material, the topper member being configured to receive a volume of air that is discharged from the layer of porous material towards an occupant.

According to some embodiments, a bed composes a substantially impermeable mattress, having a first side and a second side, the first side and the second side being generally opposite of one another, the mattress comprising at least one opening extending from the first side to the second side, a flow conditioning member positioned along the first side of the mattress and being in fluid communication with the opening in mattress, at least one top layer being positioned adjacent to the flow conditioning member, wherein the flow conditioning member is generally positioned between the mattress and the at least one top layer and a fluid transfer device and a thermoelectric unit that are in fluid communication with the opening in the mattress and the flow conditioning member.

In accordance with some embodiments of the present inventions, a climate controlled bed comprises a cushion member having a first side for supporting an occupant and a second side, the first side and the second side generally facing in opposite directions, a support structure having a top side configured to support the cushion member, a bottom side and an interior space generally located between the top side and the bottom side, the top side and the bottom side of the support structure generally facing in opposite directions, at least one flow conditioning member at least partially positioned on the first side of the cushion member, wherein the flow conditioning member is configured to provide a conditioned fluid to both the occupant's front and back sides when the occupant is laying on the cushion member in the supine position and a fluid temperature regulation system.

The climate controlled bed can also have an air-permeable distribution layer positioned on the flow conditioning member proximate the occupant and configured to provide conditioned fluid to both the occupant's front and back sides, when the occupant is laying on the cushion member in the supine position, and an air-impermeable layer that can be generally positioned along the part of the at least one flow conditioning member and can be configured to provide conditioned fluid to the front side of the occupant, when the occupant is laying on the cushion member in the supine position and along the opposite side of the at least one flow conditioning member from the air-permeable distribution layer. The fluid temperature regulation system can have a fluid transfer device, a thermoelectric device and a conduit system generally configured to transfer a fluid from the fluid transfer device to the thermoelectric device. The fluid temperature regulation system can be configured to receive a volume of fluid and deliver it to the flow conditioning member and through the air-permeable distribution layer to the occupant.

According to some embodiments, the flow conditioning member can be configured to substantially surround an occupant. In certain embodiments, the bed can have a fluid barrier configured to minimize fluid communication between a fluid inlet and a waste fluid outlet of the fluid temperature regulation system, wherein the fluid barrier can isolate a first region of the interior space of the support structure from a second region, wherein the fluid inlet and waste fluid outlet are within different regions of the support structure or one is within the interior space and one is outside of the interior space.

In one embodiment, a bed includes a substantially impermeable mattress, having a first side and a second side, the first side and the second side being generally opposite of one another, the mattress comprising at least two openings extending from the first side to the second side, a first set of at least one flow conditioning member positioned along the first side of the mattress, a second set of at least one flow conditioning member positioned only partially on the first side of the mattress, each set being in fluid communication with a group of at least one of the at least two openings in the mattress to the exclusion of the other set, at least one distribution layer being positioned adjacent to the flow conditioning members, wherein the first set is generally positioned between the mattress and the at least one distribution layer, an air impermeable layer, wherein the second set is positioned between the air impermeable layer and the at least one distribution layer, the at least one distribution layer or layers either folded other itself or positioned adjacent to one another when an occupant is not in the bed and surrounding the occupant when the occupant is in the bed, a fluid transfer device, a first set at least one thermoelectric unit and a second set of at least one thermoelectric unit, each set of thermoelectric units in fluid communication with a corresponding set of at least one flow conditioning members.

According to some embodiments, a climate controlled bed can have a conditioning region. The conditioning region can comprise a central fluid conditioning region, a fluid conditioning member, a fluid distribution member and a fluid impermeable member. The conditioning region can provide conditioned fluid to the central fluid conditioning region from multiple sides and angles of the condition region, including a top side and a bottom side. The central fluid conditioning region can generally conform to the shape of an object within the central fluid conditioning region. The fluid conditioning member can surround the central fluid conditioning region. The fluid distribution member can be along a surface of the fluid conditioning member and can also surround the central fluid conditioning region. The fluid impermeable member can be along part of a surface of the fluid condition member and can form a top side of the conditioning region.

BRIEF DESCRIPTION OF THE DRAWINGS

These and other features, aspects and advantages of the present inventions are described with reference to drawings of certain preferred embodiments, which are intended to illustrate, but not to limit, the present inventions. The drawings include seventy-five (75) figures. It is to be understood that the attached drawings are provided for the purpose of illustrating concepts of the present inventions and may not be to scale.

DETAILED DESCRIPTION OF THE PREFERRED EMBODIMENTS

This application is generally directed to climate control systems for beds or other seating assemblies. The climate control system and the various systems and features associated with it are described herein in the context of a bed assembly because they have particular utility in this context. However, the climate control system and the methods described herein, as well as their various systems and features, can be used in other contexts as well, such as, for example, but without limitation, seat assemblies for automobiles, trains, planes, motorcycles, buses, other types of vehicles, wheelchairs, other types of medical chairs, beds and seating assemblies, sofas, task chairs, office chairs, other types of chairs and/or the like.

The various embodiments described and illustrated herein, and equivalents thereof, generally disclose improved devices, assemblies and methods for supplying ambient and/or thermally conditioned air or other fluids to one or more portions of a bed assembly. As discussed in greater detail herein, as a result of such embodiments, air or other fluids can be conveyed to and/or from an occupant in a more efficient manner. Accordingly, undesirable fluid losses can be reduced or minimized as the air or other fluids are transmitted through the various components of the climate controlled bed. For example, the use of spacers (e.g., spacer fabrics or other materials), comfort layers (e.g., quilt layers), sew seams, stitching, hot melt barriers, engineered materials, flow diverters, passageways, inserts, fabrics and other impermeable members and/or the like, either alone or in combination with each other, can help provide a more targeted fluid stream to one or more portions of a bed. In addition, the arrangements disclosed herein can help reduce or minimize thermal losses as fluid is delivered to or from one or more occupants of a bed or other seating assembly. Thus, more uniform thermal coverage can be advantageously provided.

Various features and aspects of the embodiments disclosed herein are particularly useful in climate-controlled beds and similar devices, such as, for example, air chamber beds, adjustable beds, inner-spring beds, spring-free beds, memory foam beds, full foam beds, hospital beds, other medical beds, futons, sofas, reclining chairs, etc. However, such features and aspects may also be applied to other types of climate control seating assemblies, such as, for example, automobile or other vehicle seats, office chairs, sofas and/or the like.

Figure 1A:
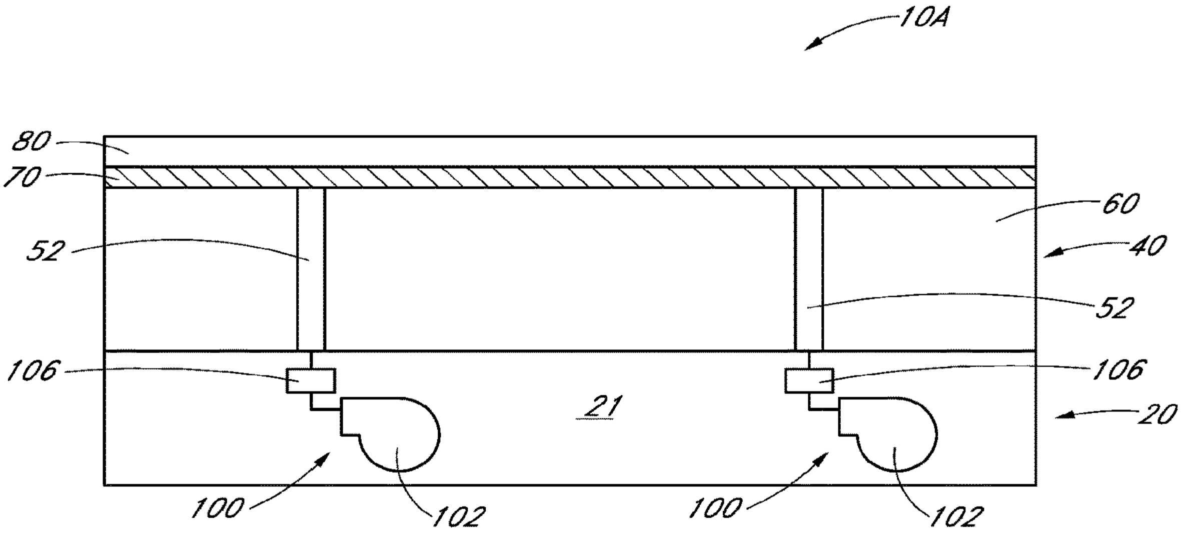
FIG. 1A schematically illustrates a cross-sectional view of a climate controlled bed according to one embodiment.

With reference to the schematic illustration of FIG. 1A, a bed 10A can include a lower portion 20 (e.g., box spring, foundation, etc.) and an upper portion 40 (e.g., mattress). In some embodiments, the lower portion 20 and upper portion 40 are separate members that are configured to be positioned adjacent to each other. As discussed in greater detail herein, the lower and upper portions 20, 40 can be removably or permanently secured to each other using one or more connection devices or methods. The lower portion 20 can be configured like a box spring or other structure member for supporting the upper portion 40 positioned above it. In some embodiments, as illustrated in FIGS. 15-18, two or more lower portions 20 can be used to support a single upper portion 40. In other arrangements, the bed 10A can include more or fewer portions, layers, features and/or other members, as desired or required by a particular application or use. For example, the bed 10A can include a pillow-top portion (not shown) generally positioned along the upper surface of the top portion 20.

In other embodiments, one or more intermediate layers are generally positioned between the lower portion 20 and the upper portion 40. Such intermediate layers can be provided to reduce the likelihood of movement between the upper and lower portions 40, 20, to reduce fluid losses through the interface of the upper and lower portions or through retrograde fluid flow (e.g., downwardly, in the direction of the lower portion), to help maintain one or more components of the bed assembly at certain desired location and/or for any other purpose. The intermediate layer can extend continuously or substantially continuously between the upper and lower portions 40, 20. Alternatively, as discussed in greater detail herein with reference to FIG. 14, such an intermediate layer or member (e.g., felt scrim) can be intermittently positioned between the upper and lower portions 40, 20. In some arrangements, the intermediate layer is secured to the upper portion 40 and/or the lower portion 20 using adhesives, fasteners and/or any other connection method or device, as desired or required.

As illustrated in FIG. 1A, the lower portion 20 can include one or more fluid modules 100 that are adapted to provide temperate-conditioned (e.g., heated, cooled, etc.) air or other fluid to one or more portions of the bed 10A. In the depicted cross-sectional view, the bed 10A comprises two fluid modules 100. In other arrangements, more or fewer fluid modules 100 can be included, as desired or required. The fluid modules 100 can selectively heat or cool air or other fluid that is being delivered through the bed 10A toward one or more occupants. However, the fluid modules 100 can be configured to deliver ambient air or fluid toward or away from one or more occupants without performing any thermally conditioning at all. Further, the level of heating, cooling and/or other fluid conditioning can be selectively controlled as desired by a user. For example, as discussed in greater detail herein with reference to FIGS. 8A-11D, 31 and 32, a climate control bed can include two or more separate zones, such that each zone can be selectively adjusted by an occupant, as desired or required. In alternative embodiments, the fluid modules 100 can be configured to draw air or other fluids away from the top of the bed 10A, either in lieu of or in addition to being configured to deliver fluids toward the top of the bed 10A.

The fluid module 100 can include a fluid transfer device 102 (e.g., blower, fan, etc.), a thermoelectric device or TED 106 (e.g., Peltier device), a convective heater, a heat pump, a dehumidifier and/or any other type of conditioning device, conduits to place the various components of the fluid module 100 and other portions of the bed 10A in fluid communication with each other and/or the like. In addition, the lower portion 20 can include one or more inlets and outlets (not shown) through which air or other fluid can enter or exit an interior space 21 of the lower portion 20. Accordingly, as described in greater detail herein, once air or other fluid enters the interior space 21 of the lower portion 20 (e.g., through one or more inlets), it can be directed toward the upper portion 40 by one or more fluid modules 100. As noted above, in any of the embodiments disclosed herein, or equivalents thereof, the fluid module 100 includes a heating, cooling and/or other conditioning (e.g., temperature, humidity, etc.) device that is not a thermoelectric device. For example, such a conditioning device can include a convective heater, a heat pump, a dehumidifier and/or the like. Additional information regarding convective heaters is provided in U.S. patent application Ser. No. 12/049,120, filed Mar. 14, 2008 and published as U.S. Publication No. 2008/0223841, and U.S. Provisional Patent Application No. 61/148,019, filed Jan. 29, 2009, the entireties of which are hereby incorporated by reference herein.

Further, in any of the embodiments disclosed herein or equivalents thereof, a fluid module can be in fluid communication with one or more fluid conditioning devices, such as, for example, thermoelectric devices, convective heaters, heat pumps, dehumidifier units and/or the like. Such devices can be incorporated into a fluid module, may be physically (e.g., directly or indirectly) or operatively attached to a fluid module and/or may simply be in fluid communication with a fluid module. For example, in one arrangement, a climate controlled bed assembly includes a dehumidifier unit that is configured to remove an undesirable amount of humidity from the air or other fluid being drawn into one or more inlets of the assembly's climate control system.

Accordingly, the amount of condensation forming within the thermoelectric device (and/or any other thermal conditioning device) can be advantageously reduced. Such a dehumidifier unit can be located within a fluid module. Alternatively, a dehumidifier can be placed upstream and/or downstream of the fluid module. In fluid module arrangements that comprise a thermoelectric device, a dehumidifier located upstream of the fluid module can help reduce the likelihood of potentially damaging and/or disruptive condensate formation within the thermoelectric device. The dehumidifier unit and/or any other conditioning devices can be positioned within the foundation (or lower portion of a bed), within the mattress (or upper portion of a bed) and/or at any other component or location, either within or outside the bed assembly. Additional information regarding condensate detection, removal and related concepts is provided in U.S. patent application Ser. No. 12/364,285, filed Feb. 2, 2009, the entirety of which is hereby incorporated by reference herein.

In embodiments where a fluid module comprises (or is in fluid communication with) a thermoelectric device or similar device, a waste fluid stream is typically generated. When cooled air is being provided to the bed assembly (e.g., through one or more passages through or around the upper portion), the waste fluid stream is generally hot relative to the main fluid stream, and vice versa. Accordingly, it may be desirable, in some arrangements, to channel such waste fluid out of the interior of the lower portion 20. For example, the waste fluid can be conveyed to one or more outlets (not shown) or other openings positioned along an outer surface of the lower portion 20 using a duct or other conduit. Additional details regarding such arrangements are provided herein with relation to FIGS. 15A-15C. In arrangements, where the lower portion 20 comprises more than one thermoelectric device, the waste fluid streams from two or more of the thermoelectric devices may be combined in a single waste conduit.

With continued reference to FIG. 1A, the upper portion 40 of the bed 10A can include one or more types of core designs. For example, the core 60 can comprise one or more foam portions, filler materials, springs, air chambers (e.g., as used in an air mattress) and/or the like. According to certain arrangements, the upper portion 40 comprises a modified standard spring mattress. As illustrated in FIG. 1A, in some embodiments, the core 60 comprises one or more fluid passageways 52, openings or other conduits that are configured to place the lower portion 20 (e.g., the fluid modules 100 positioned within an interior space 21 of a box spring, other base or support structure, etc.) in fluid communication with the top of the upper portion 40 and/or any member, layers and/or portions 70, 80 positioned above the core 60 (e.g., within one or more foam layers, between springs or other resilient members, etc.). The fluid passageways 52 can be positioned through an interior portion of the core 60, as shown in FIG. 1A. Alternatively, one or more fluid passageways can be positioned along a side of the core and/or can be separate items from the core (e.g., configured to deliver air or other fluid around the core).

In some embodiments, the core 60 can comprise one or more fluid passageways 52 situated therein. Alternatively, the passageways 52 can be created after the core 60 has been completely or partially formed. Further, the passageways 52 can include a generally cylindrical shape with a generally circular cross-section. In other embodiments, however, the passageways 52 can have a different cross-sectional shape, such as for example, oval, square, rectangular, other polygonal, irregular and/or like, as desired or required. In some arrangements, air or other fluid is directly conveyed within the passageways 52. However, the passageways 52 can be configured to accommodate an insert 54 (FIGS. 7A and 14) through which fluids are transferred. Such inserts 54 can comprise one or more bellows or other features to help accommodate movement (e.g., compression, expansion, rotation, etc.) while the bed 10A is in use. In addition, the inserts 54 can reduce the likelihood that air or other fluid being conveyed through the passageways 52 will be inadvertently directed to locations other that the intended target (e.g., pass through a space generally between the upper and lower portions 40, 20, leak into the core 60 or other portions or layers of the upper portion 40, etc.) or pick up undesirable odors (e.g., from the surrounding foam, latex and/or other materials of the core 60) or other substances with which the air or other fluid may otherwise come in contact. In some embodiments, the passageway 52 can include a liner (e.g., fabric liner), coating (e.g., liquid coating), film or other substance or member to help prevent or reduce the likelihood of air or other fluids from passing therethrough. Thus, the use of inserts 54, liners, coatings, films and/or other features can help reduce the likelihood that air or other fluid will diffuse, penetrate or otherwise permeate to or from the core 60, through the interior walls of the passageways 52. The quantity, shape, size, location, spacing and/or other details regarding the passageways 52 can be different than illustrated and described herein, as desired or required by a particular application or use.

In some embodiments, the outlet of the fluid module (e.g., the blower, thermoelectric device or convective heater, etc.) is directly or indirectly connected to the insert or other duct that is configured to be routed through the passageway 52 or insert 54. Thus, the interface of the passageway 52 (or one or more components positioned therein, e.g., an insert 54) and the fluid module can comprise a face seal, radial seal, mechanical attachment, coupling, another interface device and/or the like.

As illustrated in FIG. 1A, each passageway 52 is adapted to be aligned and placed in fluid communication with a fluid module 100. The lower portion 20 and the upper portion 40 can be configured so that the passageways 52 are generally aligned with the outlets or outlet conduits of one or more fluid modules 100 when the lower and upper portions 20, 40 are secured to one another or otherwise placed in proper relation to each other. For example, as discussed with reference to FIGS. 7A and 14, a fitting 38, 38' (e.g., flange), an interconnecting conduit 39, 39' and/or other interfacing member can be placed generally between the lower and upper portions 20, 20' and 40, 40' to ensure that the fluid modules 100, 100' are properly aligned (e.g., physically, hydraulically, etc.) with the corresponding passageways 52, 52' of the upper portion 40, 40'. Thus, the use of protruding and/or recessed fittings or features on corresponding surfaces of the upper and lower portions of the bed can facilitate the alignment of the upper and lower portions. As discussed in greater detail herein, such fittings 38, 39, components and/or other devices can also help reduce the likelihood of relative movement between the lower and upper portions 20, 40, especially when the bed is in use.

In addition, as discussed with reference to FIG. 14, one or more intermediate members 37' can be positioned generally between the upper and lower portions of a climate control bed assembly. For example, in the embodiment of FIG. 14, the intermediate member 37' includes a generally circular felt scrim or other layer having a central opening. In some arrangements, the felt scrim or member 37' is approximately 2 mm thick and 155 mm (6.1 inches) in diameter. As shown, the intermediate member 37' can include a central opening, which, in some embodiments, is shaped and sized to generally match the opening size of the adjacent components of the climate control bed (e.g., the flange 38', the interconnecting conduit 39', the insert 54' positioned within the passageway 52', etc.). In other embodiments, the shape, size and other characteristics of the intermediate member 37' can vary, as desired or required. The intermediate member 37' can be configured to secure to an adjacent surface of the upper portion and/or the lower portion of the bed assembly using adhesives (e.g., adhesive strip), fasteners and/or any other connection device or method.

Regardless of their exact shape, size and configuration, such scrims or other intermediate members 37' can offer one or more benefits and other advantages. For example, an intermediate member 37' can help maintain the position of the lower end (e.g., flanged end) of the insert 54' during use, thereby preventing undesirable pull-through of the insert 54' into the passageway 52'. In addition, such an intermediate member 37' can help reduce the likelihood of leaks as conditioned and/or unconditioned air or other fluid is conveyed from a fluid module toward an occupant. For instance, the intermediate member 37' can be configured to prevent or substantially prevent conditioned air from flowing backwards through the insert toward the interface between the upper and lower portions of the bed assembly. A felt scrim 37' or other intermediate member can be included with any embodiment of a climate controlled bed assembly disclosed herein or equivalents thereof.

With continued reference to FIG. 1A, one or more members 70, 80, layers and/or portions can be positioned on top of the upper portion 40 of the bed 10A or incorporated as layers along the top end of the upper portion 40. For instance, the depicted embodiment includes a fluid distribution member 70 comprising a spacer (e.g., spacer fabric) or other material configured to generally distribute fluid (e.g., open cell foam, a member having an open lattice structure, a spacer or other material placed within a bag or other enclosure, etc.). As discussed in greater detail herein with respect to the embodiments illustrated in FIGS. 12A and 12B, a fluid distribution member can include one or more channels or other conduits through which fluids may be directed. Such channels or other conduits can be configured to distribute air or other fluid to selected portions of the fluid distribution member, and thus, the bed assembly. The channels or other conduits can be formed when the fluid distribution member is being manufactured (e.g., using injection molding, other molding technologies, etc.). Alternatively, the channels or other conduits can be formed after the fluid distribution member has been completed, using one or more forming devices or including, without limitation, air chamber beds, adjustable beds, inner-spring beds, spring-free beds, memory foam beds, full foam beds, hospital beds, other medical beds, futons, sofas, reclining chairs and/or the like.

Regardless of the exact configuration, air or other fluids delivered into such a fluid distribution member 70 from the passageways 52 may be partially or completely dispersed throughout the fluid distribution member 70. This can help ensure that fluid being delivered by the fluid modules 100 is generally distributed throughout a desired top surface area of the bed 10A.

As illustrated in FIG. 1A, the bed 10A can also include a comfort layer 80 (e.g., quilt layer) or other layer or member that is generally configured to enhance an occupant's comfort. In some arrangements, such a comfort layer 80 is configured to permit fluids to pass through it. According to some arrangements, a comfort layer 80, such as used in any the embodiments disclosed herein or equivalents thereof, is configured to allow air or other fluids to pass therethrough only when a threshold back-pressure applied to it has been achieved. The terms comfort layer and quilt layer are used interchangeably herein.

In addition, under certain circumstances, it may desirable to limit the back-pressure exerted upon a comfort layer 80 to a desired maximum level. Thus, a comfort layer 80 may comprise a desired back-pressure range for a given fluid flowrate. For example, in one embodiment, when an occupant is positioned on top of the bed assembly, the back-pressure, measured at the fluid module (e.g., the blower or other fluid transfer device), can be less than 1 inch of water when the fluid flowrate is 10 scfm. In other embodiments, such a maximum back-pressure can be higher or less than 1 inch of water (e.g., less than 0.01, 0.05, 0.1, 0.2, 0.3, 0.4, 0.5, 0.6, 0.7, 0.8, 0.9, 1.1, 1.5, 2.0, 5.0, 10.0, more than 10.0 inch water, ranges between such values, etc.). The target back-pressure range can depend on one or more factors or considerations, such as, for example, the friction losses through fluid passageways, fittings and other hydraulic components, the types of materials that comprise the various components of the bed, the shape, size and other properties of the various bed components or layers, the types of spacers (e.g., spacer fabric) utilized and/or the like.

Limiting the back-pressure and/or fluid flowrate through a comfort layer and/or other components or layers of a climate controlled bed assembly can provide certain advantages. For example, such limitations can ensure a proper feel at the exposed top surfaces of the bed assembly to generally improve the comfort level of an occupant. In addition, such limitations can help reduce the noise created by air or other fluids moving through the climate control bed. In other embodiments, such limitations can help conserve power and lower the operational expenses of the bed assembly. Additional disclosure about noise and vibration abatement features for climate control bed assemblies is provided below.

Thus, in some embodiments, once ambient or thermally conditioned fluid has been delivered into the fluid distribution member 70, it can be directed toward the top surface of the bed 1OA through the comfort layer 80. In other embodiments, as discussed herein with reference to FIG. 2, one or more other layers 68 or members can be selectively included in the upper portion 40 of the bed (e.g., between the core 60 and the bed's top surface).

Figure 1B:
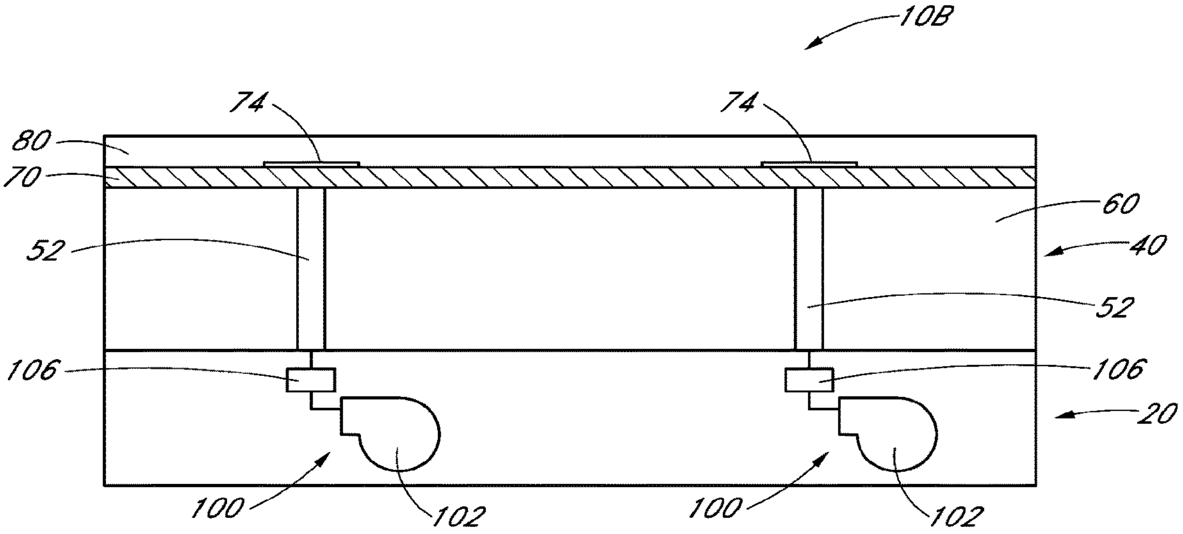
FIG. 1B schematically illustrates a cross-sectional view of a climate controlled bed according to another embodiment.

In the embodiment illustrated in FIG. 1B, the bed 10B further comprises one or more flow diversion members 74 generally positioned above the passageways 52 of the core 60 or other location of the bed's upper portion 40. As discussed in greater detail herein, such flow diversion members or diverters 74 can help distribute air or other fluid that is directed into the fluid distribution member 70 (e.g., spacer fabric or other material). As shown, the flow diversion members 74 can be positioned above the fluid distribution member (e.g., between the fluid distribution member 70 and the comfort layer 80). The flow diversion members 74 can be sized, shaped and otherwise configured to create a desired air flow dispersion pattern within a desired portion of the fluid distribution member 70. The flow diversion members 74 can comprise one or more air impermeable, semi-permeable or permeable materials, as desired or required. For instance, even if some fluid is permitted to pass through the flow diversion members 74, the mere presence of the diversion members 74 above the passageways 52 of the core 60 can cause air or other fluid to be deflected in a lateral or generally lateral direction. The terms flow diversion member and flow diverter are used interchangeably herein.

Figure 2:
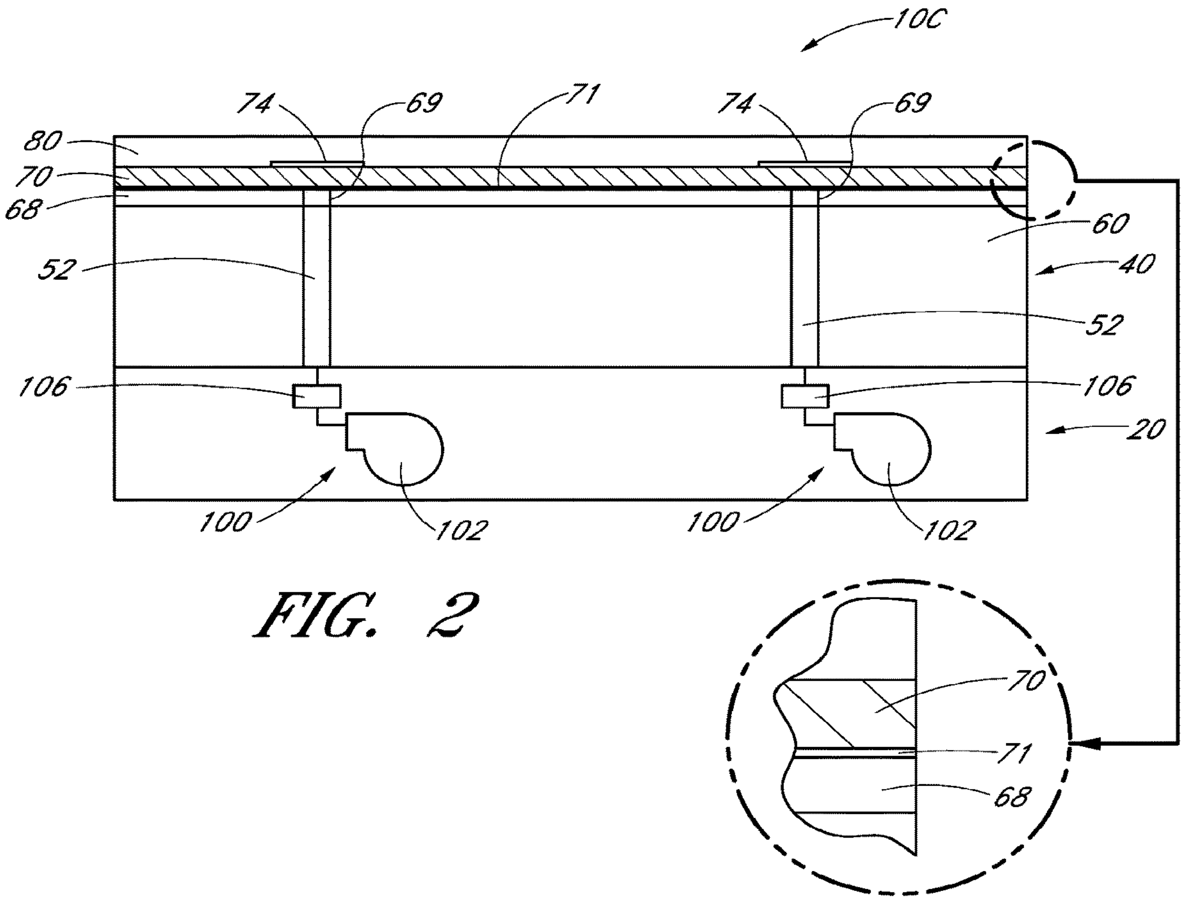
FIG. 2 schematically illustrates a cross-sectional view of a climate controlled bed according to still another embodiment.

FIG. 2 schematically illustrates a cross-sectional view of another embodiment of a climate-controlled bed 10C. The depicted bed 10C is similar to the arrangements illustrated in FIGS. 1A and 1B and discussed herein, except that it comprises an additional comfort layer 68 or other member between the fluid distribution member 70 and the core 60. This additional comfort layer 68 or member can be separate from the core 60 or can form a unitary structure with the core 60. The additional comfort layer 68 can be configured to further enhance the comfort level to a bed occupant. In some embodiments, the additional comfort layer 68 comprises foam (e.g., viscoelastic foam, polyurethane foam, memory foam, other thermoplastics or cushioning materials and/or the like).

With continued reference to FIG. 2, the additional comfort layer 68 can comprise conduits 69 that generally align and are in fluid communication with the passageways 52 of the core 60. As discussed herein, according to certain arrangements, the additional comfort layer 68 forms a unitary structure with the core 60. In other embodiments, however, the additional comfort layer 68 is a separate item from the core 60 that may be attached to it using adhesives, stitching, fasteners and/or any other connection device or method. Thus, air or other fluid can be conveyed through the passageways 52 of the core 60 and the conduits 69 of the additional comfort layer 68 toward the fluid distribution member 70. From the fluid distribution member 70, air and/or other fluids can be at least partially laterally dispersed (e.g., with or without the help of flow diversion members 74) before exiting toward the top of the bed assembly 10C (e.g., through one or more comfort layers 80, other layers or components, etc.).

According to certain embodiments, an air impermeable or substantially air impermeable film 71, layer or other member is generally situated below the fluid distribution member 70. This can help prevent or reduce the likelihood of air or other fluids from being undesirably conveyed from the fluid distribution member 70 toward the additional comfort layer 68 and the core 60. In other embodiments, such a film 71 is less air permeable than the comfort layer 80 or other layers positioned on top of the fluid distribution member 70. The film 71 or other layer can be used in any of the embodiments disclosed herein or equivalents thereof.

Figure 2A:
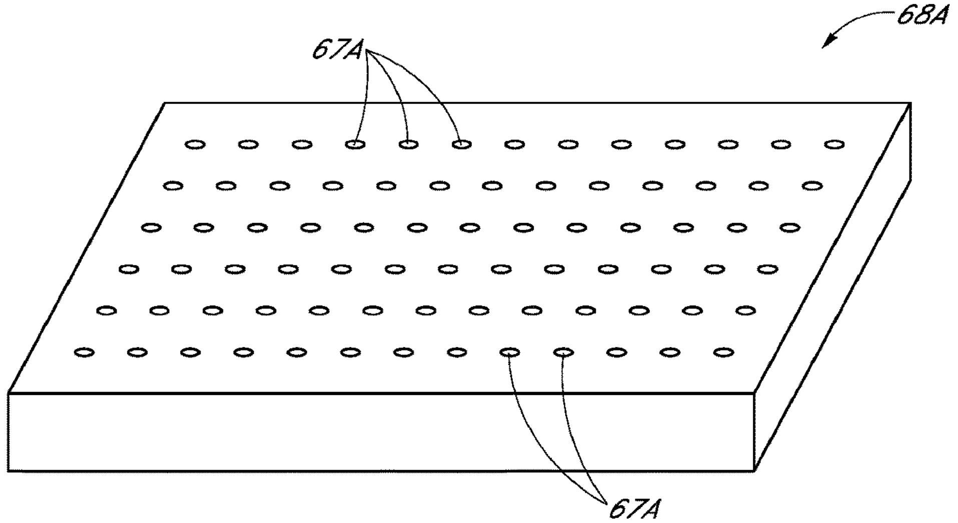
FIG. 2A illustrates a perspective view of a comfort layer configured to be positioned between a core and a fluid distribution member according to one embodiment.

In other embodiments, as illustrated in FIG. 2A, the additional comfort layer 68A includes a plurality of openings 67A that are configured to extend completely or partially through the depth of the additional comfort layer 68A. Once such a perforated additional comfort layer 68A is positioned adjacent to a core 60, at least some of the openings 67A can be placed in fluid communication with the passageways 52 of the core. As a result, the openings 67A can permit air or other fluid to be conveyed from the passageways 52 of the core 60 to the fluid distribution member 70 situated above the additional comfort layer 68A. This can advantageously simplify the design of the additional comfort layer 68A as the need to align the conduits 69 (FIG. 2) of the additional comfort layer with the passageways 52 of the core 60 can be eliminated. Instead, a perforated additional comfort layer 68 can be used with cores having different passageway sizes, locations, spacing, orientations and/or other characteristics.

The bed's upper portion 40 (e.g., foam, spring or other type of mattress) can include one or more other layers or members, either in addition to or in lieu of any of the layers or members illustrated or discussed in connection with the various embodiments disclosed herein. Adjacent layers or members of the bed can be attached to each other using one or more connection methods or devices, such as, for example, adhesives, stitching, seams, fasteners and/or the like. In addition, the size, thickness, shape, materials and/or other details of the various layers or members included in the bed can vary, as desired or required by a particular application or use.

Figure 3A:
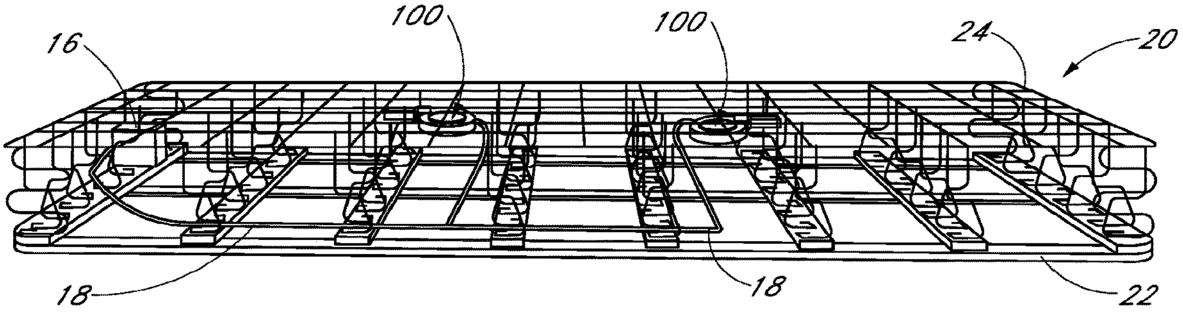
FIG. 3A illustrates a perspective view of a lower portion of a climate controlled bed according to one embodiment.

One embodiment of a lower portion 20 or support member of a climate-controlled bed is illustrated in FIG. 3A. As shown, the lower portion 20 can include a lower frame 22 and an upper frame structure 24. In FIG. 3A, the lower frame 22 includes relatively large, rigid members (e.g., wood, steel, composites, etc.) that generally form the lower end of the bed. The upper frame structure 24 can include a plurality of smaller metal members that are shaped to form a three-dimensional structure. In some arrangements, the upper frame structure 24 is configured to resiliently support a core and other components of the upper portion 40.

With continued reference to FIG. 3A, one or more fluid modules 100 can be positioned within an interior of the lower portion 20. The depicted embodiment comprises two fluid modules 100; however, more or fewer fluid modules 100 can be included, as desired or required. Further, the fluid modules 100 can be electrically connected to a controller 16 (e.g., control unit) using one or more hardwired and/or wireless connections. As shown, power and control wires extending to and/or from each fluid module 100 can be routed through electrical conduits 18 or other enclosures. In other embodiments, the fluid modules, controllers and/or any other components or portions of the climate control system can be positioned outside the lower portion 20 and/or any other portion of the bed.

Figure 3B:
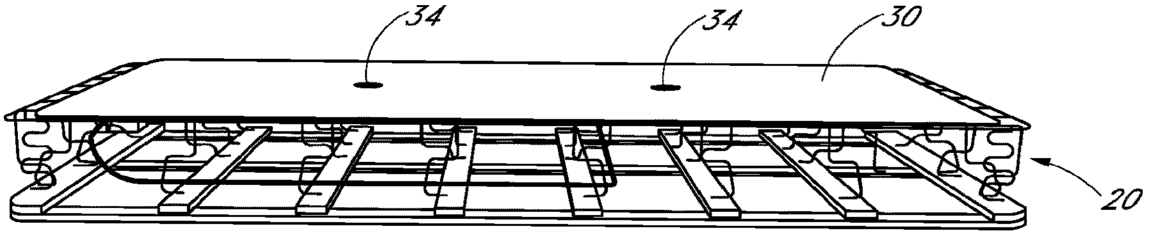
FIGS. 3B and 3C illustrate perspective views of the lower portion of the climate controlled bed of FIG. 3A with a fabric or other covering member positioned along the top surface thereof.
Figure 3C:
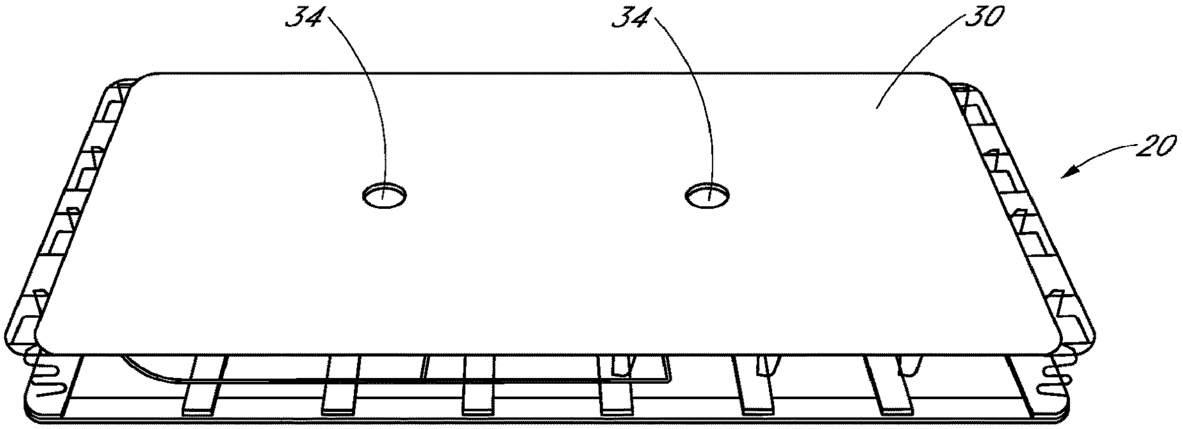

As illustrated in FIGS. 3B and 3C, the lower portion 20 can include a covering material 30 along an exterior area. For clarity, only a top area of the lower portion 20 comprises a covering material 30 in FIGS. 3B and 3C. However, in other arrangements, a covering material 30 can be placed along other areas of the lower portion 20. For example, the entire exterior surface of the lower portion 20 can include a covering material 30. The covering material 30 can comprise a fabric, a film and/or the like. In some embodiments, at least a part of the top of the lower portion 20 comprises a covering material 30 that is configured to help reduce movement between the lower portion 20 and the adjacent upper portion (e.g., core). For example, the covering material 30 can include a non-skid or substantially non-skid surface texture or features (e.g., bumps, grooves, etc.). Alternatively, the covering material can comprise one or more non-skid materials (e.g., rubber). Further, the covering material 30 can include one or more openings 34 that are generally aligned with the fluid modules 100 positioned within the lower portion 20.

Figure 4A:
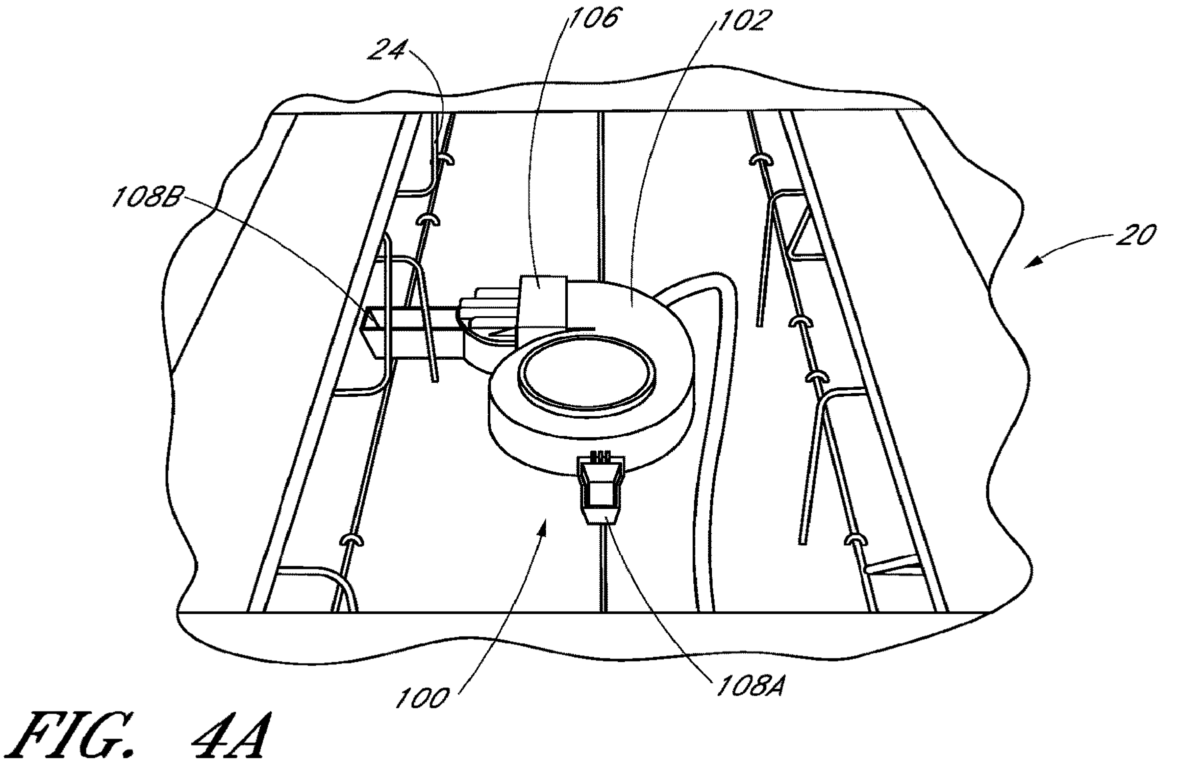
FIGS. 4A and 4B illustrate perspective views of one embodiment of a fluid module secured to one or more areas of the lower portion of FIGS. 3A-3C.
Figure 4B:
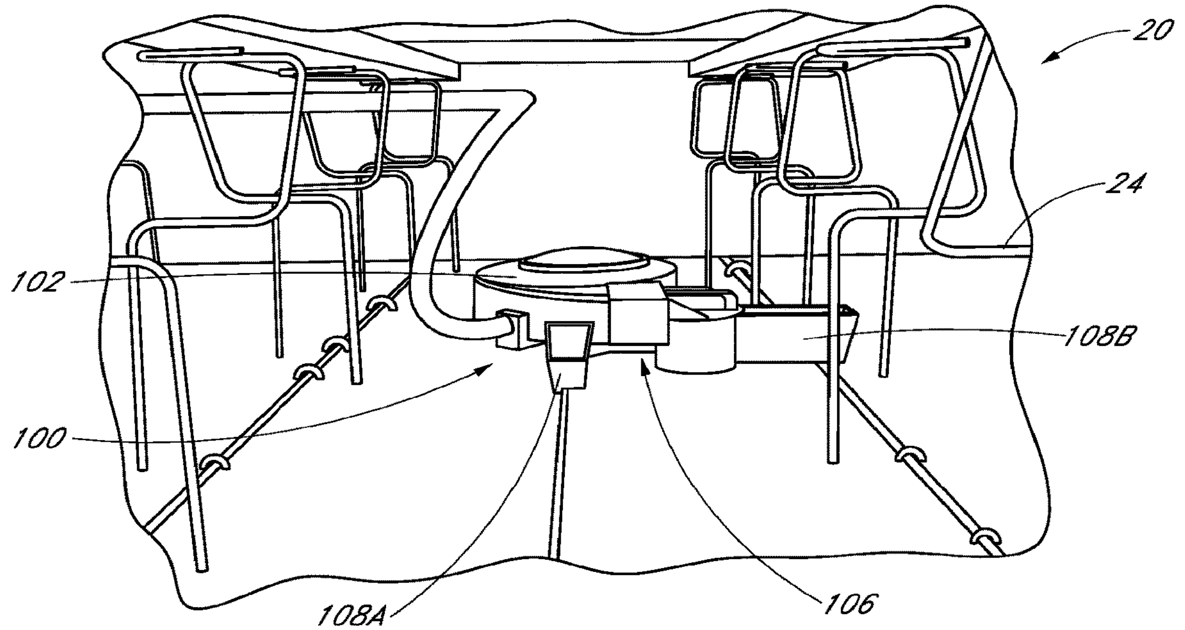

With reference to FIGS. 4A and 4B, the fluid modules 100 can be secured to one or more areas of the lower portion 20. In the depicted embodiment, the fluid module 100 includes supports 108A, 108B or other portions or features that are adapted to secure to the frame structure 24. However, the support 108A, 108B or any other portion of the fluid modules 100 can be secured to any other area of the lower portion 20. In addition, a fluid module 100 can be secured to the lower portion 20 of a bed using any other device or method. In other embodiments, as discussed herein with reference to FIG. 14, the lower portion 20' includes a backer board 110 to which one or more components (e.g., fluid module 100', power supply 112', control unit 114', humidity sensor 116', other types of sensors, etc.) of the climate control bed assembly 10' are configured to secure. Additional details regarding such an embodiment are provided below.

With continued reference to FIGS. 3A-3C, air or other fluid can enter the fluid modules 100 through one or more vents or other openings (not shown) located along the lower portion 20 of the bed assembly. Similarly, any waste air or fluid exiting the fluid modules 100 can be directed out of an interior of the lower portion 20 through one or more vents or openings (not shown). In other embodiments, air or other fluids enter into or exit from the interior of the lower portion 20 of the bed through an air permeable layer (e.g., a fabric or other covering material 30, as discussed herein) and/or any other member. As discussed in greater detail herein with reference to FIGS. 15A-15C, a foundation or lower portion 120 of a climate controlled bed assembly can be configured to include separate thermal zones for keeping the fluid module's main conduits generally separate from its waste conduits. As shown in FIGS. 15B and 15C, in certain embodiments, the bottom portion includes a specially-designed bed skirt 140 to further assist in preserving such thermally-separated zones intact. Additional information regarding such arrangements is provided below.

Figure 5:
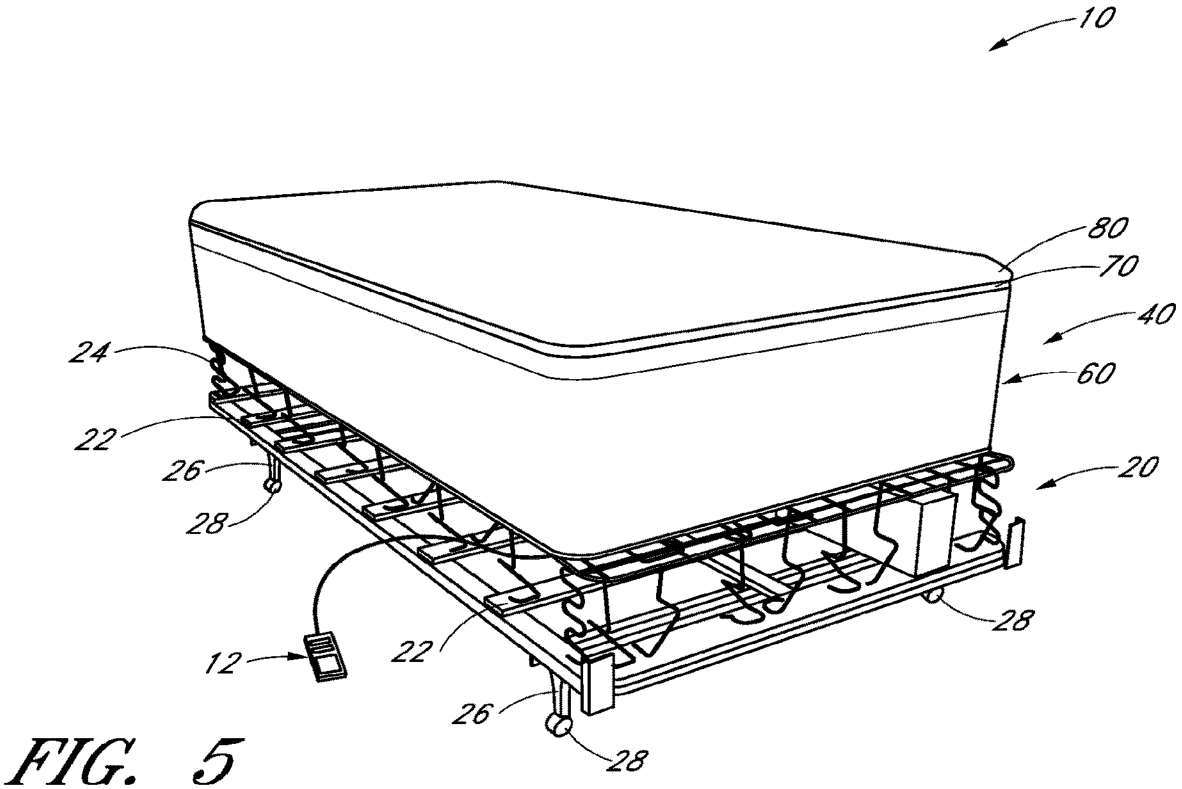
FIG. 5 illustrates a perspective view of a climate controlled bed with an upper portion generally positioned on top of a lower portion according to one embodiment.

FIG. 5 illustrates an upper portion 40 of a bed 10 positioned on top of a lower portion 20. As discussed, the lower portion 20 can include a frame 22 and a frame structure 24 generally positioned on top of the frame 22. In addition, as illustrated in FIG. 5, the lower portion 20 can include a plurality of legs 26 or other support members. In some embodiments, one or more of the legs 26 or other support members comprise wheels to facilitate moving the bed 10 relative to the floor.

With further reference to FIG. 5, the upper portion 40 of the bed can include a core 60 and one or more layers or portions 70, 80 positioned thereon. For example, as discussed in reference to FIGS. 1A, 1B and 2, a flow conditioning member 70 (e.g., a spacer or other material), a comfort layer 80 (e.g., a quilt layer), flow diversion members 74 and/or any other layer or member can be positioned on top of the core 60, as desired or required by a particular application. In some embodiments, the upper portion 40 comprises the general structure and characteristics of an inner-spring bed, an air chamber bed, an adjustable bed, a spring-free bed, a memory foam bed, a full foam bed, a hospital bed, another type of medical bed, a futon, a sofa, a reclining chair and/or the like. The arrangement depicted in FIG. 5 further comprises a user interface device 12 (e.g., a handheld controller) that is operatively connected (e.g., hardwired, wirelessly, etc.) to the fluid modules 100, a main control unit and/or any other component or device used to operate the bed 10.

Figure 6:
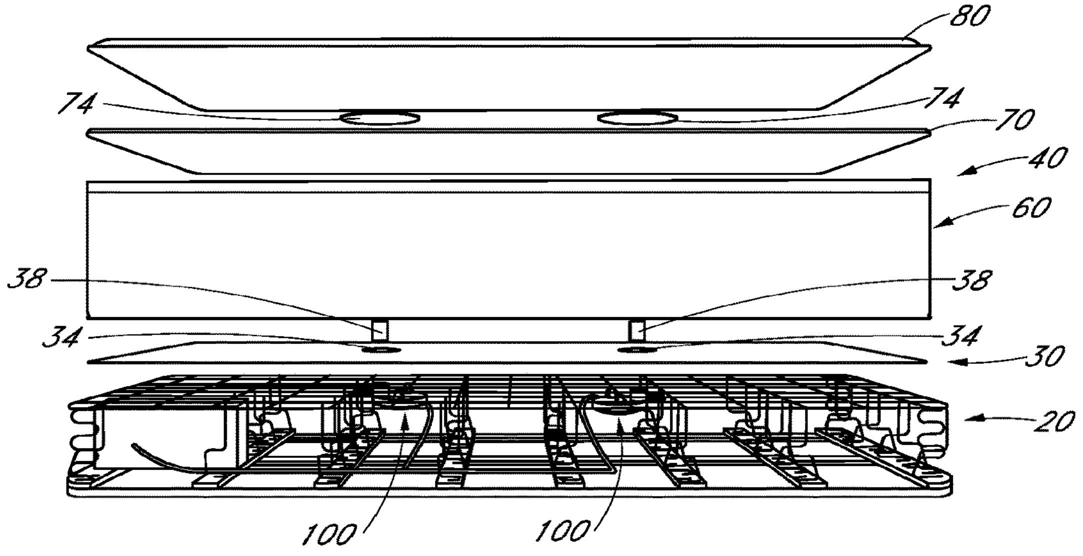
FIG. 6 illustrates an exploded front perspective view of the bed of FIG. 5.

FIG. 6 illustrates an exploded view of the bed 10 of FIG. 5. As shown, the foundation or lower portion 20 can include a covering material 30 or other layer along its top surface that is configured to contact the upper portion 40 (e.g., core 60). The fluid modules 100 positioned within an interior of the lower portion 20 can be placed in fluid communication with passageways 52 (FIG. 7A) of the core 60 through one or more openings 34 in the covering material. One or more fittings 38 or other devices can be optionally used to help place the fluid modules 100 in fluid communication with the passageways 52. In addition, as discussed, such fittings 38 can help ensure that the upper portion 40 (e.g., the core 60) does not slide or otherwise move relative to the lower portion 20. Additional information regarding such fittings and other devices positioned at the interface of the upper and lower portions 40, 20 is provided herein with reference to FIG. 14.

Figure 7A:
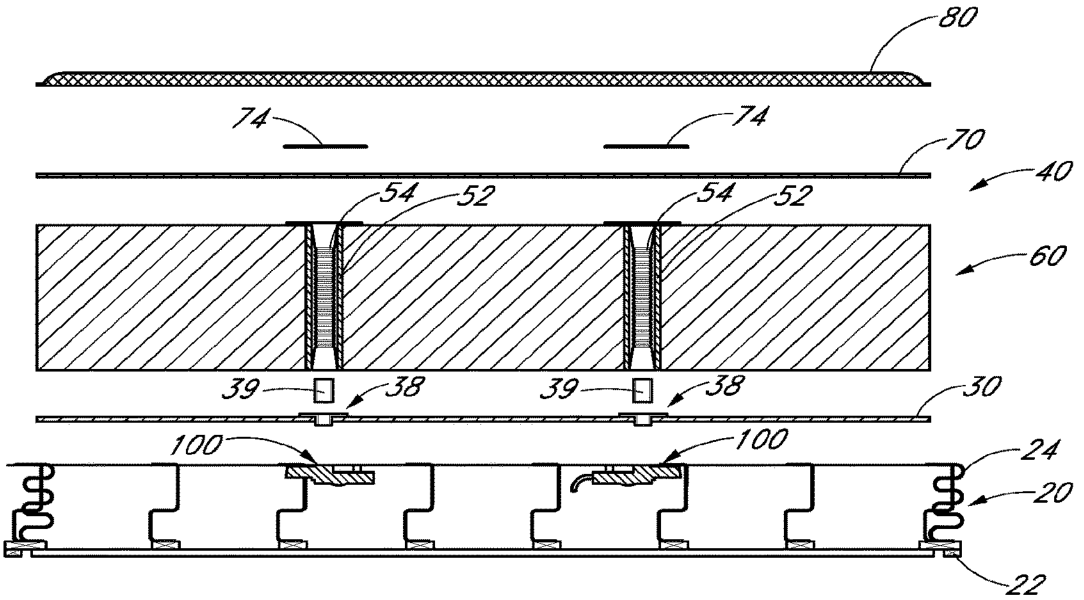
FIG. 7A illustrates an exploded cross-sectional view of a climate controlled bed according to one embodiment.
Figure 7B:
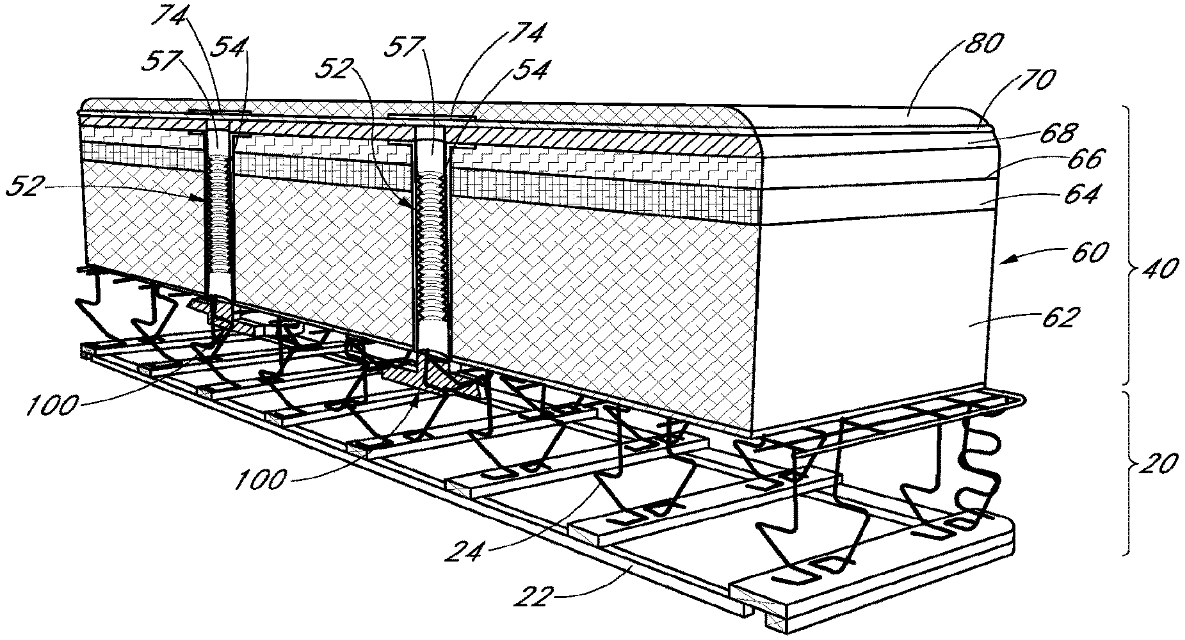
FIG. 7B illustrates a perspective view taken through a cross section of the bed of FIG. 7A.

As illustrated in the cross-sectional views of FIGS. 7A and 7B, each of the passageways 52 of the core 60 can include an insert 54. Thus, air or other fluid can be conveyed through the passageways 52 either partially or entirely within such inserts 54. As discussed, this can help reduce the likelihood that air or other fluid will diffuse through the walls of the passageways 52 into the core 60 or other portions of mattress 40 or upper portion of the bed assembly. In addition, the inserts 54 can help prevent air or other fluid being conveyed therein from picking up undesirable odors as it is being conveyed toward the fluid distribution member 70, the comfort layer 80 and/or any other portion positioned along the top of the upper portion 40. As shown, the inserts 54 can include bellows or other features that help the inserts 54 flex, compress, stretch and/or otherwise move in response to one or more loads, moments, stresses or other forces imparted on the bed 10. The inserts 54 and/or any fittings 38 to which the inserts 54 are connected can include flanges or other protruding features that are configured to contact adjacent surfaces of the core 60, fluid distribution member 70, the lower portion 20 and/or any other component of the bed. The use of such flanges or other features can help secure the inserts 54 and/or fittings 38 relative to the passageways 52 of the core 60, and thereby reduce the likelihood of fluid leaks, pull-through of the insert 54 and/or any other undesirable occurrence.

With continued reference to FIG. 7B, the core 60 can include one or more layers 62, 64, 66, 68 or portions. In one embodiment, the core 60 comprises a main foam portion 62 positioned along the lower part of the core 60. Alternatively, in embodiments where the bed assembly is of the spring mattress type, the core 60 comprises a plurality of inner-springs or coils, either in lieu of or in addition to foam and/or other filler materials. Further, the core 60 can have one or more upper layers 64, 66, 68 that may comprise one or more other types of foam or other materials. The use of different foams or other materials can permit a bed 10 to be manufactured with certain properties (e.g., rigidity, flexibility, comfort, resiliency, etc.), as desired or required. For example, the different layers 62, 64, 66, 68 of the core 60 can comprise high performance foam, viscoelastic foam, memory foam, open-cell foam, closed-cell foam, other types of foam, filler materials, other natural or synthetic materials, spring coils and/or the like. In some embodiments, the core comprises one, two, three or more layers of latex, viscoelastic foam or other viscoelastic materials. In other embodiments, as discussed, the core can comprise air chambers, springs and/or any other types of components or features, as desired or required.

In FIG. 7B, the layers 64, 66, 68 positioned on top of the main core layer 62 can comprise a high-performance foam, a viscoelastic foam and a soft foam, respectively. In other embodiments, however, a core 60 can include different materials (e.g., filler materials, thermoplastics, air chambers, springs, other natural or synthetic materials, etc.), either in lieu of or in addition to foam. Further, the core can include more or fewer portions, layers and/or materials than disclosed herein. In arrangements where the core 60 comprises two or more portions or layers, such portions or layers can be attached to one another using adhesives, stitching, fasteners and/or any other device or method. For example, m one embodiment, the various layers of the core 60 are hot melted to each other.

With continued reference to FIGS. 7A and 7B, once transferred from the fluid modules 100 through the passageways 52 (e.g., through one or more fittings 38, inserts 54, etc.), ambient and/or thermally-conditioned air or other fluid can enter one or more fluid distribution layers 70. As discussed in greater detail herein, one or more flow diversion members 74 or diverters strategically positioned above the fluid distribution layer 70 can help re-direct at least some of the air or other fluid entering the fluid distribution layer 70 in a lateral or substantially lateral direction. This can help promote a more even flow distribution and dispersion within the fluid distribution member 70. In some embodiments, the flow diverters 74 can comprise one or more materials, such as, for example, polymeric materials, fabrics and/or the like. In some embodiments, the flow diversion members 74 are configured to allow at least some air or fluid to permeate therethrough. Alternatively, the flow diversion members 74 can be non air-permeable or substantially non air-permeable, as desired or required.

The flow diversion members 74 can be attached to the fluid distribution member 70 and/or one or more adjacent layers of a bed assembly 10 using adhesives, stitching and/or any other connection device or method. The quantity, size, shape, orientation and/or other details of the fluid distribution member 70 and/or the flow diverters 74 can vary, as desired or required. For example, according to certain arrangements, a bed comprises no flow diversion members 74. In other embodiments, one or more other layers or members can be positioned between the fluid distribution member 70 and the flow diversion member 74.

As illustrated in FIGS. 7A and 7B, one or more comfort layers 80 can be positioned above and/or below the fluid distribution member 70. In some embodiments, the comfort layer 80 comprises one or more soft materials, such as, open-cell foam, memory foam, other soft foam, down feathers, other natural or synthetic filler materials and/or the like. Such a comfort layer 80 can be air-permeable so that air or other fluids exiting the top of the fluid distribution member 70 can be transmitted therethrough. The thickness, size, orientation relative to other layers of the bed, materials of construction and/or other characteristics of the comfort layer 80 can vary, as desired or required.

The various layers or components that are included in the upper portion 40 of the bed (e.g., the core 60 and its various layers 62, 64, 66, 68, the flow distribution layer 70, the flow diversion members 74, the comfort layer 80, etc.) can be attached to each other using adhesives, stitching and/or any other device or methods. Alternatively, one or more components or layers of the upper portion 40 can be configured to be separate or separable from each other.

Figure 8B:
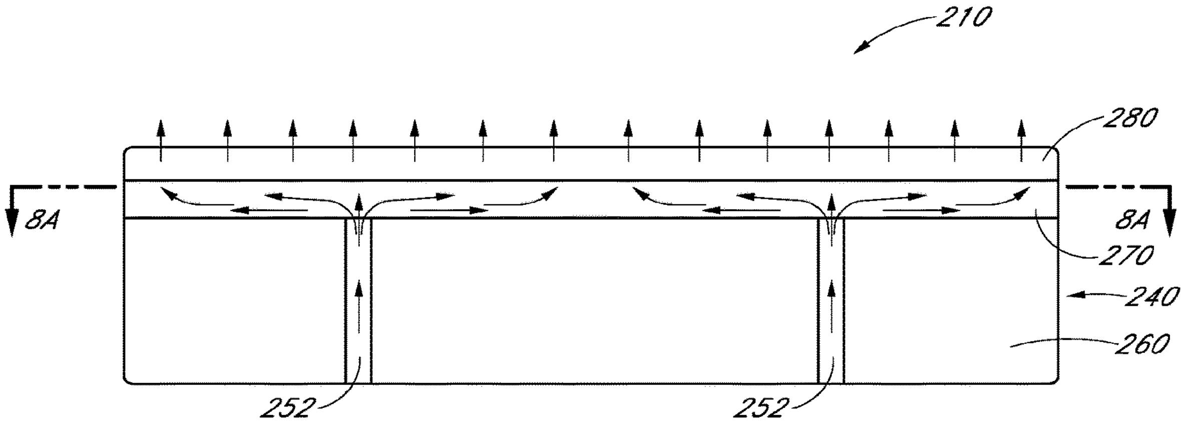
FIG. 8B schematically illustrates a cross-sectional view of the climate controlled bed of FIG. 8A.
Figure 8A:
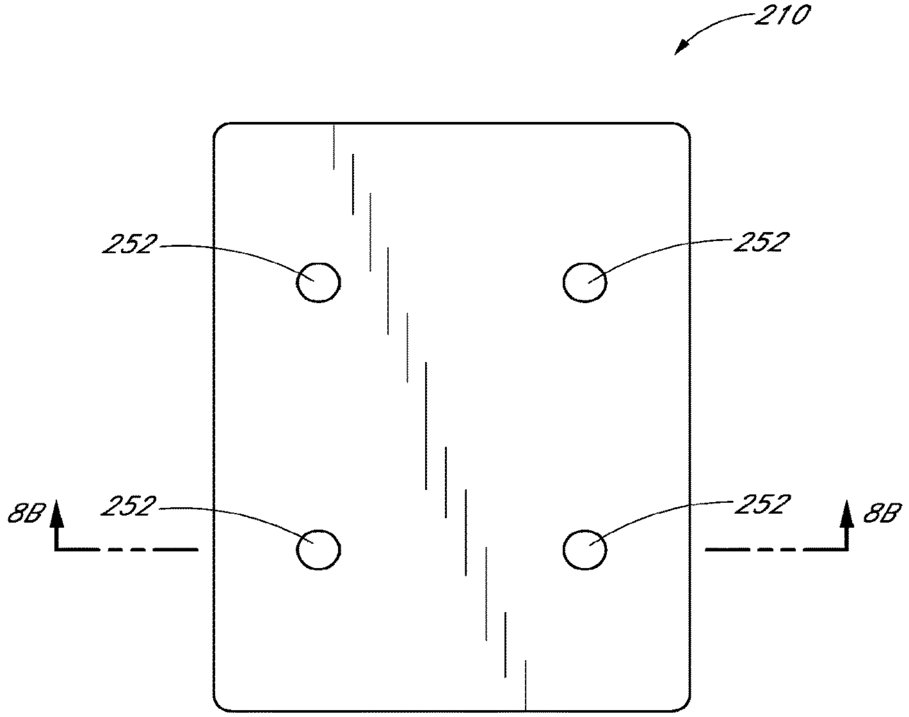
FIG. 8A schematically illustrates a top view of a climate controlled bed according to one embodiment.

FIGS. 8A and 8B schematically illustrate one embodiment of an upper portion 240 of a climate controlled bed assembly 210 having certain features, components and advantages as described herein. In the depicted embodiment, the upper portion 240 comprises a core 260 which includes four internal passageways 252 across its depth. As shown, the passageways 252 can have a generally cylindrical shape. However, the passageways 252 can include any other desired or required cross-sectional shape, such as, for example, square, rectangular, triangular, other polygonal, oval, irregular and/or the like. Further, in some arrangements, the passageways 252 are symmetrically arranged along the core 260. This can allow the upper portion 240 to be rotated relative to the lower portion (not shown in FIGS. 8A and 8B) while still allowing the passageways 252 to generally align (e.g., physically, hydraulically, etc.) with fluid modules positioned within the foundation or lower portion. Alternatively, the passageways 252 of the core 260 can include a non-symmetrical orientation. Further, in other embodiments, the core 260 can include more or fewer than four internal passageways 252, as desired or required by a particular application or use. In addition, the size, shape, spacing, orientation and/or any other details of the passageways 252 and/or the core 260 can be different than illustrated or discussed herein.

According to some embodiments, the number of internal passageways 252 included in an upper portion of a thermally-conditioned bed can be selected based on the various independently-controlled zones that such a bed comprises. Additional disclosure regarding such arrangements is provided herein in relation to FIGS. 8A-11D, 31 and 32.

As discussed in greater detail herein, the core 260 can comprise one or more materials or components, such as, for example, foam, other thermoplastics, air chambers, coil springs, other resilient members, filler materials and/or the like. Although not illustrated in FIGS. 8A and 8B, the upper portion 240 can be configured to be selectively positioned on a lower portion (e.g., foundation, box spring, other frame, etc.). As discussed in greater detail herein, when the upper and lower portions of a bed assembly are properly situated relative to each other, the passageways 252 of the core 260 can be configured to generally align with openings in the lower portion so as to place the passageways 252 in fluid communication with one or more fluid modules (e.g., fans, blowers or other fluid transfer devices, thermoelectric devices, convective heaters or other temperature-conditioning devices, etc.). Thus, as shown, ambient or thermally-conditioned air or other fluid can be advantageously conveyed through the passageways 252 and through one or more layers or components situated above the core 260, toward the top surface of the upper portion.

For example, as illustrated in FIG. 8B, air or other fluid can be directed from the passageways 252 into a fluid distribution member 270 (e.g., spacer material, spacer fabric or other material) or any other member that is generally configured to laterally or substantially laterally distribute fluid (e.g., air) within the interior of the bed, so that such fluid is advantageously directed along a desired top surface of the bed 210. Once within the fluid distribution member 270, air or other fluid can pass through one or more layers or members located along the top of the bed 210. For example, in the embodiment depicted in FIG. 8B, the upper portion 240 comprises a comfort layer 280 (e.g., quilt layer) that is adapted to allow air or other fluid to diffuse therethrough. As discussed in greater detail herein with respect to other embodiments, the top portion 240 (e.g., mattress) can comprise one or more other comfort layers, fluid distribution members, filler materials, coil springs or other resilient member and/or the like, to achieve a desired feel (e.g., firmness), comfort level, fluid distribution scheme or the like.

Figure 9B:
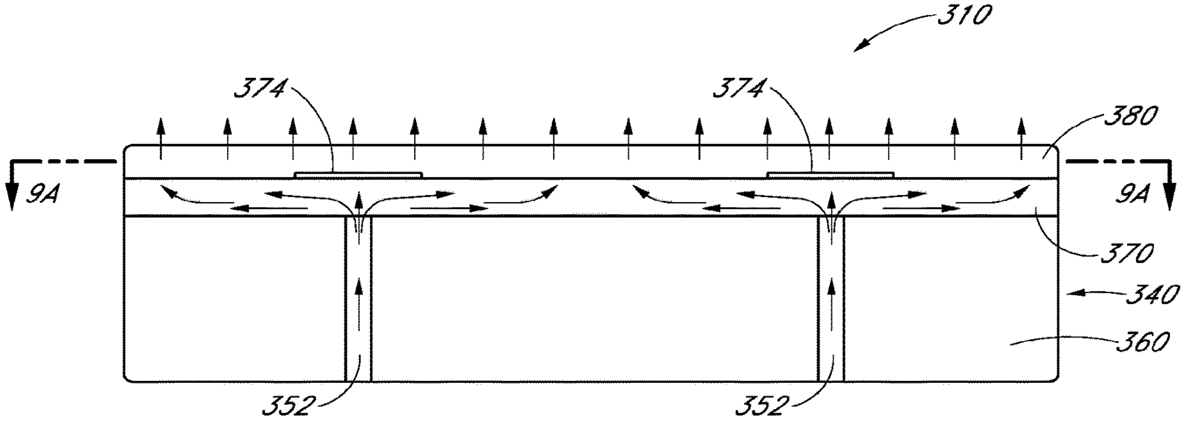
FIG. 9B schematically illustrates a cross-sectional view of the climate controlled bed of FIG. 9A.
Figure 9A:
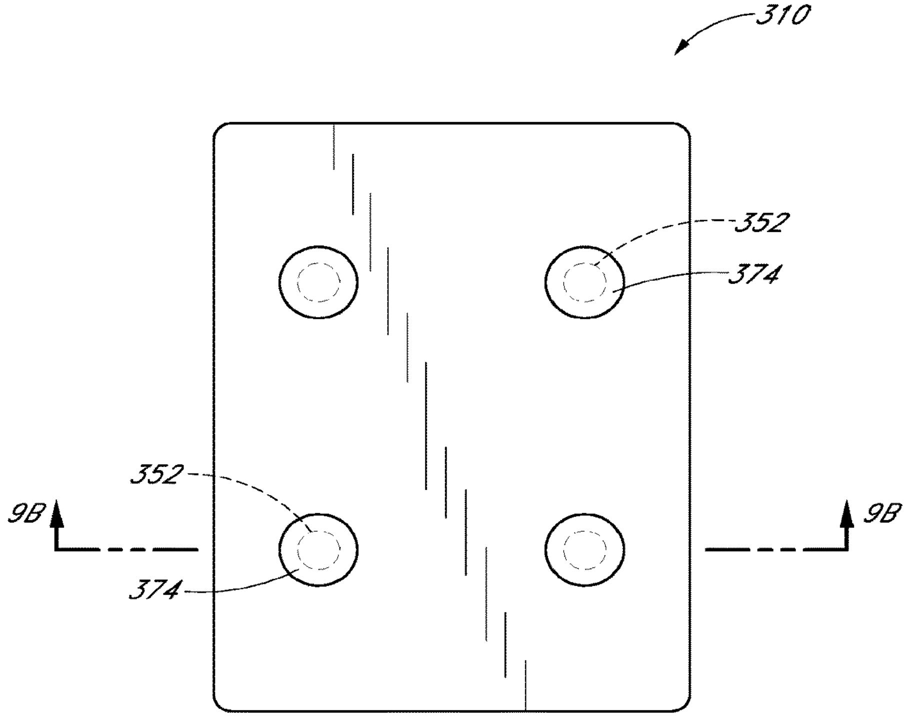
FIG. 9A schematically illustrates a top view of a climate controlled bed according to another embodiment.

Another embodiment of a climate controlled bed assembly 310 is schematically illustrated in FIGS. 9A and 9B. The depicted bed 310 is similar to the one illustrated and described herein with reference to FIGS. 8A and 8B. However, the upper portion 340 of the bed 310 in FIGS. 9A and 9B additionally includes flow diversion members 374 or diverters above each of the fluid passageways 52. In some embodiments, the flow diversion members 374 comprise a circular shape and are positioned between the fluid distribution member 370 (e.g., spacer, spacer fabric or material, etc.) and a comfort layer 380 (e.g., quilt layer). As shown, such flow diverters 374 can help at least partially deflect air or other fluid entering the fluid distribution member 370 in a generally lateral direction. Accordingly, the air or other fluid can be more evenly distributed within the fluid distribution member 370 before it exits toward the comfort layer 380 and/or other top layers of the bed 310. As discussed herein with respect to other embodiments, the flow diversion members 374 can be air permeable, partially air-permeable or non-air permeable, as desired or required.

Figure 10B:
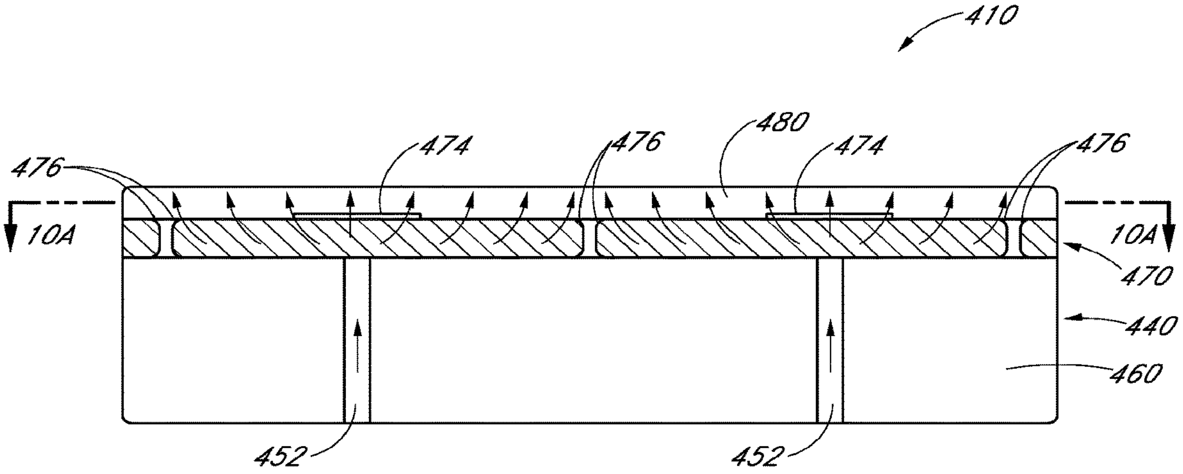
FIG. 10B schematically illustrates a cross-sectional view of the climate controlled bed of FIG. 10A.
Figure 10A:
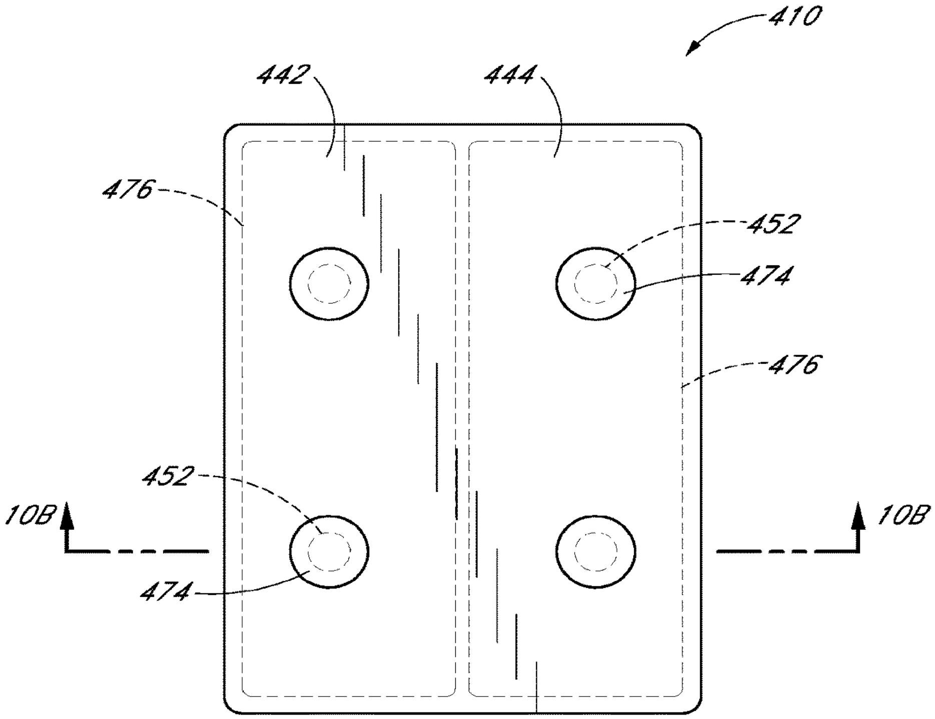
FIG. 10A schematically illustrates a top view of a climate controlled bed according to yet another embodiment.

With reference to FIGS. 10A and 10B, the upper portion 440 can be divided into two or more different climate control zones 442, 444 or areas. Accordingly, the climate control bed assembly 410 can be configured to separately cool and/or heat each zone 442, 444 according to the preferences of its occupant(s). For example, under such an arrangement, if two people are positioned on the bed 410, each person can separately control the level of heating, cooling and/or ventilation occurring along his or her side of the bed 410. Thus, in some embodiments, one user heats his or her side of the bed, while another occupant simultaneously cools or ventilates his or her side of the bed. In other arrangements, both users can heat (or cool or ventilate) their respective sides of the bed, but to varying extents.

In the embodiment illustrated in FIGS. 10A and 10B, separate heating and/or cooling zones 442, 444 can be created using sew seams, engineered stitching, other types of stitching, glue beads and/or similar features 476. For example, such sew seams, stitching or glue beads can be used to partially, completely or substantially completely maintain fluid flow within certain portions or areas of the fluid distribution member 470. Thus, in some arrangements, air or other fluid from one zone 442, 444 is generally not permitted to enter an adjacent zone 442, 444. In addition, as shown in FIG. 10B, seams, stitching, glue beads and/or similar flow blocking features used along the outer edges of a fluid distribution member 470 can help avoid the loss of fluid along the sides of the bed 410. In other arrangements, as discussed herein with reference to FIGS. 11A-11D, one or more fluid distribution members can be generally bounded or otherwise framed by a layer or portion that is air-impermeable or substantially air-impermeable. Accordingly, air or other fluid entering such a fluid distribution member is generally not permitted to be laterally conveyed past a particular outer border.

With continued reference to 10A and 10B, the individual climate-control zones or areas 442, 444 created by the sew seams 476, stitching, beads or the like are sized to cover most of the area of the bed 410. However, in other embodiments, the area over which the zones 442, 444 extend can be larger or smaller than illustrated in FIGS. 10A and 10B, as desired or required. Further, in other arrangements, a bed 410 can include more or fewer zones or areas 442, 444. In the depicted embodiment, air or other fluid is supplied to each zone 442, 444 by two passageways 452 in the core 460. Alternatively, more or fewer passageways 452 can be associated (e.g., in fluid communication) with each zone or area 442, 444. As discussed with reference to other embodiments disclosed herein, one or more of the passageways 452 may be separate from the core 460 and/or may be positioned along the outside of or generally around a core 460.

Air or other fluid can diffuse within the fluid distribution member 470 generally up to the outer limits formed by the seams or beads 476 (or any other fluid barrier, such as, for example, an outer frame as illustrated in FIGS. 11A-11D). In some embodiments, the sew seams, stitching, beads 476 or any other barrier are configured to allow some fluid to cross into an adjacent zone or area 442, 444. Thus, the seams, stitching, beads or other flow blocking features 476 of the fluid distribution member 470 may be configured to not completely prevent air or other fluids from traversing across the boundaries they generally form. However, if it is important to maintain the zones 442, 444 thermally distinct from each other, the fluid distribution member 470 can be configured to prevent or substantially prevent fluid flow across a particular seam, stitching, bead and/or other flow blocking device or feature 476. This can be especially important for the sew seams, stitching or beads 476 near the middle of the fluid distribution member 470 that separate adjacent zones 442, 444.

As illustrated in FIGS. 10A and 10B, a flow diversion member 474 or diverter can be generally positioned above each fluid passageway 452 of the core 460. Thus, as discussed herein with respect to other embodiments, a more even distribution of air can be achieved both within and out of each zone or area 442, 444. As with other arrangements, air exiting the top of each zone 442, 444 of the fluid distribution member 470 can be directed to and through one or more top layers 480 (e.g., quilt layer, other comfort layer, etc.).

The flow diversion and/or blocking techniques described with reference to the embodiments depicted and discussed herein, or equivalents thereof, may be incorporated into any other arrangement of a climate controlled bed assembly. For example, an upper portion of a climate controlled bed can include one or more sew seams, stitches, glue seams, borders and/or the like. As discussed, such features can help direct ambient and/or thermally-conditioned fluids to one or more target regions of the bed assembly. In some embodiments, a user is permitted to selectively control the cooling, heating and/or ventilation effect being provided to his or her portion of the bed assembly.

In addition, for any of the embodiments disclosed herein or equivalents thereof, a bed assembly can be selectively operated under one or more desired operational schemes. Such schemes can be based, at least in part, on a timer, one or more sensors (e.g., pressure sensors, temperature sensors, humidity sensors, etc.) and/or the like. Such operational schemes can help conserve power, enhance comfort to an occupant and/or provide other advantages. For example, the bed can be operated according to a desired operational scheme (e.g., with the temperature and/or flowrate of the fluid being delivered to or from an occupant varying based on the passage of time or some other condition). In other embodiments, the bed assembly is operated to maintain a desired temperature or feel along a top surface on which one or more occupants are situated. Thus, as discussed in greater detail herein, the bed can include one or more sensors (e.g., temperature sensors, humidity sensors, other sensors that are configured to detect a fluid property, etc.), a controller, a timer, a user input device and/or the like.

FIGS. 11A-11D illustrate another embodiment of an upper portion 540 of a climate controlled bed 510 having separate heating, cooling and/or ventilation zones 542, 544. As with other arrangements disclosed herein, the depicted upper portion 540 comprises a core 560, a fluid distribution member 570 and a comfort layer 580. However, as discussed in greater detail herein, the upper portion 540 can include more or fewer layers or portions and/or completely different layers or portions. In addition, the layers or portions can be differently arranged (e.g., the vertical order), as desired or required.

Figure 11A:
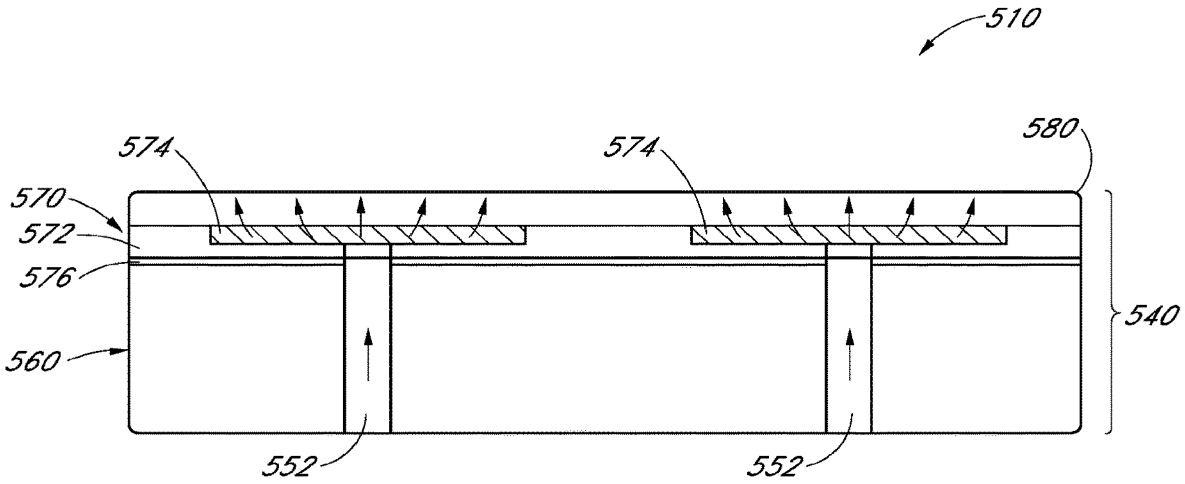
FIG. 11A schematically illustrates a cross-sectional view of a climate controlled bed according to another embodiment.
Figure 11B:
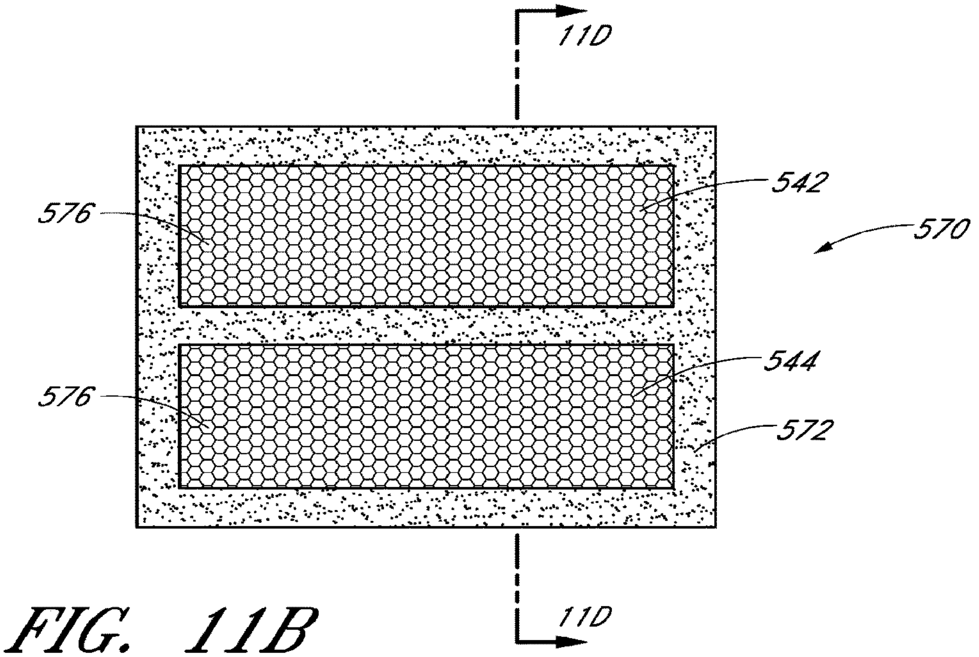
FIG. 11B illustrates a top view of a fluid distribution member of the climate controlled bed of FIG. 11A.
Figure 11C:
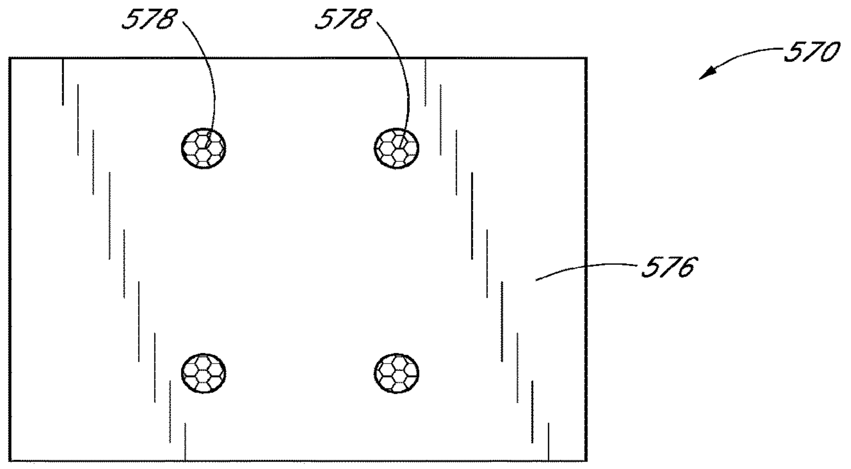
FIG. 11C illustrates a bottom view of a fluid distribution member of the climate controlled bed of FIG. 11A.
Figure 11D:
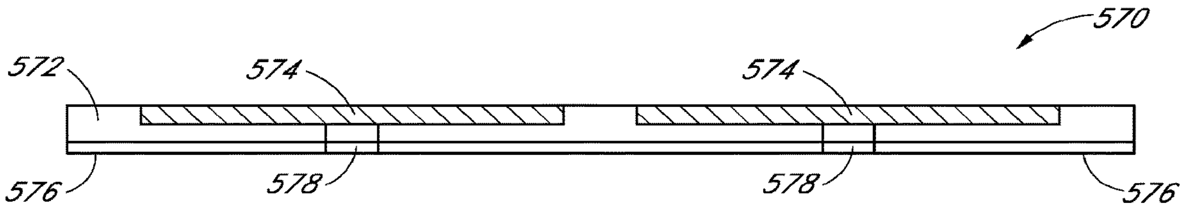
FIG. 11D illustrates a cross-sectional view of a fluid distribution member of the climate controlled bed of FIG. 11A.

With continued reference to FIGS. 11B-11D, the fluid distribution member 570 can include a base portion 572 or frame that is configured to be non-air permeable or substantially non-air permeable, especially when compared to the adjacent inlay portions that comprise the climate control zones or areas 542, 544. According to some embodiments, the base portion 572 comprises closed cell foam and/or any other material having relatively high back pressure properties (e.g., dense foam, other types of foam, fabric, film, etc.). As shown, the fluid distribution member 570 can include one, two or more openings or recesses along its top surface into which inlay portions or members 574 may be positioned. The inlay portions 574 can include a spacer (e.g., spacer fabric) and/or other air-permeable material that is configured to help distribute air within the recess of the base portion 572. In some arrangements, the inlay portions or members 574 are sized, shaped and otherwise configured to snugly or substantially snugly fit within the recesses of the base portion 572. Alternatively, the inlay portions or members 574 can extend across only a portion of the recesses. Further, the inlay portions or members 574 can be secured to the base portion 572 using adhesives, fasteners and/or any other device or method.

For any climate controlled bed assemblies disclosed herein, or equivalents thereof, in accordance with certain embodiments, as illustrated in FIG. 11D, the recesses extend only partially through the depth of the fluid distribution member 570. However, in other arrangements, the recesses extend across the entire depth of the fluid distribution member 570. As a result, the inlay portions or members 574 can be configured to have substantially the same depth or thickness as the fluid distribution member 570 into which they are secured.

According to some embodiments, the fluid distribution member 570 additionally comprises a carrier layer 576 (e.g., fabric, film, etc.) or other member along its bottom surface. Such a carrier layer 576 can be air impermeable or substantially air impermeable, and thus, help prevent or reduce the likelihood of air or other fluid from undesirably escaping the upper portion 540 through the bottom of the fluid distribution member 570. Accordingly, the base portion 572 and/or the carrier layer 576 can include one or more openings 578 through which air or other fluid being conveyed into the inlay portions 574 of the fluid distribution member 570 may pass. However, in embodiments where the recesses extend through the entire depth of the fluid distribution member 570, such openings 578 may not be present.

Once within the inlay portions 574, air or other fluid can diffuse laterally within some or all of the fluid distribution member, before being directed toward and through one or more layers positioned above the fluid distribution member 570. For example, in the embodiment illustrated in FIGS. 11A-11D, the air or other fluid passes through a comfort layer 580 before exiting the top the bed 510. As discussed herein, the upper portion 540 can include additional comfort layers and/or any other layers or members. Such additional layers or members can be positioned above and/or below the fluid distribution member 570, as desired or required. Further, as noted above, the outer frame or border created by the shape of the base portion 572 can help confine air or fluid within a specific inlay portion 574, and thus, a target area of the bed.

Accordingly, a bed 510 can advantageously include one, two or more separate climate control zones 542, 544, allowing a user to selectively heat, cool and/or ventilate one or more areas of the bed 510 according to his or her own preferences. Each zone 542, 544 can be in fluid communication with one or more fluid modules (e.g., fan, blower, other fluid transfer device, thermoelectric device, convective heater, etc.). For example, as discussed herein with respect to other embodiments, the fluid modules can be positioned within or otherwise incorporated into an interior space of a foundation or other lower portion of the bed. For example, as discussed herein with reference to FIG. 14, the various components of a climate control system can be secured to a backer board 110 or other rigid or semi-rigid surface of the foundation). Such integration of the various climate control components of a bed assembly can provide certain advantages, including, without limitation, facilitating manufacture, shipping, assembly and installation, reducing costs, simplifying the overall design of the system and/or the like.

Further, as illustrated and discussed with reference to other arrangements disclosed herein, the fluid modules can be placed in fluid communication with one or more fluid distribution members 570 (e.g., spacer fabrics, porous foam, open lattice structures, etc.) using one or more passageways routed through, around or near the upper portion 540 (e.g., the core 560, other layers, etc.). According to certain embodiments, each climate control zone 542, 544 can be advantageously configured to receive thermally-conditioned and/or ambient air or other fluid from one, two or more different fluid modules (e.g., a blower or other fluid transfer device, a thermoelectric device, a convective heater, etc.), as desired or required. Alternatively, a fluid module can be adapted to provide ambient and/or thermally conditioned air or other fluid to one, two or more different zones 542, 544 of a bed.

With continued reference to FIGS. 11A-11D, a bed 510 can include a total of four passageways 552 that are routed through an interior portion of the core 560. In the illustrated embodiment, each inlay portion 574 (e.g., spacer, spacer fabric or other material) is configured to receive air or other fluid from two passageways 552. However, in other arrangements, an inlay portion 574 can be in fluid communication with more or fewer passageways 552.

Figure 11E:
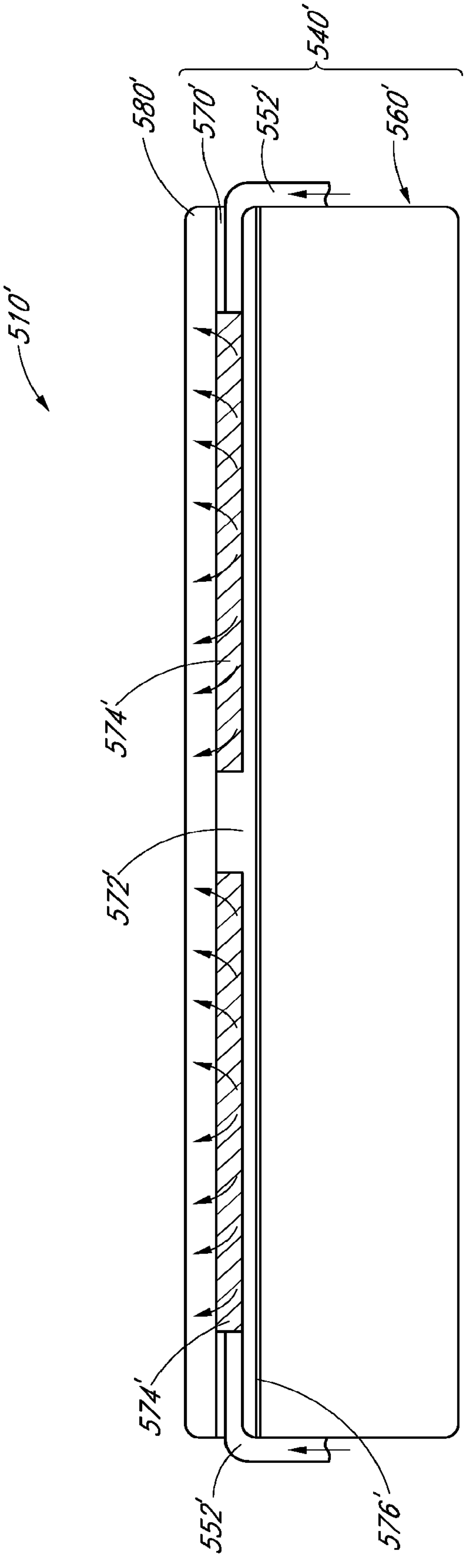
FIG. 11E schematically illustrates a cross-sectional view of the climate controlled bed according to a different embodiment.

As illustrated in FIG. 11E, air or other fluid can be directed to a fluid distribution member 570' using one or more exterior passageways 552'. For example, an externally routed passageway 552' can be used to place each inlay portion 574' (e.g., spacer, spacer fabric or other material, etc.) of the fluid distribution member 570' in fluid communication with one or more fluid modules (not illustrated). Such configurations help eliminate the need for passageways that are routed through an interior of the core 560' or other region of the upper portion 540'. As a result, the manufacture, assembly and/or other activities related to providing a climate controlled bed assembly can be simplified. In the depicted embodiment, a separate external passageway 552' is used to deliver ambient and/or thermally conditioned fluid to each inlay portion 574'. However, in other embodiments, a passageway 552' can be configured to supply air or other fluid to two or more different inlays 574' or other portions of the bed 510'. Further, two or more passageways 552' can be placed in fluid communication with a single inlay 574'. As with other arrangements illustrated and described herein, the upper portion 540' depicted in FIG. 11E can include one or more other layers (e.g., quilt or comfort layer 580') positioned above and/or below the fluid distribution member 570'.

According to other arrangements, a climate controlled bed assembly can include a fluid distribution member that comprises one or more internal channels or other conduits through which air or other fluid may be directed. This can help distribute fluids to one or more desired portions of the bed assembly.

Figure 12A:
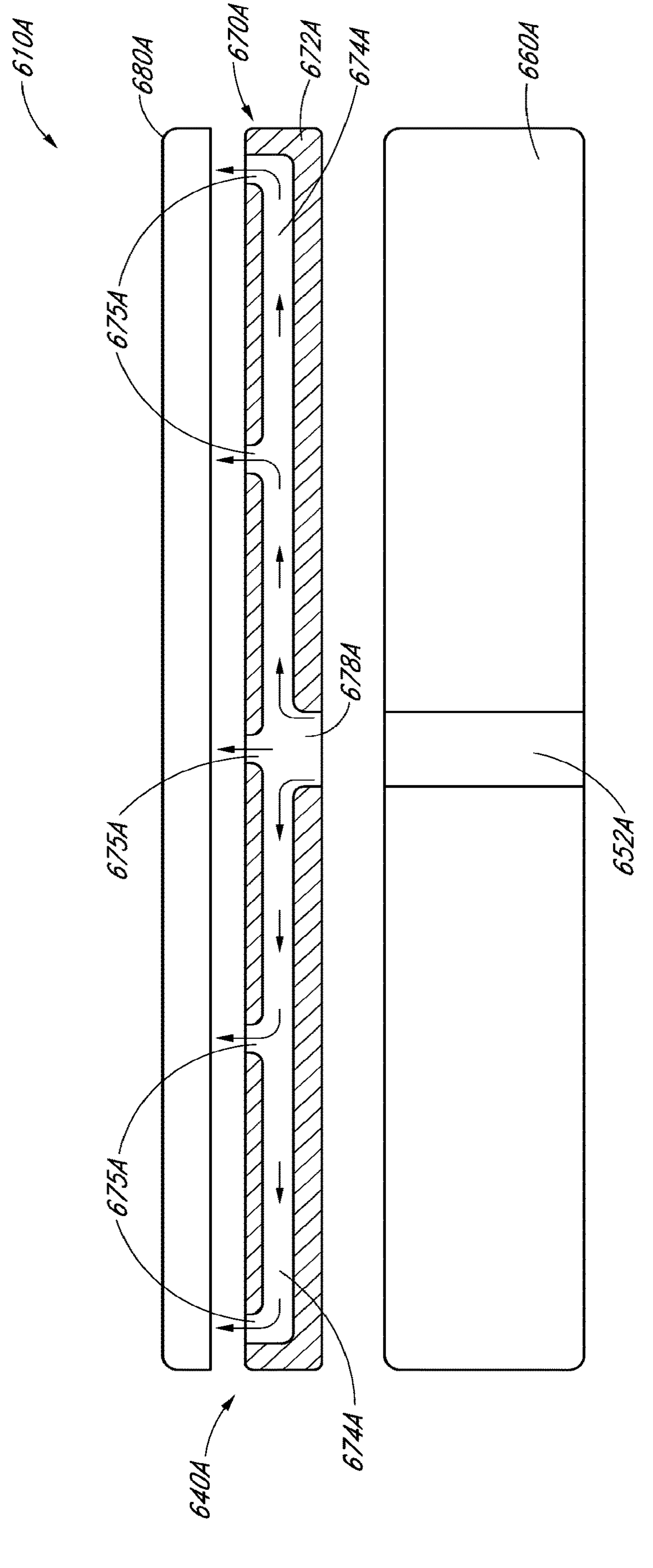
FIG. 12A schematically illustrates a cross-sectional view of a fluid distribution member comprising an internal channel according to one embodiment.

One embodiment of a climate controlled bed 610A having such a fluid distribution member 670A is schematically illustrated in FIG. 12A. As shown, the fluid distribution member 670A can include an inlet 678A that is in fluid communication with one or more channels 674A, recesses or other areas within the fluid distribution member 670A through which fluids may pass. In the depicted arrangement, the fluid distribution member 670A comprises a plurality of openings 675A that are in fluid communication with the internal channels 674A.

As a result of such a configuration, air or other fluids delivered through the inlet 678A and the channels 674A can be distributed toward the top of the bed (e.g., through a quilt or comfort layer 680A, other layers or portions of a mattress, etc.). The quantity, shape, size, location, spacing and other details of the inlet 678A, channels 674A, openings 675A and/or any other portion of the fluid distribution member 670A can vary, as desired or required by a particular application or use. In addition, as discussed herein with reference to the embodiment of FIG. 12B, a spacer (e.g., a spacer fabric) or other generally flow permeable material can be positioned within one or more locations of the channels 674A and/or other portion of the fluid distribution member 670A. Further, although not illustrated herein, an insert, liner, film or other material can be positioned along the channels 674A or any other portion of the fluid distribution member 670A. Such inserts can help reduce or prevent fluid losses across the main portion 672A of the fluid distribution member 670A. In addition, such members or components can help to structurally reinforce the internal channels and other passageways of the fluid distribution member 670A, especially when the bed 610A is being used. Thus, the size and shape of the passageways can be generally maintained to allow air or other fluids to pass therethrough.

Figure 12B:
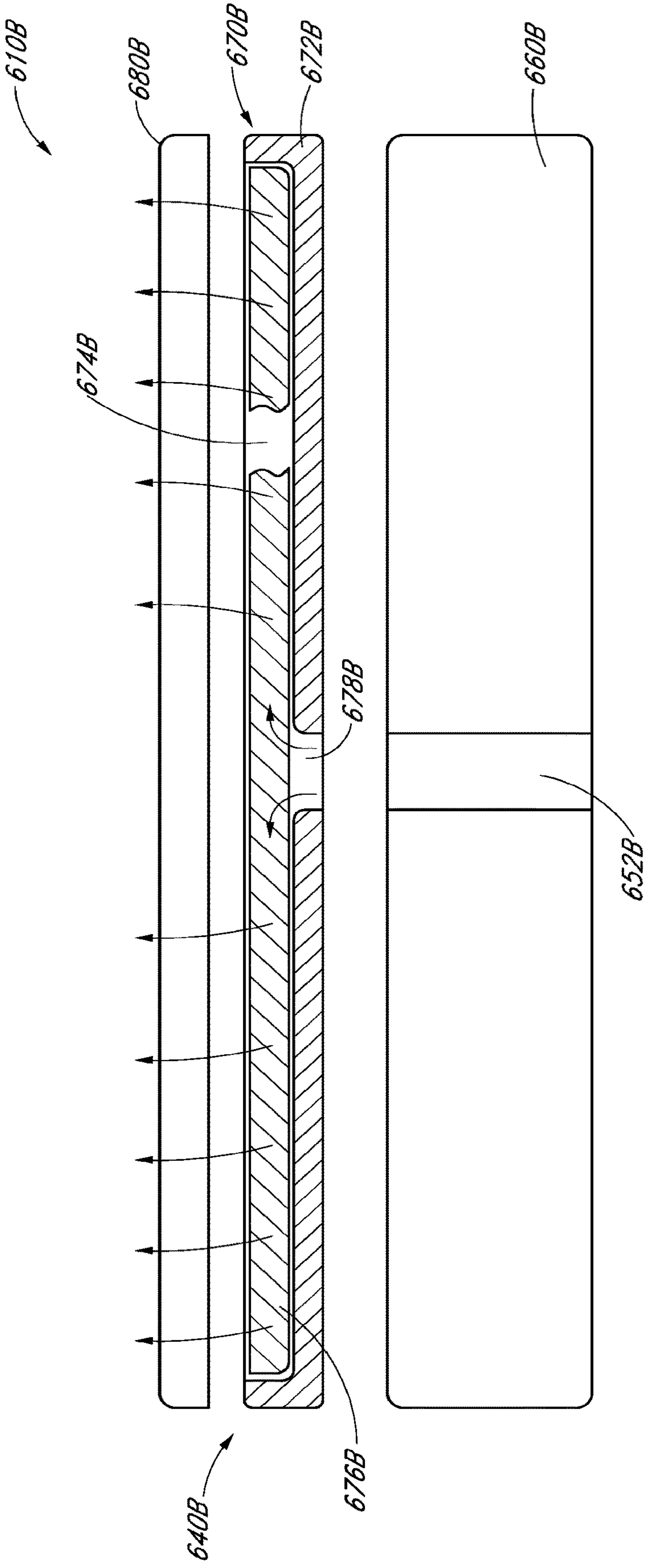
FIG. 12B schematically illustrates a cross-sectional view of a fluid distribution member comprising an internal channel according to another embodiment.

With reference to FIG. 12B, the fluid distribution member 670B can include a fluid inlet 678B and one or more recessed areas 674B. As shown, a spacer 676B (e.g., a spacer fabric, other air permeable material or member, etc.) can be partially or completely positioned within the recessed area 674B. The spacer 676B can help to structurally reinforce the recessed area 674B. In addition, the spacer 676B can help ensure that air or other fluids are more evenly distributed to one or more desired portions of the fluid distribution member 670B. As discussed with reference to other embodiments herein, the recessed area 674B or other portion of the fluid distribution member 670B can include an insert, liner, film or other member. Air or other fluid entering the inlet 678B can be distributed (e.g., vertically, laterally, etc.) through the spacer 676B. Once it exits through the top of the fluid distribution member 670B, the air or other fluid can be directed toward the top of the bed assembly 610B through one or more layers or members (e.g., a comfort layer 680B).

Figure 12C:
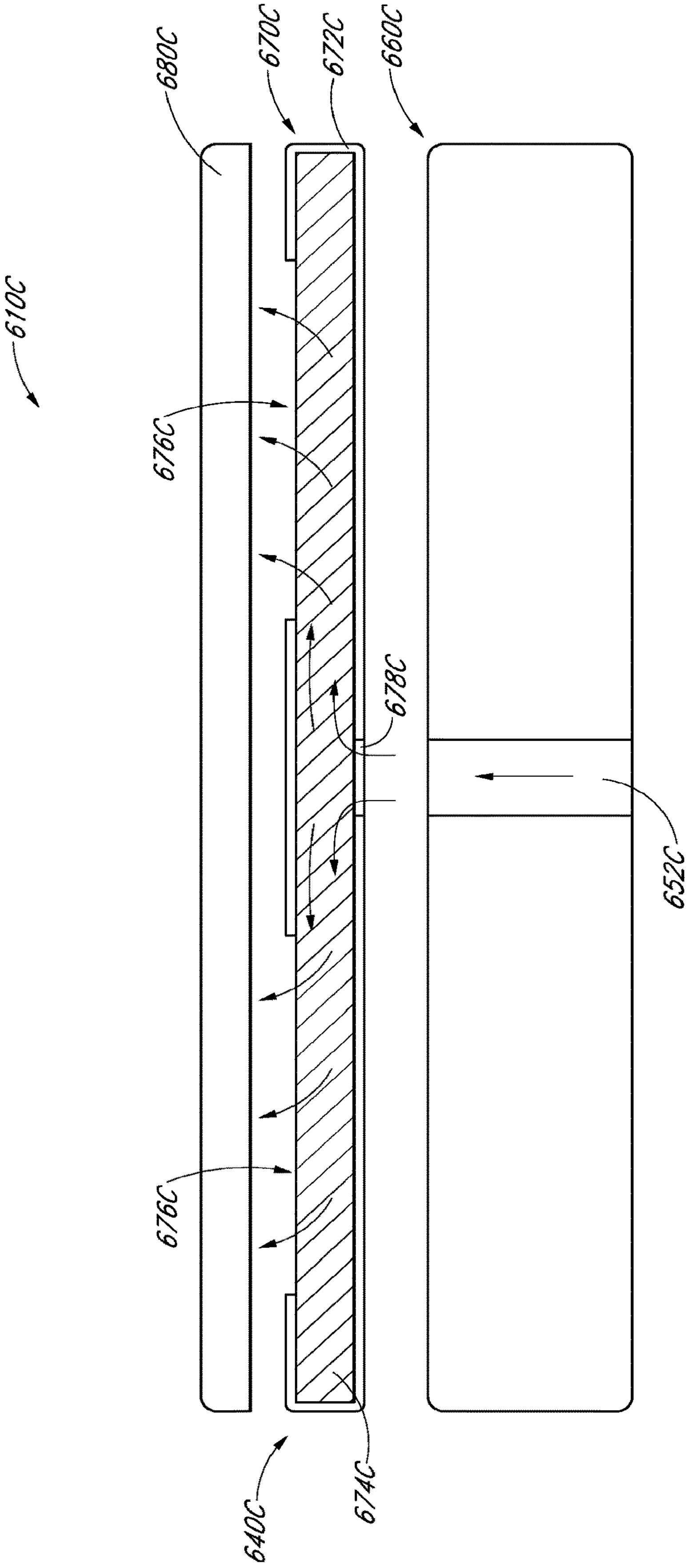
FIG. 12C schematically illustrates an exploded cross-sectional view of the climate controlled bed according to one embodiment.

FIG. 12C illustrates an exploded cross-sectional view of another embodiment of an upper portion 640C for a climate controlled bed 610C. As shown, the upper portion 640C can include a core 660C having one or more internal passageways 652C. In the depicted arrangement, the core 660C comprises only a single passageway 652C. However, it will be appreciated, that the core may include two, three or more passageways 652C, as desired or required by a particular application. The upper portion 640C can further include a fluid distribution member 670C and one or more other layers 680C (e.g., comfort layer) positioned on top of the core 660C.

With continued reference to FIG. 12C, the fluid distribution member 670C can include a spacer 674C and/or other air-permeable portion that is configured to more evenly distribute air or other fluid throughout the member 670C. In some embodiments, the spacer 674C (e.g., spacer fabric or other material) or other distribution portion is at least partially surrounded by an air-impermeable or substantially air-impermeable layer 672C or member. The air impermeable layer 672C can comprise a woven fabric, another type of fabric, a film, a laminate, a bag, other enclosure and/or the like.

In FIG. 12C, two openings 676C in the air impermeable layer 672C extend generally along the top surface of the fluid distribution member 670C. Thus, as shown, air or other fluid entering the fluid distribution member 670C (e.g., through one or more bottom inlets 678C) can be distributed within the spacer 674C or other distribution portion. Air or other fluid can exit the interior of the fluid distribution member 670C toward one or more top layers (e.g., a quilt or comfort layer 680C, additional fluid distribution members, other layers or members, etc.) through one or more openings 676C of the air impermeable layer 672C. Alternatively, as discussed with reference to FIG. 11E, air or other fluid can be delivered to the fluid distribution member 670C through one or more external passageways (not shown in FIG. 12C), either in lieu of or in addition to an internal passageway 652C.

Figure 13A:
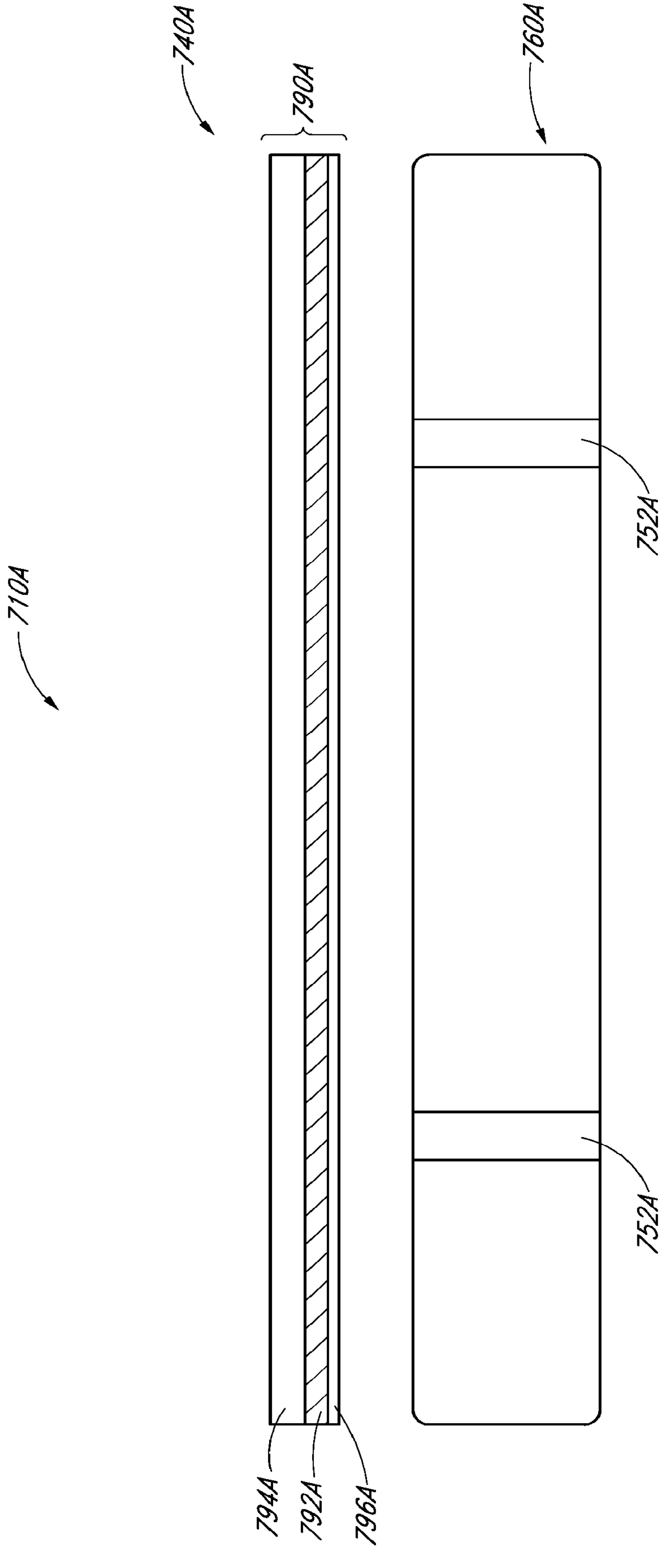
FIG. 13A schematically illustrates an exploded cross-sectional view of the climate controlled bed according to another embodiment.

FIG. 13A illustrates an embodiment of a climate controlled bed assembly 710A that includes a top member 790A that is adapted to be positioned on top of a core 760A. According to certain arrangements, the top member 790A comprises a fluid distribution portion 792A (e.g., a spacer, spacer fabric or other material, etc.), a bottom interface layer 796A and a top comfort layer 794A. The bottom interface layer 796A can comprise foam or another generally cushioned material that is configured to enhance the comfort level of an occupant.

In some embodiments, the various layers and/or components of the top member 790A are configured to be joined together as a unitary structure. For example, the fluid distribution portion 792A, the bottom interface layer 796A and the top comfort layer 794A can be secured to each other using adhesives, stitching, staples, other fasteners and/or any other device or method. As a result, the top member 790A can be collectively attached to a core 760A to facilitate assembly of the upper portion 740A. In some arrangements, the top member 790A is configured to be fluid communication with one or more passageways 752A of the core 760A when the top member 790A is secured to the core 760A.

In other arrangements, the top member 790A includes additional or fewer layers or portions, as desired or required. For example, the top member 790A can comprise one or more additional top layers (e.g., comfort layers). Alternatively, the top member 790A may not include the bottom interface layer 796A, so that the fluid distribution portion 792A (e.g., spacer or other material) directly contacts a top surface of the core 760A.

It will be appreciated that in any of the embodiments disclosed herein, including those illustrated in FIGS. 1A-35, one, some or all of the various layers or members of the lower portion (e.g., frame, support structure, covering material, etc.) and/or the upper portion (e.g., core, fluid distribution member or portion, comfort layers, interface layers, etc.) can be attached to each other using adhesives, stitching, staples, other fasteners, etc. Consequently, each of the upper portion and the lower portion can be provided as a single member or two or more separate members. For example, in some arrangements, a top member 790A having a unitary structure, such as the one discussed herein with reference to FIG. 13A, may be provided to a buyer, assembler or other party who may subsequently secure it to a core 760A or other portion of the bed assembly 710A. In other embodiments, a complete or substantially complete upper portion (e.g., core, fluid distribution member, comfort layer, etc.) can be provided as a single structure for incorporation into a bed assembly. Alternatively, the various layers, members or portions can be provided to others as separate items that will be later incorporated into a climate controlled bed assembly.

Figure 13B:
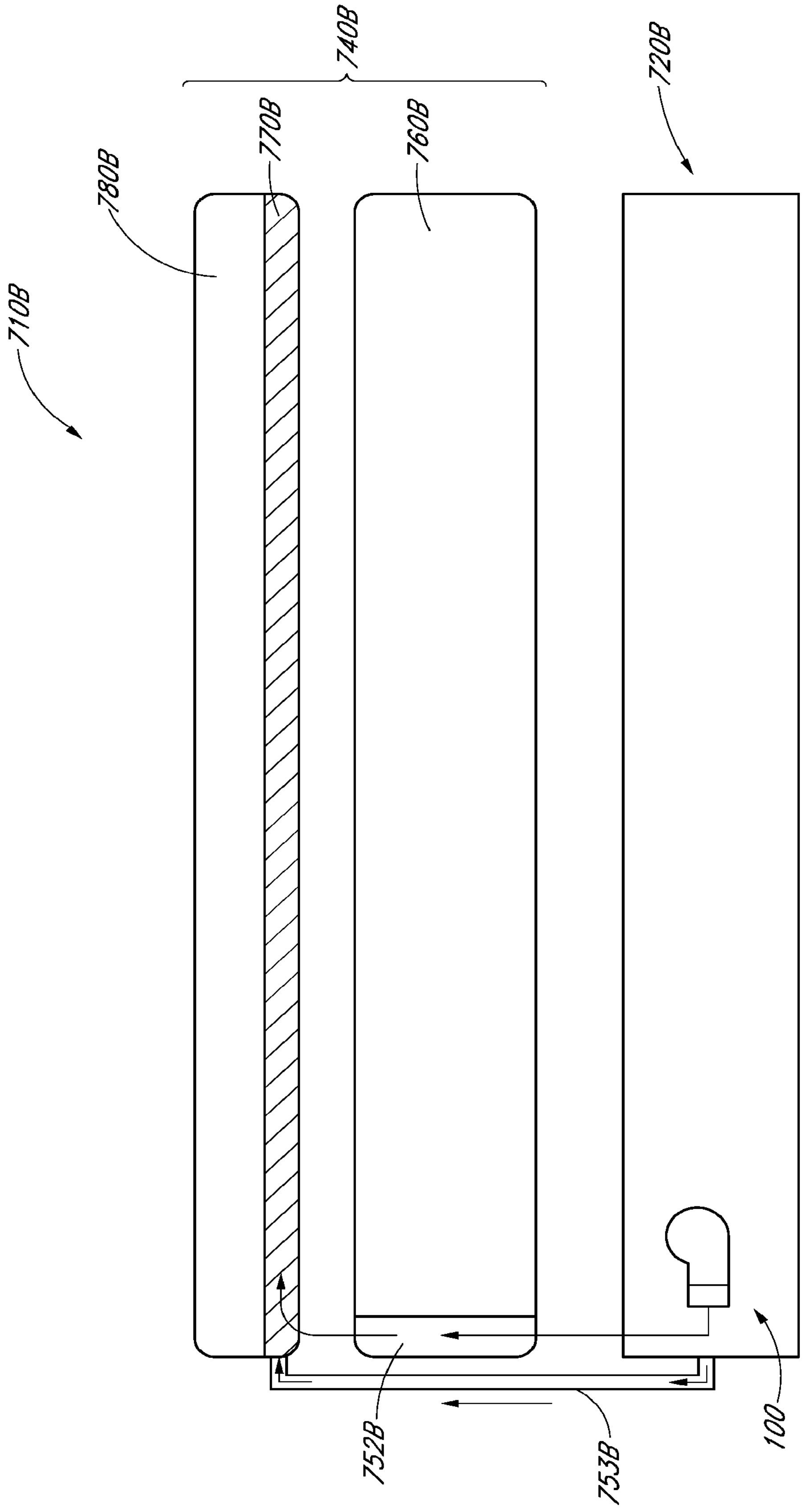
FIG. 13B schematically illustrates an exploded cross-sectional view of the climate controlled bed according to still another embodiment.

As illustrated in FIG. 13B, a climate controlled bed assembly 710B can include one or more passageways 752B that are positioned at or near the edge of the interior of the core 760B. Air or other fluid can be delivered from one or more fluid modules 100 toward the top of the bed 710B (e.g., the fluid distribution member 770B, the comfort layer 780B, etc.) through such a passageway 752B. In other embodiments, one or more fluid passageways 753B can be positioned along the outside of the core 760B and/or other portions of the bed 710B. Under such a configuration, the need for internal openings through the core 760B can be advantageously eliminated.

In any of the embodiments of a climate controlled bed disclosed herein, including those illustrated and discussed with respect to FIGS. 1A-35, the upper portion and/or the lower portion can comprise one or more covering layers or materials. As discussed, the core, the fluid distribution members and the comfort layers can be secured to each other using adhesives, stitching, fasteners and/or other connection method or device. Further, some or all of these components or portions can be selectively wrapped by one or more layers of fabric, bags or other enclosures, other covering material and/or the like.

For additional details regarding climate controlled bed assemblies, refer to U.S. patent application Ser. No. 11/872,657, filed Oct. 15, 2007 and published as U.S. Publication No. 2008/0148481, the entirety of which is hereby incorporated by reference herein. One or more of the components, features and/or advantages of the embodiments discussed and/or illustrated herein can be applied to any of the specific embodiments disclosed in U.S. patent application Ser. No. 11/872,657, and vice versa.

Figure 14:
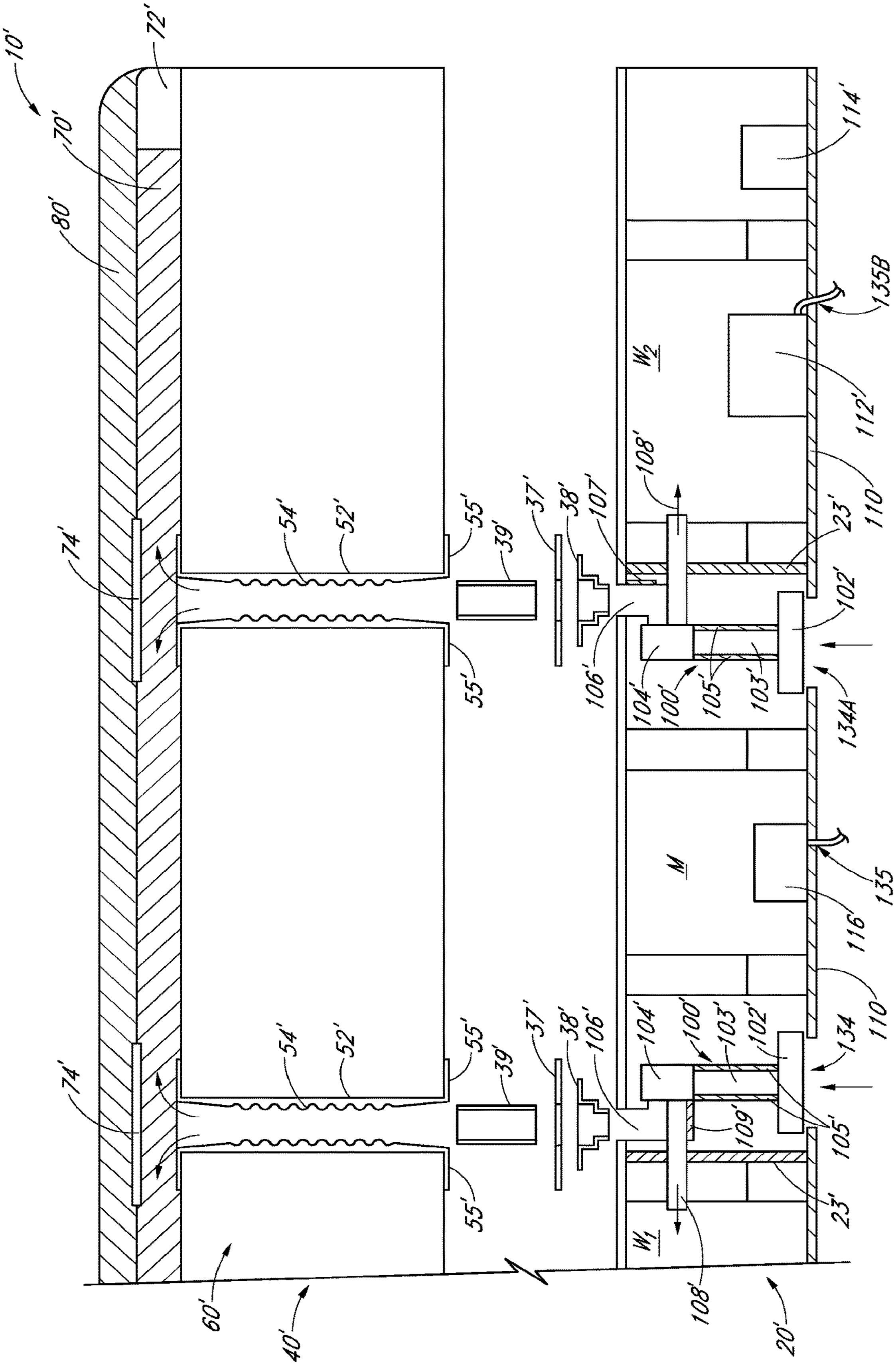
FIG. 14 illustrates an exploded cross-sectional view of a climate controlled bed according to another embodiment.

FIG. 14 illustrates a partial cross-sectional view of another embodiment of a climate control bed assembly 10' having an upper portion 40' (e.g., mattress) and a lower portion 20' (e.g., foundation, box spring, etc.). As shown, the upper portion 40' comprises a quilt or comfort layer 80' and a fluid distribution member 70' positioned above a core 60' (e.g., foam, other filler material, springs, etc.). As discussed herein with reference to other embodiments, the core 60' can include one or more internal passageways 52' that generally extend from the bottom of the upper portion 40' to the fluid distribution member 70' (e.g., spacer fabric) situated on top of the core 60'. In certain embodiments, as illustrated in FIG. 14, an insert 54' (e.g., bellowed conduit) is positioned within a passageway 52' to help ensure that fluid entering the upper portion 40' does not inadvertently leak or escape prior to entering the fluid distribution member 70' or other layer or region of the mattress 40' (e.g., through the walls of the passageways 52', the interface between the upper and lower portions 40', 20', etc.).

With continued reference to FIG. 14, once air or other fluid enters the fluid distribution member 70', it may be distributed (e.g., laterally) so that it more evenly flows throughout a portion of the fluid distribution member 70'. In order to enhance this fluid distribution effect, a flow diversion member or diverter 74' can be positioned generally above the exit of each internal passageway 52' of the core 60'. As illustrated schematically in FIG. 14, the diverters 74' can be shaped, sized, positioned and otherwise configured to divert air or fluid laterally throughout at least a portion of the fluid distribution member 70'. Consequently, the use of diverters 74' can result in a more even cooling, heating and/or ventilation effect along the top surface of a climate control bed 10'.

According to certain embodiments, flow diverters 74' compose air-impermeable or partially air-permeable members that are generally positioned between the fluid distribution member 70' and the quilt or comfort layer 80' positioned above it. Thus, a diverter 74' can comprise a piece of fabric, liner, rigid, semi-rigid or flexible materials and/or the like. In such arrangements, the flow diversion members 74' are relatively small in size and are only intermittently positioned over the flow distribution member 70'. However, in other embodiments, a bed can include one or more flow diversion members that extend over most or all of the surface area of the flow distribution member 70'. For example, in one arrangement, the diverter comprises a layer or member (e.g., a comfort layer, 80', a separate comfort layer or other type of layer having a plurality of fluid openings, etc.) that is generally positioned above the fluid distribution member 70'.

With continued reference to FIG. 14, in order to help prevent air or other fluid from escaping through the side of the bed 10', the fluid distribution member 70' can include a base or frame 72' along its edges. Alternatively, as discussed in greater detail herein, side losses can be prevented or decreased by using sew seams, stitching, glue beads and/or any other flow blocking member or features. Further, the upper portion 40' can include one or more other layers or members to provide additional comfort and/or other benefits to a user. For example, an additional quilt or comfort layer (not shown in FIG. 14) can be positioned below the fluid distribution member 70' either as a separate layer or incorporated as part of the core 60'.

As illustrated in FIG. 14, one or more intermediate members 37' can be positioned generally between the upper and lower portions of an environmentally-controlled bed assembly. For example, an intermediate member 37' can comprise a felt scrim having a central opening. In some arrangements, the felt scrim 37' is approximately 2 mm thick and 155 mm (6.1 inches) in diameter. In other embodiments, the felt scrim or other intermediate member 37' includes a different shape, such as, for example, square, diamond, other rectangular, other polygonal, oval, irregular and/or the like. As shown, the intermediate member 37' can include a central opening, which in some embodiments, is shaped and sized to generally match or otherwise correspond to the opening size of the adjacent components of the climate control bed (e.g., the flange 38', the interconnecting conduit 39', the insert 54' positioned within the passageway 52', etc.). In other embodiments, the shape, size and other characteristics of the intermediate member 37' can vary, as desired or required. The intermediate member 37' can be configured to secure to an adjacent surface of the upper portion and/or the lower portion of the bed assembly using adhesives (e.g., an adhesive strip), fasteners and/or any other connection device or method.

Regardless of their exact shape, size and configuration, such scnms or other intermediate members 37' can offer one or more benefits and advantages to an environmentally-controlled bed assembly. For example, an intermediate member 37' can be configured to cover the flanged end 55' of the insert 54' and secure it to the adjacent lower surface of the upper portion 40'. Thus, the intermediate member can help ensure that the insert 54' properly extends between the opposing ends of the passageway 52', thereby preventing undesirable pull-through of the insert 54' into the passageway 52'. In addition, such a scrim or other intermediate member 37' can help reduce the likelihood of leaks as conditioned and/or unconditioned fluids are conveyed from a fluid module toward an occupant. For instance, the intermediate member 37' can be configured to prevent or substantially prevent conditioned air from retrograde flow (e.g., through the insert toward the interface between the upper and lower portions of the bed assembly, through the passageways, etc.).

With continued reference to the cross-sectional view of FIG. 14, the lower portion 20' (e.g., foundation) can include a backer board 110 or other panel member to which one or more components (e.g., fluid module 100', power supply 112', control unit 114', humidity sensor 116', other types of sensors, etc.) of the climate control bed assembly 10' can be secured. In FIG. 14, the backer board 110 is incorporated into a lower end of the foundation 20' and extends the entire length of the bed 10'. However, in other arrangements, the backer board 110 can have a different location or orientation within the foundation or other lower portion 20'. Further, the backer board 110 can be configured to extend only partially across an area of the lower portion 20' and the bed 10'.

The backer board 110 can have a generally rigid, semi-rigid and/or flexible construction, as desired or required by a particular bed. For example, in certain arrangements, the backer board 110 comprises plastic and/or other rigid or semi-rigid materials that are configured to form an outer panel or wall along one or more sides of the foundation 20'. However, in other embodiments, the backer board 110 is positioned within an interior region of the foundation 20'. In such arrangements, the lower portion 20' can include a separate panel (e.g., comprising plastic, wood or other rigid, semi-rigid or flexible materials) or covering member (e.g., fabric) in order to generally shield an interior space of the lower portion.

Regardless of its exact shape, size, location and orientation within a portion of a bed and/or other of its characteristics, a backer board 110 can offer certain advantages. For example, the construction, installation and assembly of one or more components (e.g., fluid modules, control modules or units, power supplies, sensors, etc.) of a climate control system can be facilitated, as such components can be secured to the backer board 110 prior to incorporating the backer board 110 into the foundation 20'. Relatedly, a separate backer board 110 configuration can assist in the storage, shipping and transportation of a climate controlled bed assembly. Further, in embodiments where the backer board 110 can be selectively removed from the foundation or other portion of the bed, the repair and maintenance of the bed can be facilitated. For instance, when the climate control system is in need of service, the backer board 110 can be removed and the necessary repairs, servicing and/or other adjustments can be conveniently performed away from the location of the bed assembly (e.g., in a remote service facility, in another room, etc.). As noted herein, the backer board 110 can be positioned along the bottom, top, side, interior and/or any other portion of the foundation 20' or lower portion. In other embodiments, the backer board 110 can be designed to be directly incorporated into a mattress or another type of upper portion 40' of a climate controlled bed. For example, the backer board can be adapted to generally form at least a portion of the lower surface of the mattress.

The backer board 110 can include one or more openings and/or other features adapted to accommodate the various components secured thereto. In the embodiment depicted in FIG. 14, for example, the backer board 110 comprises openings 134 at the inlet of each fluid module 100'. In addition, the backer board 110 can include openings 135A, 135B through which cables and/or other hardwired connections may pass. Further, although not illustrated herein, the backer board 110 can be advantageously configured to better accommodate the various components that are attached thereto. For example, the backer board 110 can comprise recesses (e.g., that are sized and shaped to receive a fluid module, power supply, etc.), tabs, slots, flanges, threaded connections and other features configured to more easily accommodate screws, fasteners and/or other connection devices and/or the like.

With continued reference to FIG. 14, the foundation 20' can include one or more thermal insulation baffles 23' or fluid dams that are intended to generally separate the interior of the foundation 20' into two or more distinct regions. In the depicted arrangement, the foundation 20' comprises a total of two fluid modules 100' that are adapted to selectively provide thermally conditioned and/or ambient air through corresponding passageways 52' of the mattress or upper portion 40'. When the bed is operating under a “cooling” mode, the main outlet conduits 106' downstream of the respective fluid modules 100' convey relatively cold air, while the waste outlet conduits 108' convey relatively hot air. As shown in FIG. 14, the main outlet conduits 106' remain within a main zone M, an area generally defined between the insulation baffles 23', before exiting the top of the foundation 20'.

Further, the fluid conveyed by the waste outlet conduits 108' is directed across the insulation baffles 23' and into separate waste zones W1, W2 located on either side of the main zone M. In other embodiments, a foundation or lower portion 20' can include more or fewer main zones M and/or waste zones W1, W2, as desired or required. For example, in one arrangement, a lower portion includes only one main zone and only one waste zone. Thus, the main fluid outlet and/or the waste fluid outlet downstream of the fluid modules can be directed into a single zone.

As a result of the thermal baffles 23' or dams, the temperature within each zone M, W1, W2 of the foundation 20' can vary during operation of the bed’s climate control system. For example, as discussed above, when cold air is being supplied to the upper portion 40', the main portion is relatively cold and the waste portions W1, W2 are relatively hot. Since the waste fluid is directed away from the main outlets 106' (e.g., toward the waste zones W1, W2), the heat of the waste fluid is generally not permitted to affect the temperature of the relatively cold main fluid. Likewise, under such a configuration, when the bed is operating under a “hot” mode, the amount of heat that is lost from the main outlet conduits 106' and the main zone M can be advantageously reduced, as the relatively cold air being conveyed through the waste outlet conduits 108' is generally not permitted to draw heat away from the main outlet conduits 106' and the main zone M. Accordingly, the efficiency of the thermal conditioning process occurring within the bed assembly can be advantageously improved.

In addition, it may be desirable to maintain separate “cold” and “hot” zones M, W1, W2 within the foundation in order to provide a desired operating environment for one or more components of the bed’s climate control system. For instance, depending on the anticipated mode or modes of operation for a particular bed assembly, the fluid modules 100', power supply 112', control unit 114', temperature sensors, humidity sensors 116', other types of sensors and/or the like may operate more efficiently or reliably when located in an environment having a specific ambient temperature. Relatedly, the useful life of such components can be increased if they are located within an environment having a particular temperature range.

In order to provide additional thermal shielding between the main and waste streams, the various fluid conduits 103', 106', 108' located within the foundation 20' can comprise one or more insulating materials 105', 107', 109' (e.g., foam or fiberglass insulation, other thermal insulation, etc.). For example, as illustrated in FIG. 14, the conduits 103' that place the blowers 102' or other fluid transfer devices in fluid communication with the corresponding thermoelectric devices 104' can include thermal insulation 105'. Further, one or more of the outlet conduits 106', 108' downstream of the fluid modules 100' can also be thermally insulated, as desired or required.

Figure 15A:
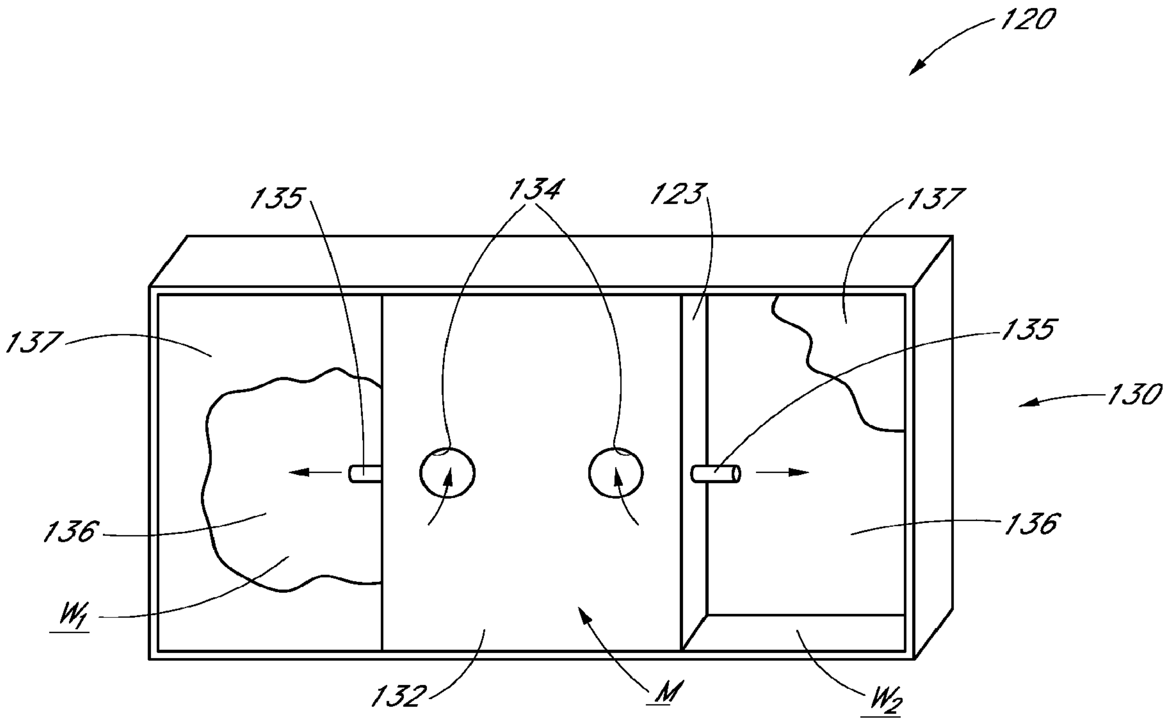
FIG. 15A illustrates a bottom perspective view of a foundation or lower portion according to one embodiment.
Figure 15B:
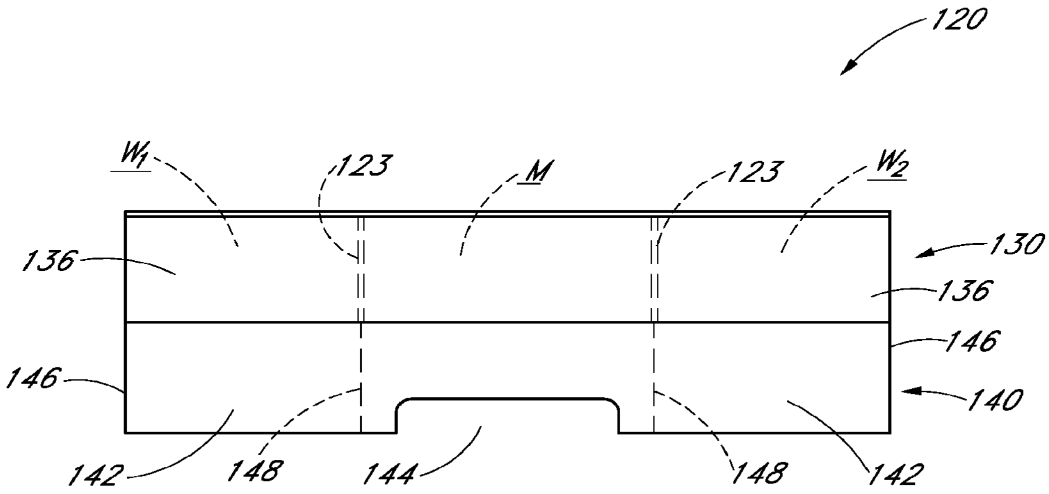
FIG. 15B illustrates a side view of the foundation of FIG. 15A having a thermal bed skirt according to one embodiment.
Figure 15C:
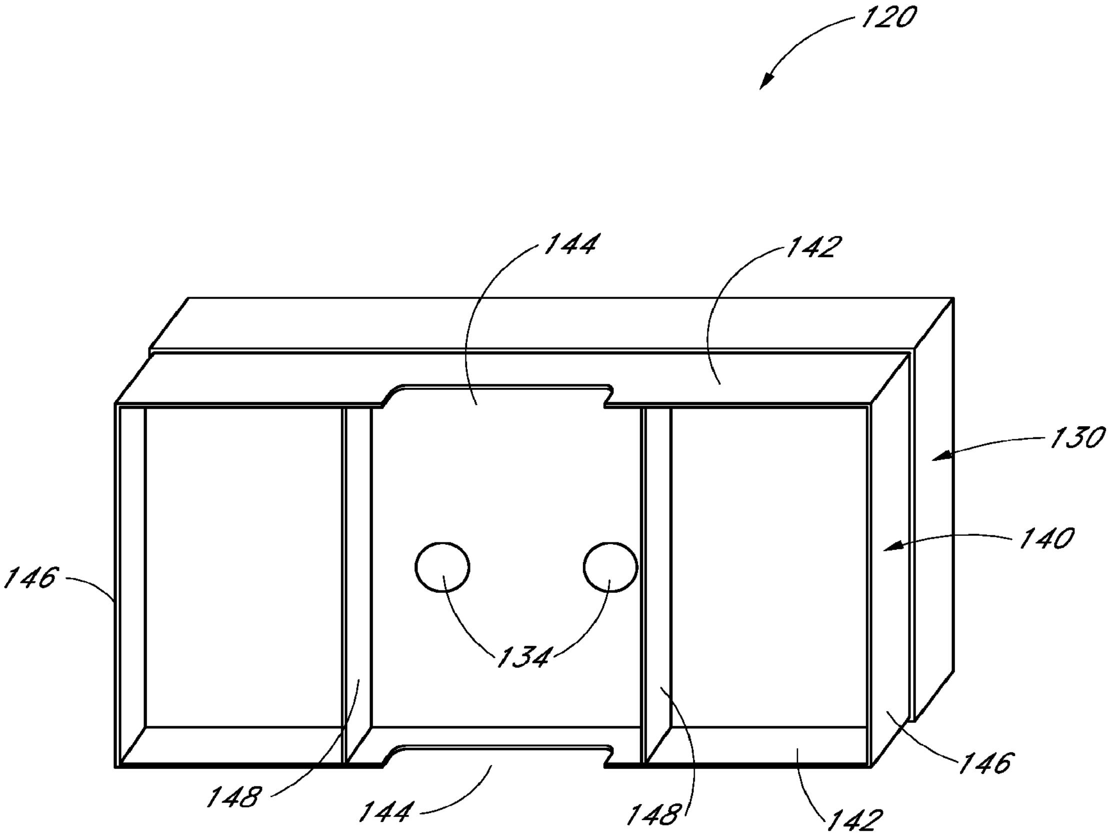
FIG. 15C illustrates a bottom perspective view of the foundation and thermal bed skirt of FIG. 15B.

FIGS. 15A-15C illustrate var10 us views of a lower portion 120 (e.g., foundation) of a climate controlled bed configured to maintain one, two, three or more thermally distinct zones. In addition, according to some arrangements, as discussed in greater detail herein, a foundation 120 comprises a thermal curtain or bed skirt 140 in order to help preserve such distinct thermal zones in the space immediately below the main portion 130 of the foundation 120.

With specific reference to FIG. 15A, a foundation 120 (or other lower portion) of a climate controlled bed assembly can comprise a main zone M or region in which the various components (e.g., fluid modules, power supply, control units, sensors, etc.) of the climate control system can be housed. As discussed with reference to FIG. 14, one or more panels, walls or other members that help to define the main zone M can include backer board. For example, in the depicted embodiment, the main lower panel 132 comprises a backer board, which is configured to receive one or more components of the climate control system along an interior surface. As shown, the backer board panel 132 can include openings 134 that are sized, shaped and configured to generally correspond to inlet of the fluid modules (e.g., fluid transfer devices) positioned within an interior of the foundation's main zone M. In some arrangements, as illustrated in FIGS. 15A and 15B, the foundation 120 also includes side panels 123, which, together with the main lower panel 132, help define the main zone M. The side panels 123 can comprise a rigid, semi-rigid and/or flexible member that is configured to physically and/or thermally isolate the main zone M from each of the adjacent waste zones W1, W2. For example, in some embodiments, such side panels 123 comprise one or more materials that have favorable fluid blocking and/or thermal insulation properties. As discussed herein with reference to FIG. 14, the waste air exiting the fluid modules can be directed out of the main zone M of the foundation into adjacent waste zones W1, W2 using one or more waste outlet conduits. In the embodiment of FIGS. 15A-15C, the waste outlet conduits 135 direct waste fluid into interior regions 136 of the foundation's waste zones W1, W2. In some arrangements, such interior regions 136 are defined by one or more panels and/or covering materials 137 (e.g., fabric layers, sheets, liners, etc.). For instance, in FIG. 15A, a covering material can include an air-permeable or generally air-permeable fabric. In other embodiments, the foundation 120 comprises one or more fluid outlets (not shown) through which air or other fluids can freely enter or exit the main zone M and/or the waste zones W1, W2.

In order to extend the thermal isolation zones below the structural portion 130 of the foundation 120, the foundation can include a thermal bed skirt 140 or curtain. One embodiment of a thermal bed skirt 140 is illustrated in FIGS. 15B and 15C. As shown, the skirt 140 can include a plurality of exterior and interior sections 142, 146, 148 that help divide the interior space of the skirt 140 into separate regions. The thermal skirt 140 or curtain can be configured to provide at least a partial barrier against fluid flow and/or heat transfer.

In the depicted embodiment, the separate regions generally align with the zones M, W1, W2 of the foundation's structural upper portion 130. For example, the interior sections 148 of the thermal skirt 140 or curtain are located directly or nearly directly below the side panels of the main zone M when the skirt 140 is properly secured to the foundation 120. Accordingly, ambient air can be drawn into the fluid modules (not shown), through recesses 144, notches or other cutouts along the bottom of the skirt 140 and the inlets 134 in the main lower panel 132. In certain arrangements, the interior sections 148 of the thermal skirt 140 are configured to prevent or reduce the likelihood of waste fluid (e.g., present within, below or near each of the waste zones W1, W2) from entering the main zone M (e.g., toward the inlets of the fluid modules). The thermal skirt 140 can be secured to adjacent portions of the foundation 120 using one or more connection methods or devices, such as, for example, stitching, adhesives, clips, hooks, staples and/or other fasteners and/or the like.

Figure 16A:
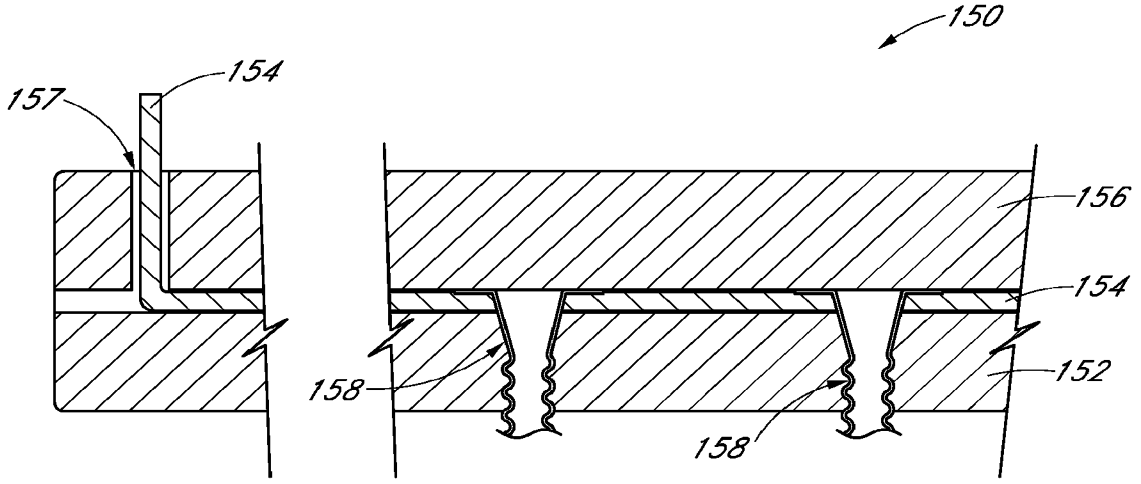
FIG. 16A illustrates a partial cross-sectional view of a climate controlled mattress according to one embodiment.
Figure 16B:
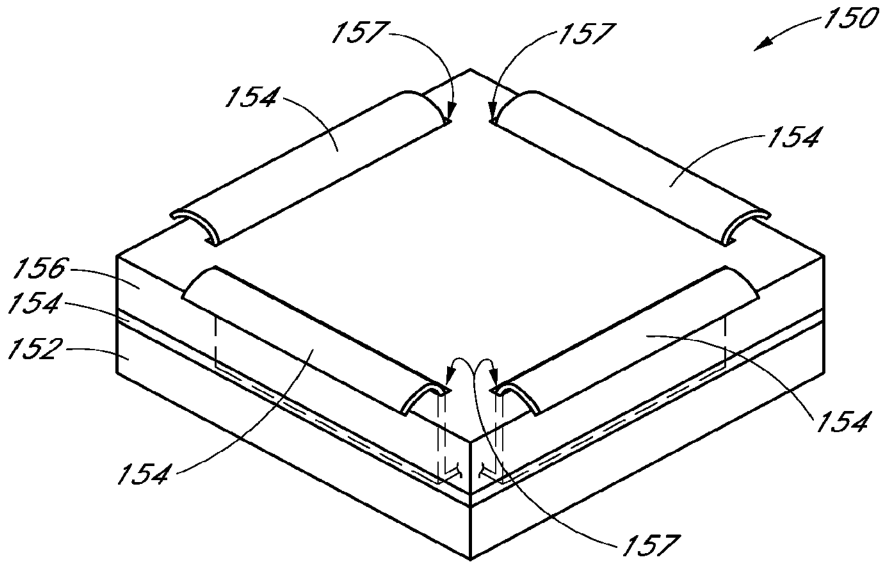
FIG. 16B illustrates a perspective view of the climate controlled mattress of FIG. 16A.

FIGS. 16A and 16B illustrate one embodiment of a mattress 150 (e.g., upper portion) configured for use with an environmentally-controlled bed assembly. As shown, the mattress 150 can include a bottom layer 152, a top fluid distribution layer 156 and a middle layer 154 positioned therebetween. According to one arrangement, the bottom layer 152 comprises foam, spacer fabric, a quilt or comfort layer, other filler materials, springs, air chambers and/or any other material or component, as desired or required for a particular design. Further, the middle layer 154 can include a sheet, film, fabric or any other material that is flexible and generally fluid impermeable. The middle layer 154 can be adapted to be cleanable (e.g., capable of being wiped down or otherwise sterilized) and reusable. In certain arrangements, the middle layer 154 is a sheet or layer comprising vinyl, other polymeric materials and/or any other synthetic or natural materials. Moreover, the upper layer 156 can include a spacer fabric, another fluid distribution member and/or other materials that are at least partially porous or air permeable. Alternatively, the upper layer 156 can be configured to permit fluids to be distributed therein and pass therethrough (e.g., using internal channels, pores, etc.), despite comprising one or more generally fluid impermeable materials.

According to certain embodiments, the upper layer 156 (e.g., spacer fabric) is adapted to be selectively separated and removed from the adjacent layers and portions of the mattress 150. Consequently, the upper layer 156 can be washed, and as discussed in greater detail herein, subsequently re-attached to the mattress 150. Alternatively, the upper layer 156 can be removed and replaced with a new upper layer 156. The middle layer 154 (e.g., vinyl sheet) can be advantageously cleaned (e.g., wiped down) or otherwise treated whenever the upper layer 156 is removed from the mattress 150. Thus, the middle layer 156 and the bottom layer 152 of the mattress can be reused multiple times, as they are unlikely to come in contact with the bed's occupant or any contaminants to which the bed may be exposed. Such a configuration can be particularly useful for medical beds and other applications where frequent cleaning of the bed is desired or required and/or where the bed is likely to cycle through multiple users over a specific time period.

In certain arrangements, the bottom and middle layers 152, 154 of the mattress 150 are secured to each other using one or more connection devices or methods, such as, for example, stitching, adhesives, clips, other fasteners and/or the like. Similarly, the fluid inserts 158 (e.g., bellowed ducts) that pass at least partially through the depth of the mattress 150 can be attached to the middle layer 154 (e.g., vinyl layer) using one or more connection methods or devices. As noted herein, according to some arrangements, the upper layer 156 (e.g., spacer fabric) is releasably attached to the adjacent layers or portions of the mattress 150 using one or more removable connections. For example, in FIGS. 16A and 16B, the upper layer 156 comprises a plurality of relatively narrow slits 157 or other openings along or near one or more of its outer edges. In the depicted embodiment, the upper layer 156 includes a total of four slits 157, one along each of its sides. However, the quantity, size, shape, location, spacing and/or other details regarding the slits 157 can vary, as desired or required.

With continued reference to FIGS. 16A and 16B, the slits 157 or other openings can be sized, shaped and otherwise adapted to receive a loose end of the middle layer 154 (e.g., sheet or film) therethrough. Thus, in order to secure an upper layer 156 (e.g., spacer fabric) to the mattress 150, one or more of the middle layer's free ends can be passed upwardly through corresponding slits 157 from the bottom of the upper layers 156. As illustrated in FIG. 16B, once all the free ends of the middle layer 154 have been properly passed through the corresponding slits 157, they may be folded (e.g., either toward or away from the center of the mattress) along the top surface of the upper layer 156. In other embodiments, the mattress 150 includes one or more additional devices or features that help ensure that the upper layer 156 does not separate from or inadvertently move relative to the adjacent portions and layers of the mattress 150 during use. For example, buttons, zippers, snap connections, hook and loop fasteners, other types of fasteners can be used to temporarily secure the upper layer 156 to the mattress 150.

Figure 17A:
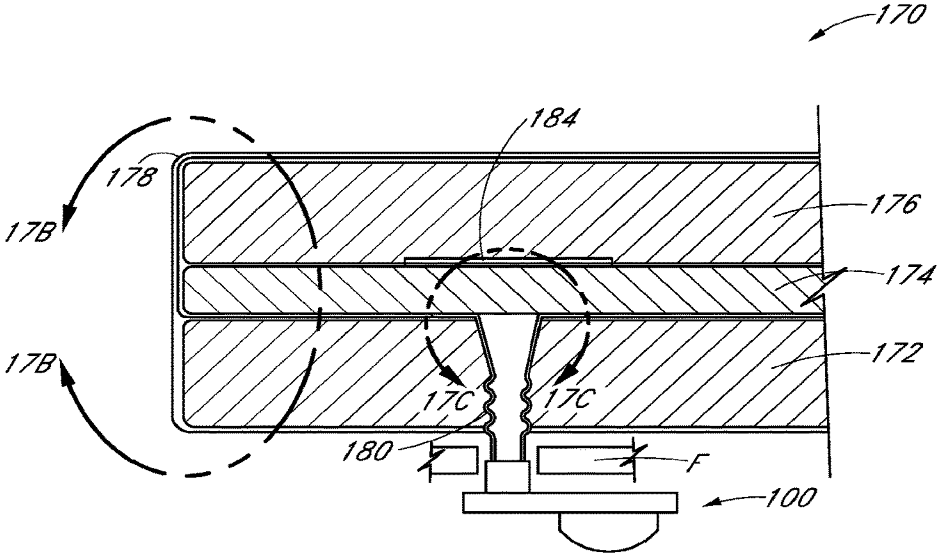
FIG. 17A illustrates a partial cross-sectional view of a climate controlled bed according to another embodiment.
Figure 17B:
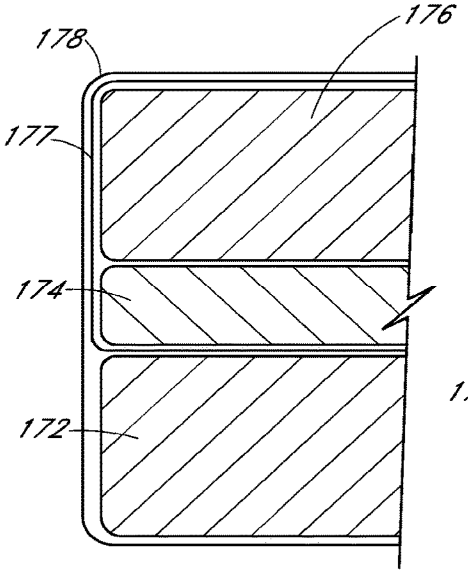
FIGS. 17B and 17C illustrate detailed cross-sectional views of the climate controlled bed of FIG. 17A.
Figure 17C:
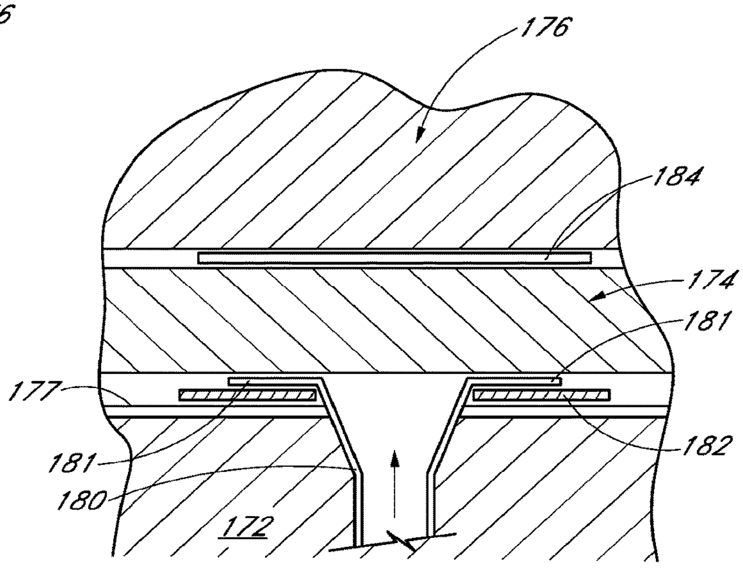
Figure 17D:
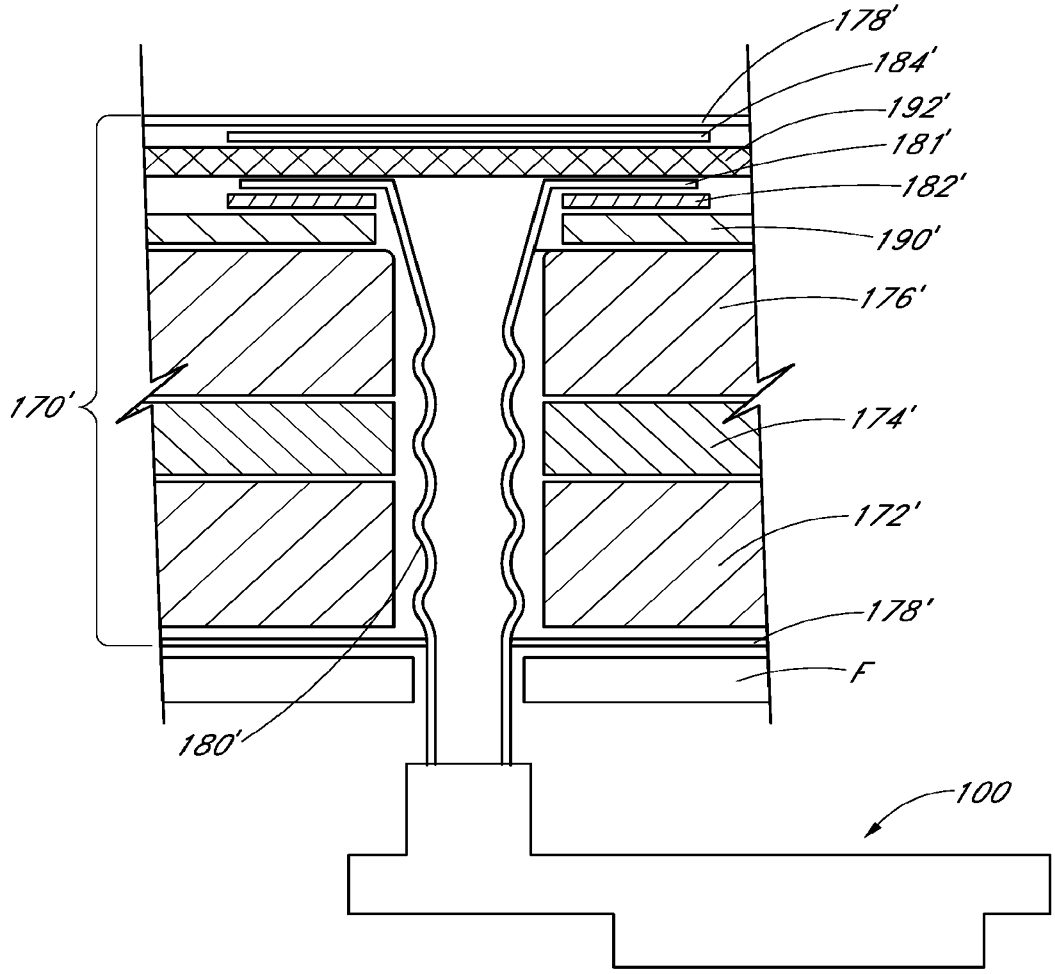
FIG. 17D illustrates a partial cross-sectional view of a climate controlled bed according to yet another embodiment.

Another embodiment of a mattress or upper portion 170 of a climate controlled bed assembly is illustrated in FIGS. 17A-17C. As shown, the mattress 170 can include a plurality of layers or portions 172, 174, 176. Such portions 172, 174, 176 can be separate members that are maintained in a desired orientation relative to each other using an outer cover 178 or other enclosure. In certain arrangements, the outer cover 178 comprises one or more zippers and/or other types of releasable attachment devices or features (e.g., buttons, snap connections, hook and loop fasteners, other types of fasteners, etc.) that enable a user to selectively enclose (or release) the layers or portions within an interior space of the cover 178.

With continued reference to FIGS. 17A-17C, the mattress 170 can include lower and upper portions 172, 176 that comprise high performance foam, viscoelastic foam, memory foam, open-cell foam, closed-cell foam, other types of foam, filler materials, other natural or synthetic materials, spring coils, air chambers and/or the like, as desired or required. As shown, the mattress can further include a middle portion 174 that is generally situated between the lower and upper portions 172, 176. According to certain arrangements, the middle portion or layer 174 comprises a fluid distribution member, such as for example, a spacer fabric or any other material or member capable of at least partially distributing fluids therethrough (e.g., an open cell foam, a member having an open lattice design, a member having a porous structure, etc.). Accordingly, air or other fluids entering the middle portion 174 can be laterally distributed before exiting through the upper portion 172. As discussed herein with reference to other embodiments, a flow diversion member 184 or a diverter can be positioned generally above the middle portion 174 (e.g., in locations at or near the fluid inserts or ducts) to help provide a more even distribution of air or other fluid within the fluid distribution member.

As illustrated in FIGS. 17A and 17C, a fluid insert 180 (e.g., bellowed conduit) can be positioned within an interior of the mattress 170. In the depicted embodiment, the insert 180 extends from the bottom of the mattress to the lower end of the middle portion 174 (e.g., the spacer fabric or other fluid distribution member). As discussed herein with reference to FIG. 14, one or more intermediate members 182 (e.g., a felt insulator, another type of scrim, etc.) can be positioned adjacent the flanged end 181 of the insert 180 to help maintain the insert in a desired orientation (e.g., to prevent the insert from undesirably pulling through the corresponding passageway of the lower portion 172), to help reduce the incidence of retrograde fluid flow through one or more undesirable portions or areas of the mattress (e.g., leaks through the lower portion 172, passageways in which the inserts 180 are routed, etc.) and/or the like.

With continued reference to FIGS. 17A-17C, the bellowed duct 180 or any other insert can advantageously place the middle portion 174 (e.g., spacer fabric, other fluid distribution member, etc.) in fluid communication with a fluid module 100. In certain arrangements, the fluid module 100 is configured to selectively heat or cool air or other fluids passing therethrough. Alternatively, the fluid module 100 can be adapted to simply transfer ambient air, and thus, need not have the ability to thermally condition fluids. Accordingly, depending on the level of environmental conditioning desired for a particular mattress, the fluid module 100 can comprise one or more components or features, such as, for example, a blower or other fluid transfer device, a thermoelectric device (e.g., Peltier circuit), a convective heater or some other type of thermal conditioning device, temperature, relative humidity and/or other types of sensors and/or the like. As illustrated in FIG. 17A, in some embodiments, the fluid module 100 is positioned generally underneath the foundation F or other support member (e.g., frame, box spring, etc.). Alternatively, as discussed herein with reference to other arrangements, the fluid module 100 can be positioned above the foundation F (e.g., below the mattress 170, incorporated into one or more portions of the mattress, etc.).

According to certain arrangements, the upper and/or lower portions 176, 172 are configured to permit air or other fluids to pass therethrough. For example, these portions can include a porous structure (e.g., open-cell foam). Alternatively, the portions 172, 176 can include a plurality of holes, channels or other openings through which fluids may pass. As illustrated in FIG. 17B, in some arrangements, the upper portion 176 (e.g., porous foam member) and the middle portion (e.g., fluid distribution member) are contained within an interior space of an additional enclosure 177. In some embodiments, such an enclosure 177 includes a plastic sheet or film, a bag and/or any other member that is adapted to partially or completely surround the upper and middle portions 176, 174. Such a configuration can further ensure that air or other fluid will not undesirably retrograde flow through the lower portion 172 once it has been delivered to the fluid distribution member. The additional enclosure 177 can comprise a porous top surface, so that fluid can exit the upper portion 176, toward and through the outer cover 178.

In operation, after being delivered by the fluid module 100 to the middle portion 174 (e.g., fluid distribution member), thermally-conditioned (e.g., cooled, heated) or thermally-unconditioned (e.g., ambient) air can pass through the upper portion 176 (e.g., foam with a plurality of fluid openings, other porous member, etc.) of the mattress 170. From there, the air or other fluid can exit the top surface of the upper portion 176, through the various layers situated above the upper portion (e.g., an enclosure 177, an outer cover 178, etc.), in the general direction of the mattress's occupant.

Such an embodiment can advantageously enable a user to selectively remove one or more portions or members of the mattress 170 for repair, servicing, replacement and/or any other activity or task. In some arrangements, the various portions of the mattress 170 are maintained in a desired relative orientation using a cover or other enclosure that can be opened and closed (e.g., using zippers, buttons, etc.). Further, the mattress, which comprises a relatively simple yet unique design, is relatively inexpensive to manufacture, assemble, store, transport, repair and maintain.

Figure 17E:
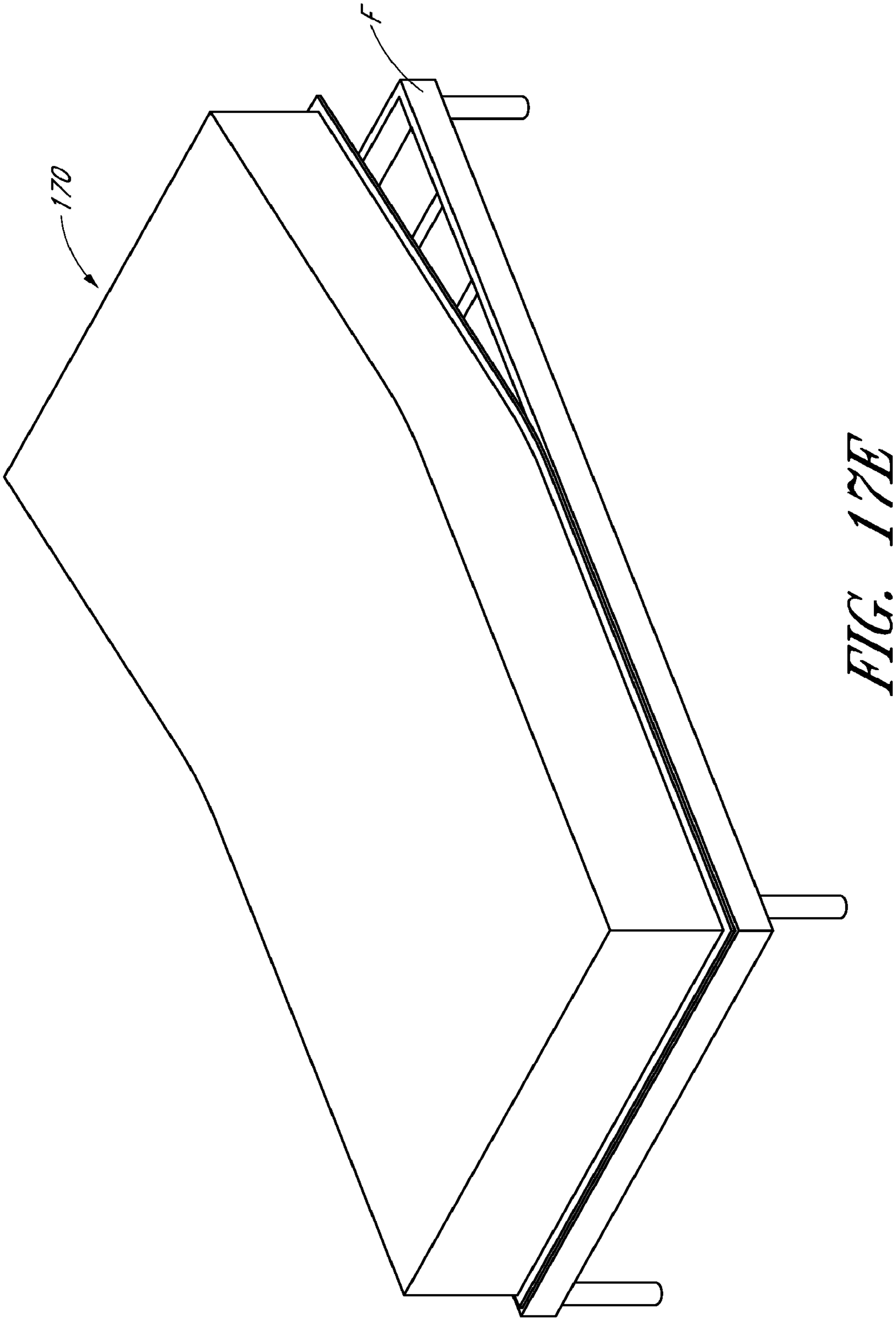
FIG. 17E illustrates a foundation or other base and a climate controlled mattress positioned thereon according to one embodiment.

In some arrangements, a mattress can include more or fewer (and/or different) portions or layers than depicted in FIGS. 17A-17C. By way of example, the mattress 170' illustrated in FIG. 17D comprises additional portions than the mattress of FIGS. 17A-17C. Further, in the depicted embodiment, the orientation and general configuration of the different portions also varies. For instance, in FIG. 17D, the mattress comprises additional layers 190', 192' along its upper region. Moreover, the fluid module 100 is configured to selectively deliver fluid into a spacer fabric or other fluid distribution member 192' that is situated closer to the top of the mattress 170'. As with the arrangement of FIGS. 17A-17C, the mattress 170' can be positioned on a foundation For other base member. If the fluid module 100 is positioned below the foundation F, an opening can be provided therethrough in order to accommodate the passage of a bellowed duct 180' or other conduit. Alternatively, the fluid module can be placed in fluid communication with the mattress using one or more conduits that are configured to go around (rather than through) the foundation F. With continued reference to FIG. 17E, a climate controlled mattress 170, such as those discussed herein with reference to FIGS. 17A-17D, or equivalents thereof, can be sized, shaped and otherwise adapted to be positioned on a foundation F, box spring and/or any other type of bed frame. In some embodiments, as illustrated in FIG. 17E, the foundation F can be configured to be selectively reclined or otherwise moved in a desired manner by a user.

A climate control assembly according to any of the embodiments disclosed herein, or equivalents thereof, can be constructed, assembled and otherwise configured to include one or more noise abatement or reduction features. Such measures can be directed to reducing air borne noise and/or structure borne noise.

For example, in certain embodiments, one or more noise muffling devices are positioned on or near a fluid intake (e.g., an inlet opening of a foundation, a fluid module inlet, etc.). Alternatively, one or more of the fluid intakes associated with a climate controlled bed assembly can be designed to be remote to the location of the bed. For instance, an ambient air intake can be positioned in a different room, in another interior location of a building, near a window or other opening, along an exterior portion of a building that houses the bed and/or the like. Accordingly, if an inlet is located sufficiently far away from the bed, the impact of any air borne noise to an occupant can be advantageously mitigated. In other arrangements, a windsock, vanes, grates or other flow conditioning members, acoustic insulating materials and/or other soundproofing devices or methods can be used within, on or near the inlets, outlets, fluid conduits and/or any other hydraulic components of a bed's climate control system. Regardless of the specific noise reduction techniques utilized, the level of white noise and/or other air borne noise caused by the movements of air through the various components and portions of a bed can be reduced.

In addition, a climate controlled bed assembly can include one or more devices and/or methods that help reduce structure borne noise. According to certain embodiments, vibration dampening devices and components can be used at various locations of the bed. For example, rubber grommets can be used at or near the connections of the fluid modules (e.g., blowers, fluid transfer devices, etc.) and/or any other component of the climate control system that is configured to rotate or otherwise move with a particular frequency. Such devices can help reduce vibration, and thus, the overall structure borne noise level generated by an environmentally-conditioned bed during use. As noted above, such noise reduction measures can be incorporated into any of the bed embodiments disclosed herein, or equivalents thereof.

Figure 18A:
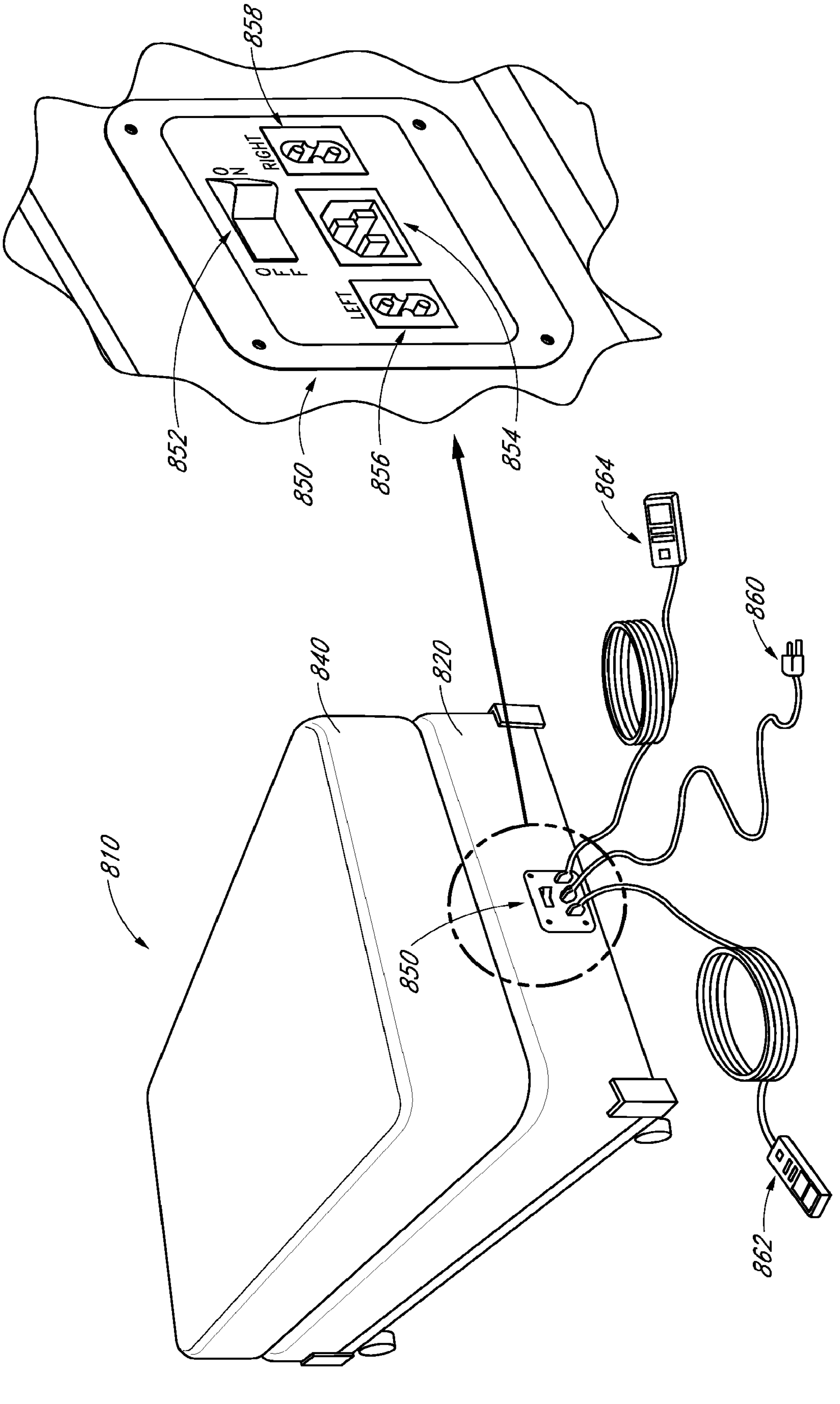
FIG. 18A illustrates a perspective view of a climate controlled bed having a control panel along an exterior of the lower portion according to one embodiment.

FIG. 18A illustrates one embodiment of a climate controlled bed 810 comprising one or more of the components or features disclosed herein. As shown, the bed 810 includes an upper portion 840 generally positioned on top of a lower portion 820. The lower portion 820 can comprise a control panel 850 along one of its outer surfaces. For example, in the arrangement illustrated in FIG. 18A, the panel 850 includes an ON/OFF switch 852, a power port 854 (e.g., AC port adapted to receive a power cord 860) and one or more ports 856, 858 for connecting remote control devices 862, 864 or similar controllers.

The control panel 850 and its various features can be operatively connected to the fluid modules, controllers or other control units and/or any other electrical components of the climate controlled bed 810. Thus, a user can control the operation of the bed 810 using a remote control device 862, 864 and/or any switches, knobs and/or other selectors positioned on the control panel 850 or any other portion of the bed 810. As shown, the power cord 860, the remote control devices 862, 864 or the like can be removably attached to corresponding slots or other connection sites on the control panel 850. This can permit a user to disconnect some or all of the components from the panel 850 when the climate control features of the bed are not desired or when the bed is being serviced, repaired, moved or repositioned.

For any of the embodiments disclosed herein, or equivalents thereof, the operation of the bed assembly can be controlled using one or more wireless control devices (e.g., remote controls or other handheld devices). In some arrangements, for example, the control devices can be configured to communicate with a main processor, control unit, one or more fluid modules, timers, sensors (e.g., temperature sensors, humidity sensors, etc.) and/or any other components using infrared, radio frequency (RF) and/or any other wireless methods or technologies.

Figure 18B:
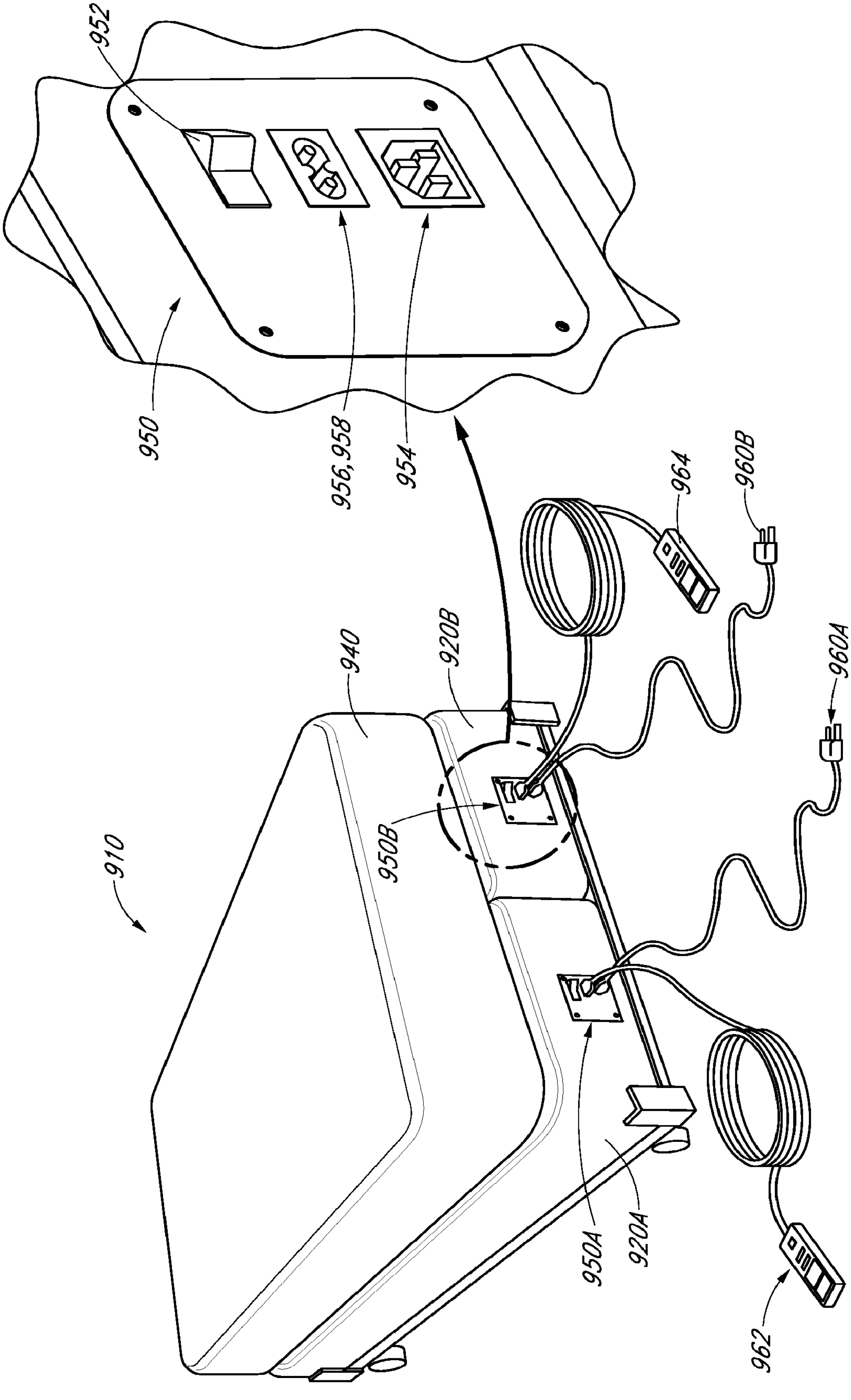
FIG. 18B illustrates a perspective view of a climate controlled bed having control panels along the exterior of its lower portions according to one embodiment.

FIG. 18B illustrates another embodiment of a climate controlled bed assembly 910 that comprises two separate lower portions 920A, 920B. Each lower portion 920A, 920B can include one or more fluid modules (not shown), controllers and/or other components of the climate control system. The upper portion 940 can be configured to rest on top of both lower portions 920A, 920B. As discussed herein with respect to other embodiments, the upper portion 940 can include a core, a fluid distribution member, a comfort layer and/or any other layer or component. In the depicted arrangements, the lower and upper portions 920A, 920B, 940 are configured to permit ambient and/or thermally conditioned air from the fluid modules to be conveyed toward the top of the bed 910 through one or more passageways, fluid distribution members, comfort layers and/or the like.

With continued reference to FIG. 18B, each lower portion 920A, 920B can comprise a control panel 950A, 950B. In some embodiments, the control panels 950A, 950B can include an ON/OFF switch 952, slots or other connection sites 954, 956, 958 for removably connecting power cords 960A, 960B, remote control devices 962, 964 and/or any other component.

Figure 18C:
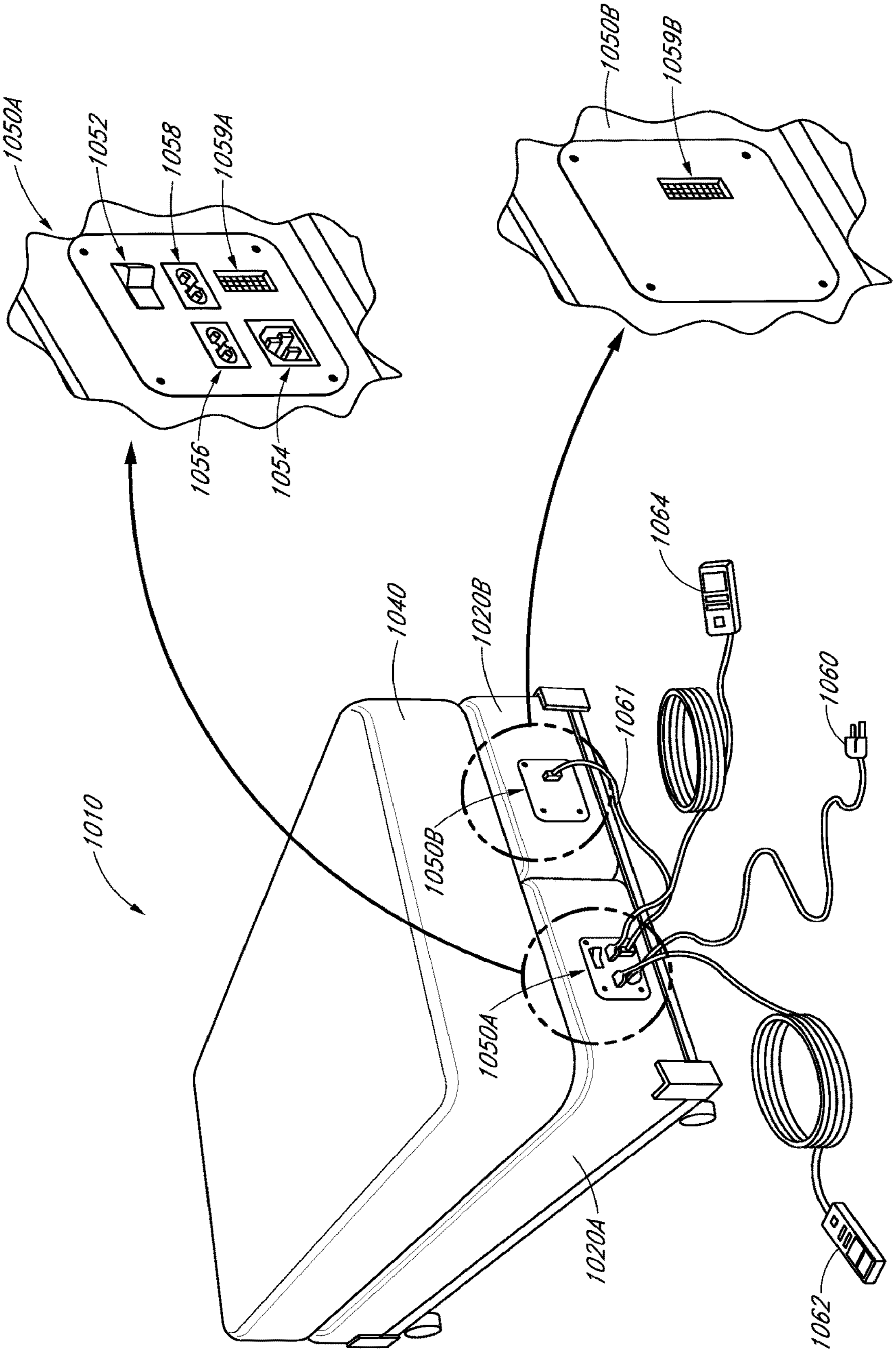
FIG. 18C illustrates a perspective view of a climate controlled bed having control panels along the exterior of its lower portions according to another embodiment.

Another embodiment of a climate control bed 1010 is illustrated in FIG. 18C. As with the arrangement of FIG. 18B, the depicted bed 1010 includes two separate lower portions 1020A, 1020B and a single upper portion 1040. Each of the lower portions 1020A, 1020B comprises a control panel 1050A, 1050B generally positioned along a side surface. In some embodiments, the panels 1050A, 1050B are different from each other. For example, one of the panels 1050A can include an ON/OFF switch 1052, slots or other connection sites 1054, 1056, 1058 for removably docking one or more power cords 1060, remote control devices 1062, 1064 and/or the like. In addition, the control panel 1050A can include a port 1059A or other connection site configured to receive a cable 1061 or other connector that is in power and/or data communication with a corresponding port 1059B on the control panel 1050B of the second lower portion 1020B. Accordingly, any fluid modules, controllers and/or any other components positioned within or associated with the second lower portion 1020B can be advantageously controlled using the control panel 1050A positioned on the first lower portion 1020A. This can simplify the control panel 1050B of the second lower portion 1020B, by requiring fewer features or components, such as, for example, control devices (e.g., ON/OFF switch 1052), connection sites (e.g., power cord ports 1054, remote control device ports 1056, 1058, etc.) and/or the like.

Figure 18D:
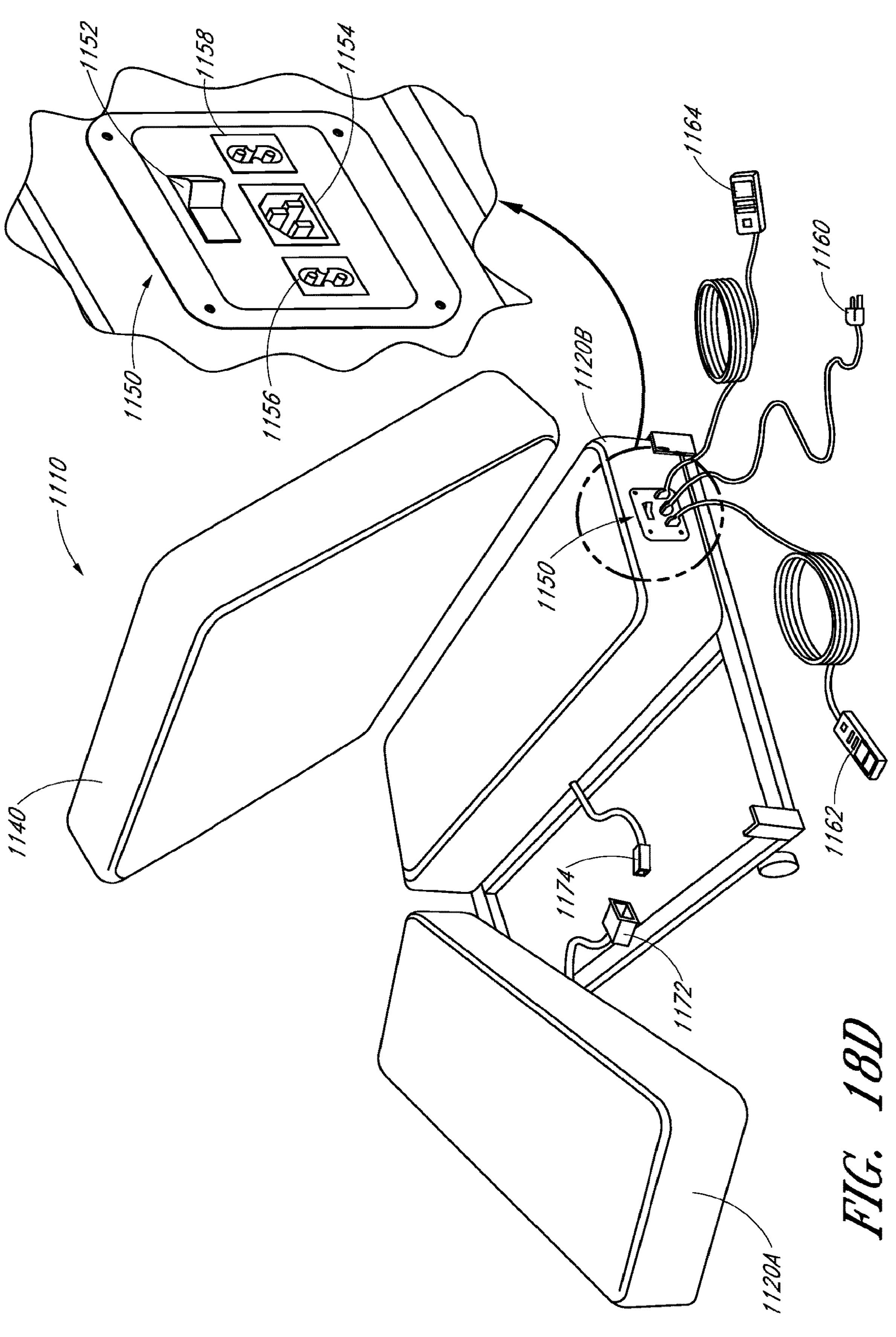
FIG. 18D illustrates a perspective view of a climate controlled bed having a control panel along the exterior of one of its lower portions according to one embodiment.

FIG. 18D illustrates another embodiment of a climate controlled bed assembly 1110 having two separate lower portions 1120A, 1120B and a single upper portion 1140. For simplicity, the various components and other features of the climate control system (e.g., inlets, fittings or passageways within the upper portion 1140 and the lower portions 1120A, 1120B, etc.) are not shown. In FIG. 18D, only one of the lower portions 1120B comprises a control panel 1150. Thus, as shown, the electrical components of the lower portions 1120A, 1120B can be operatively connected using one or more interconnecting cables 1172, 1174. In the depicted arrangement, the interconnecting cables 1172, 1174 are configured to connect to each other along the interior adjacent surfaces of the lower portions 1120A, 1120B, such that the cables 1172, 1174 remain hidden when the bed 1110 has been assembled. In other arrangements, however, the interconnecting cables 1172, 1174 or other devices can be positioned at any location of the lower portions 1120A, 1120B and/or another area of the bed 1110.

Figure 18E:
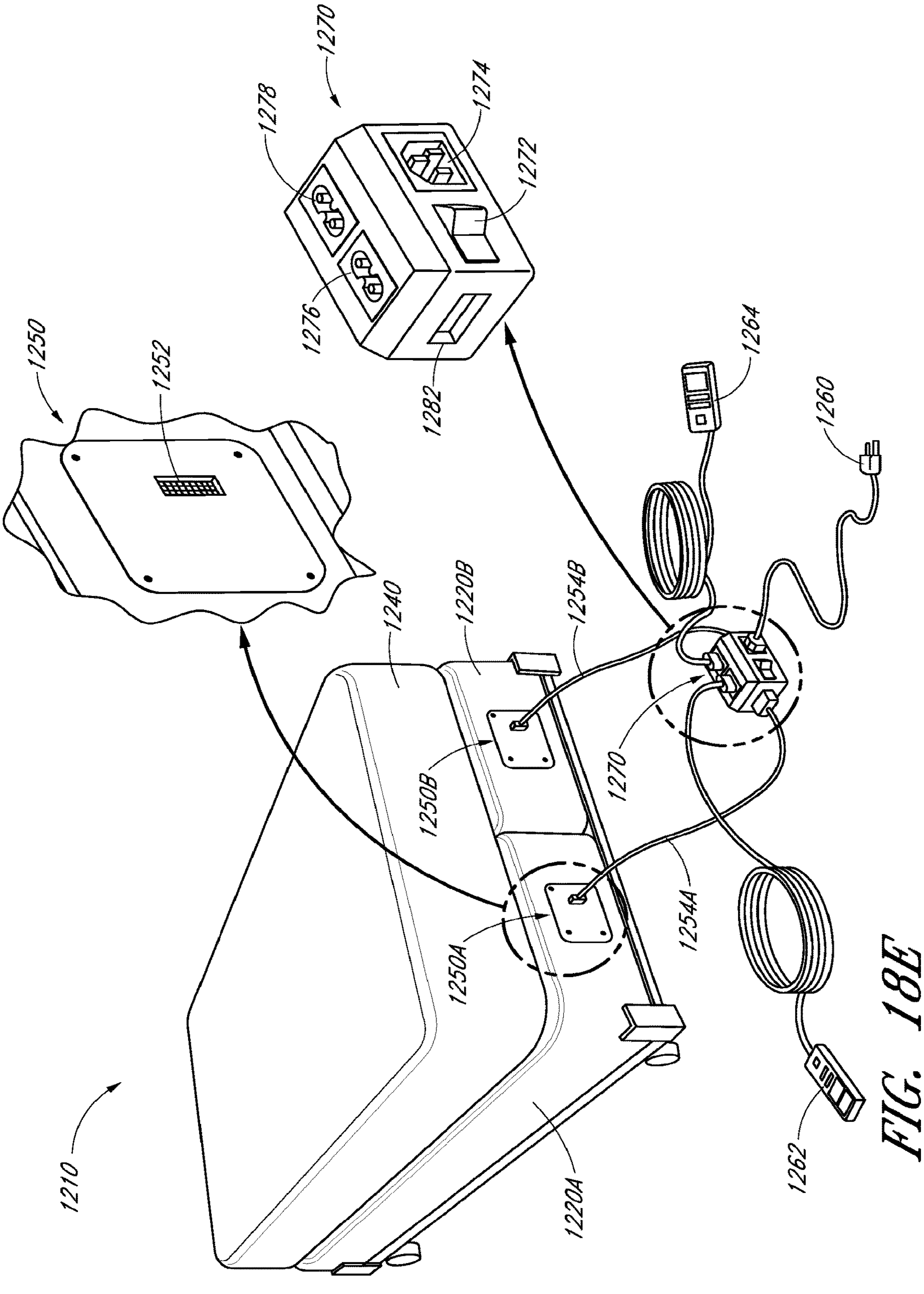
FIG. 18E illustrates a perspective view of a climate controlled bed having an external control module operatively connected to control panels positioned along the exterior of its lower portions according to one embodiment.

Another arrangement of a climate controlled bed assembly 1210 is illustrated in FIG. 18E. As shown, each of the lower portions 1220A, 1220B includes a control panel 1250A, 1250B. In some embodiments, each control panel 1250A, 1250B comprises a single port 1252 or other connection site configured to receive a cable. However, a control panel can include one or more additional ports or other connection sites, as desired or required. Interconnecting cables 1254A, 1254B that are connected to ports 1252 of the control panels 1250A, 1250B can be fed into an external control module 1270.

With continued reference to FIG. 18E, the external control module 1270 can include ports 1282 that are adapted to receive the interconnecting cables 1254A, 1254B. In addition, the external control module 1270 can include one or more switches or other control devices (e.g., an ON/OFF switch 1272), other ports or connection sites (e.g., power cord ports 1274, remote control device ports 1276, 1278, etc.) and/or the like. Thus, the external control module 1270 can be used to supply power to the various electrical components (e.g., fluid modules, control units, etc.) of the bed assembly 1210. In addition, the external control module 1270 can provide a single device through which such components may be operatively controlled. In some embodiments, the external control module 1270 can be configured to be placed underneath the bed assembly 1210 or at another discrete location when the bed 1210 is in use.

FIGS. 19A through 23 illustrate various embodiments of enclosures configured to receive a control panel for a climate controlled bed. The depicted enclosures are generally positioned along the lower portions of the respective bed assemblies. However, such enclosures can be positioned within or near another part of the bed.

Figure 19B:
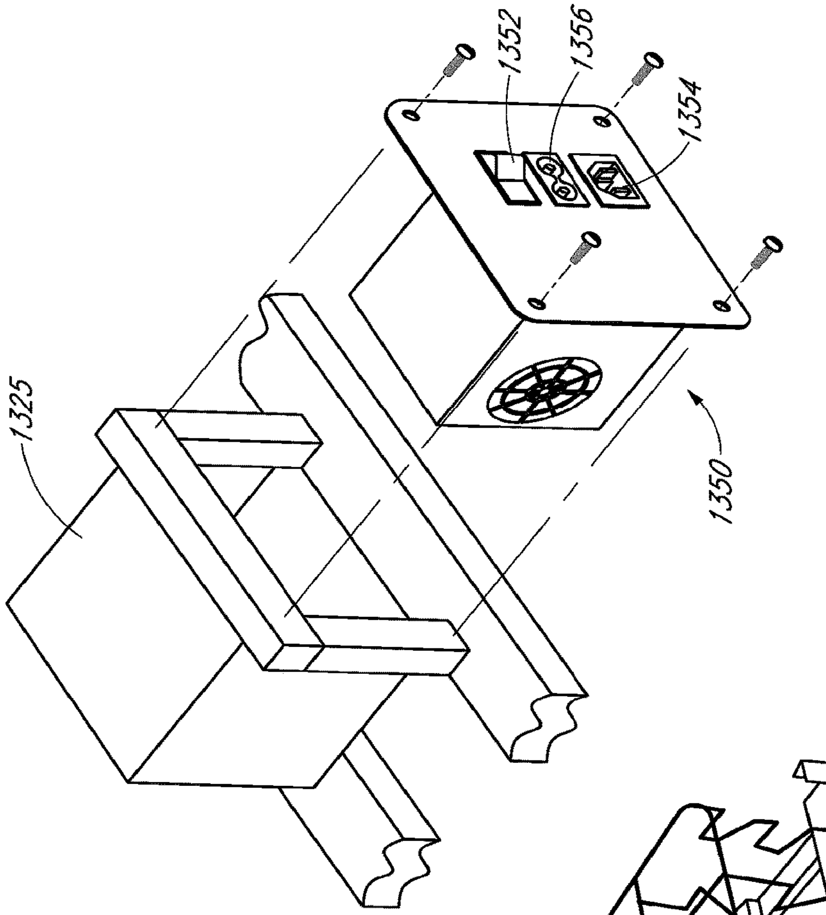
FIGS. 19A and 19B illustrate perspective views of one embodiment of an enclosure positioned within a lower portion of a climate controlled bed assembly and configured to receive a control panel.
Figure 19A:
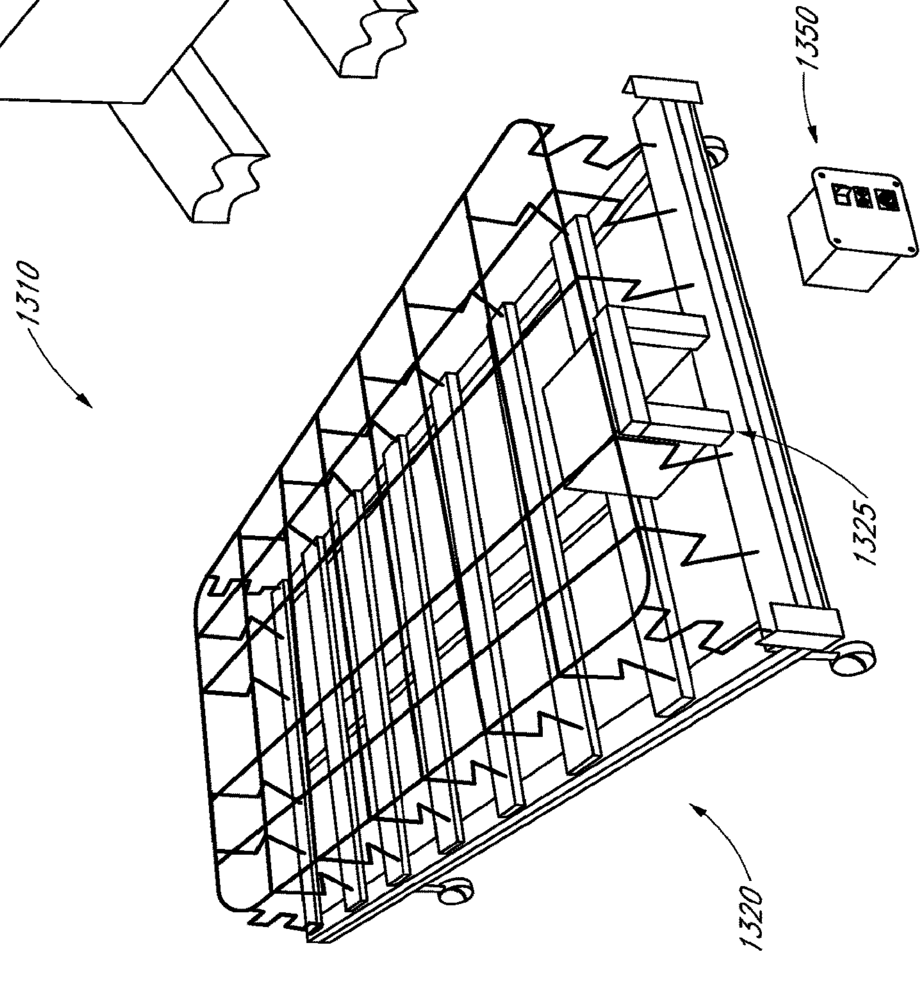

With reference to FIGS. 19A-19C, the bed 1310 comprises an enclosure 1325 that generally abuts an exterior surface (e.g., rear, front, side, etc.) of the lower portion 1320 when secured therein. As shown, the various structural and other components of the enclosure 1325 can be sized, shaped and otherwise configured to receive a control panel 1350. The enclosure 1325 can be secured to one or more regions of the lower portion 1320 (e.g., a frame member, the frame structure, etc.). In addition, the control panel 1350 can be attached to the enclosure using one or more screws, other fasteners and/or the like.

Figures 20A, 20B, 20C:
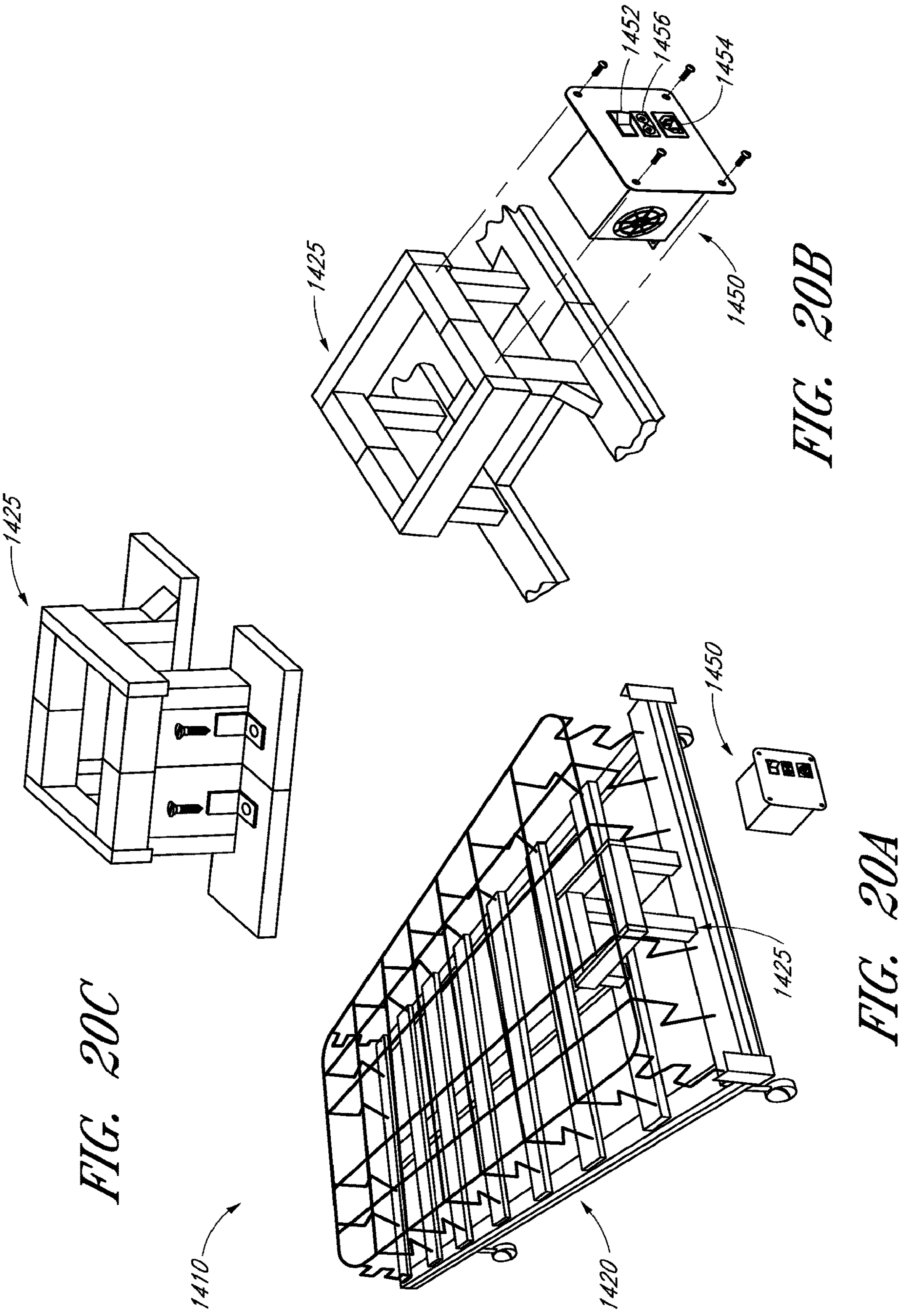
FIGS. 20A-20C illustrate perspective views of another embodiment of an enclosure positioned within a lower portion of a climate controlled bed assembly and configured to receive a control panel.

As illustrated in FIGS. 20A-20C, an enclosure 1425 can include more or fewer structural or non-structural members. In addition, the enclosure 1425 can comprise different types of fasteners (e.g., screws, tabs, etc.) and/or other members, as desired or required. In some embodiments, the enclosure includes rigid, semi-rigid and/or non-rigid (e.g., flexible) members that comprise wood, metal (e.g., steel), composites, thermoplastics, other synthetic materials, fabrics and/or the like.

Figure 21B:
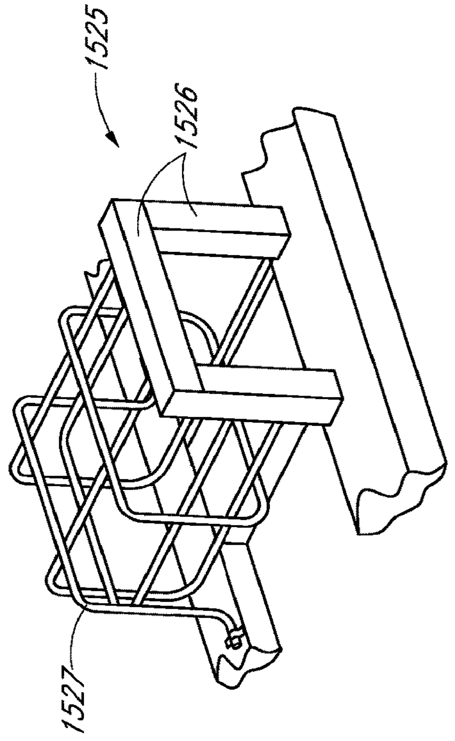
FIGS. 21A-21C illustrate perspective views of yet another embodiment of an enclosure positioned within a lower portion of a climate controlled bed assembly and configured to receive a control panel.
Figure 21C:
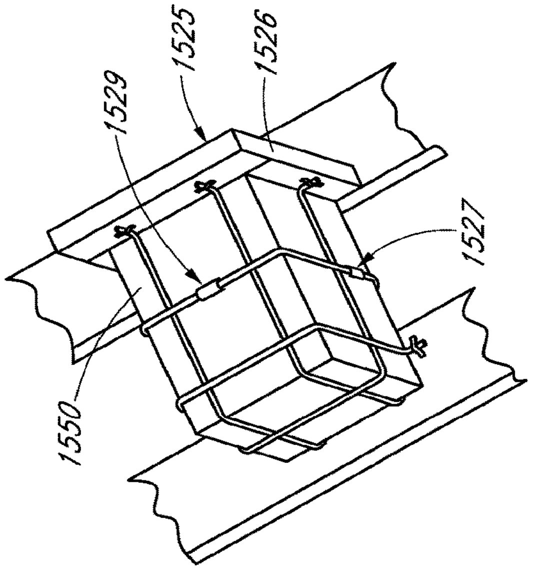
Figure 21A:
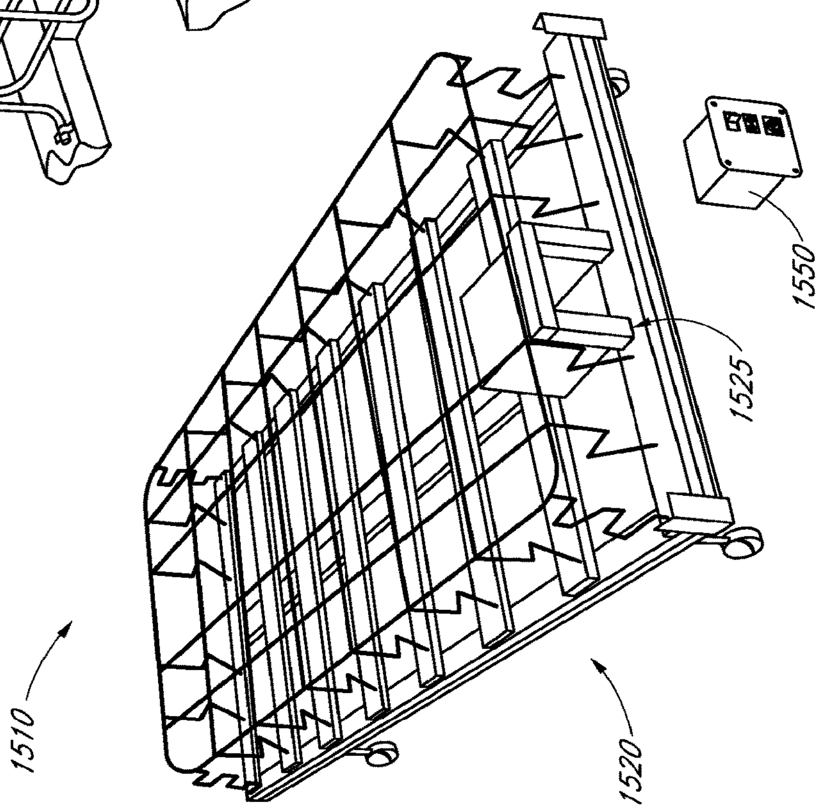
Figure 22B:
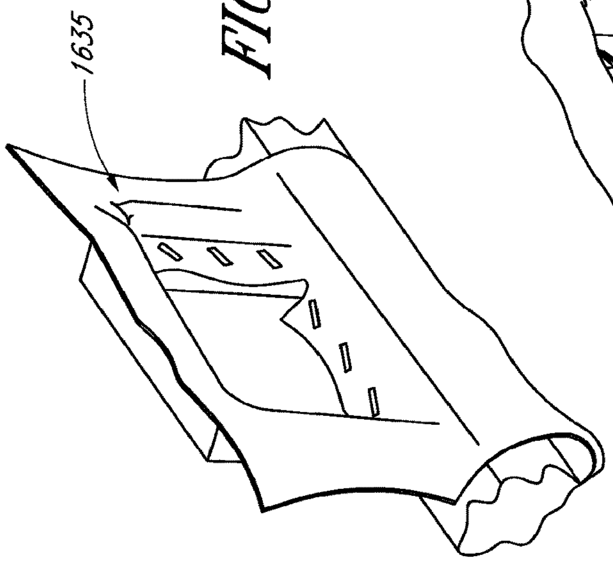
FIGS. 22A-22D illustrate perspective views of an enclosure configured to receive a control panel according to one embodiment.
Figure 22D:
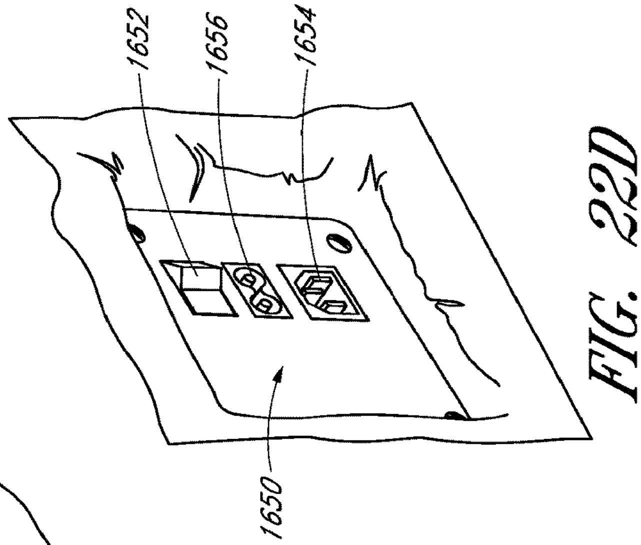
Figure 22A:
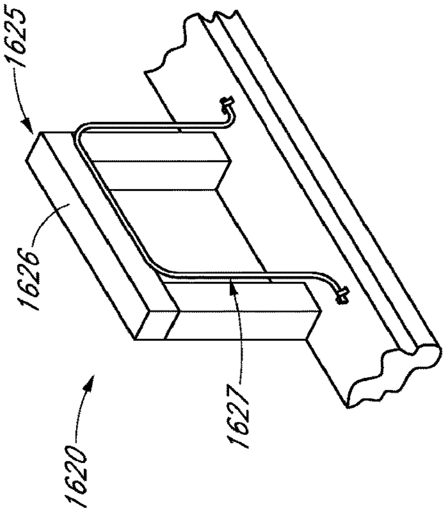
Figure 22C:
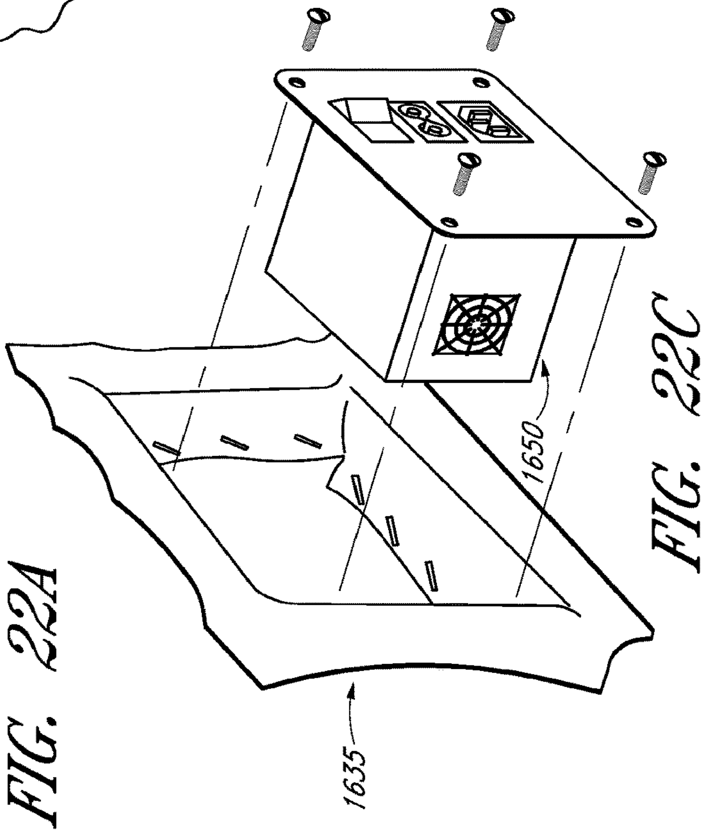
Figure 23:
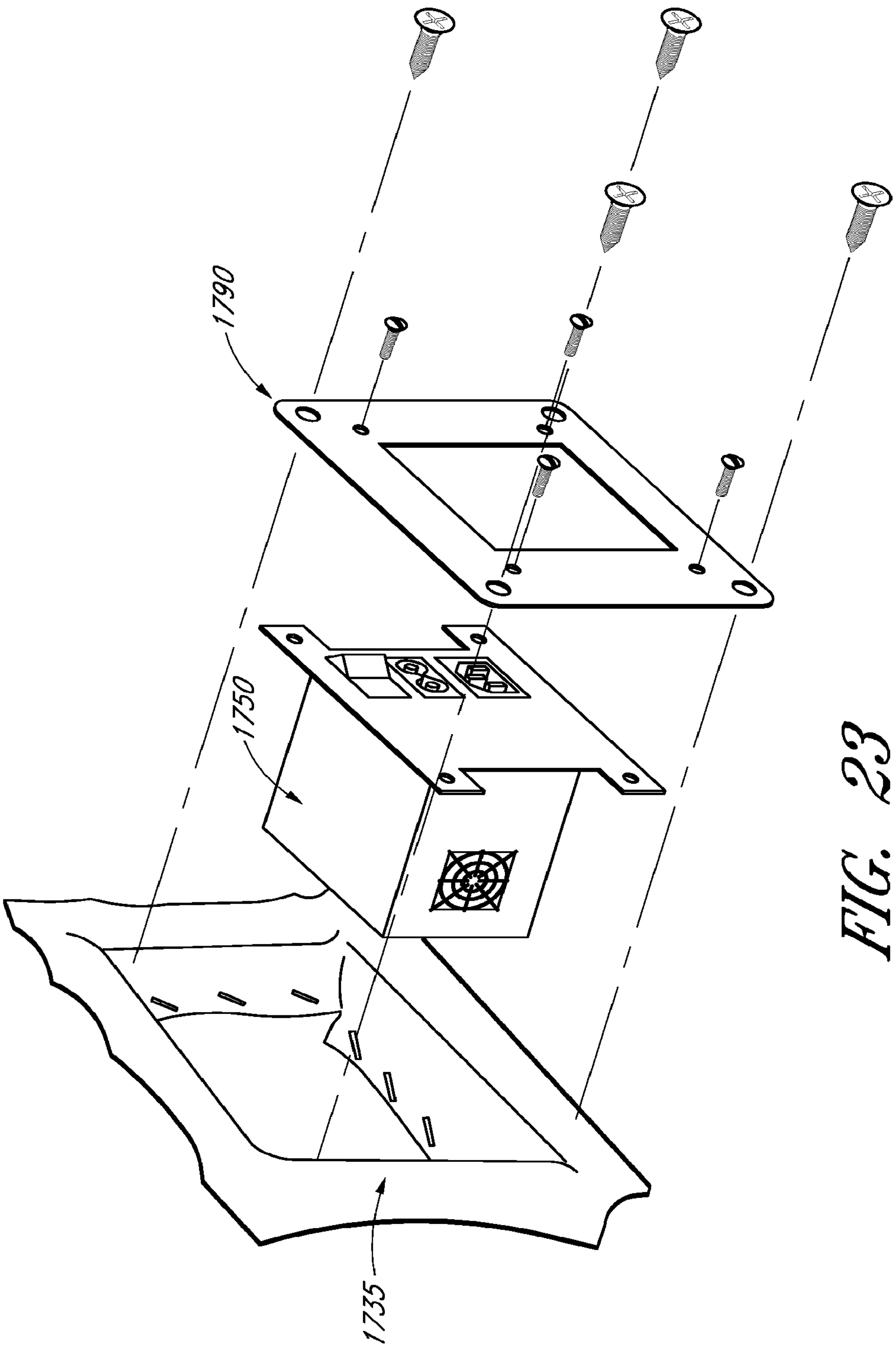
FIG. 23 illustrates a perspective view of an enclosure configured to receive a control panel according to another embodiment.

In the embodiment depicted in FIGS. 21A-21C, the enclosure 1525 includes a frame 1526 generally positioned along an exterior of the lower portion 1520 of the bed assembly 1510. The frame 1526 can be attached to the lower portion 1520 using one or more connection methods or devices. As shown, the enclosure 1525 can further include a cage 1527 or the like. With reference to FIG. 21C, the cage 1527 can be attached to both the frame 1526 and one or more areas of the lower portion 1520 of the bed 1510. Once positioned within an interior of the enclosure 1525, the control panel 1550 can be attached to the frame 1526 and/or the cage 1527 of the enclosure 1525 using one or more tabs 1529, other fasteners, welds and/or any other connection device or method.

In some embodiments, as illustrated in FIGS. 22A-22D, a control panel 1625 can be secured to a lower portion 1620 or other portion of a bed using a simpler design. For example, the enclosure 1625 depicted in FIG. 22A includes a smaller frame 1626 and a reinforcing structure 1627 adjacent to the frame 1626. Thus, an enclosure may not extend very far, if at all, into an interior of a lower portion 1620 or other portion of a climate controlled bed assembly. In the illustrated arrangement, a fabric 1635 or one or more other protective films or layers can be positioned between the enclosure 1625 and the exterior of the lower portion 1620. Thus, such a fabric 1635 can hide the enclosure 1625 and serve as an interface between the enclosure 1625 and the control panel 1650 that is secure thereto.

One or more additional members or devices can be used to secure a control panel within an enclosure or other area of the bed assembly. For example, with reference to FIG. 23, a faceplate 1790 can be positioned along the outside of the control panel 1750. In some embodiments, such a faceplate 1790 or other member can help secure the control panel 1750 to the corresponding enclosure. It will be appreciated that in any of the embodiments of the climate controlled bed assemblies disclosed herein, including those illustrated in FIGS. 1A-28B, the control panels can be configured to be selectively removable from the corresponding enclosure or other area of the bed. This can facilitate the manufacture, assembly, transport, maintenance, repair and/or any other activities associated with providing and operating a climate controlled bed.

In addition, in embodiments that include control panels with switches, other control devices, ports and/or the like, such as, for example, those illustrated in FIGS. 1423, users can conveniently configure a climate controlled bed assembly for use in just a few steps. For example, before the climate control features of such a bed assembly can be activated, a user may need to connect a power cable, a remote control device, an interconnecting cable and/or any other device to one or more control panels (e.g., along a lower portion of the bed). In some embodiments, the user may also need to select a desired setting or mode of operation using an ON/OFF switch and/or any other control device.

Figure 24A:
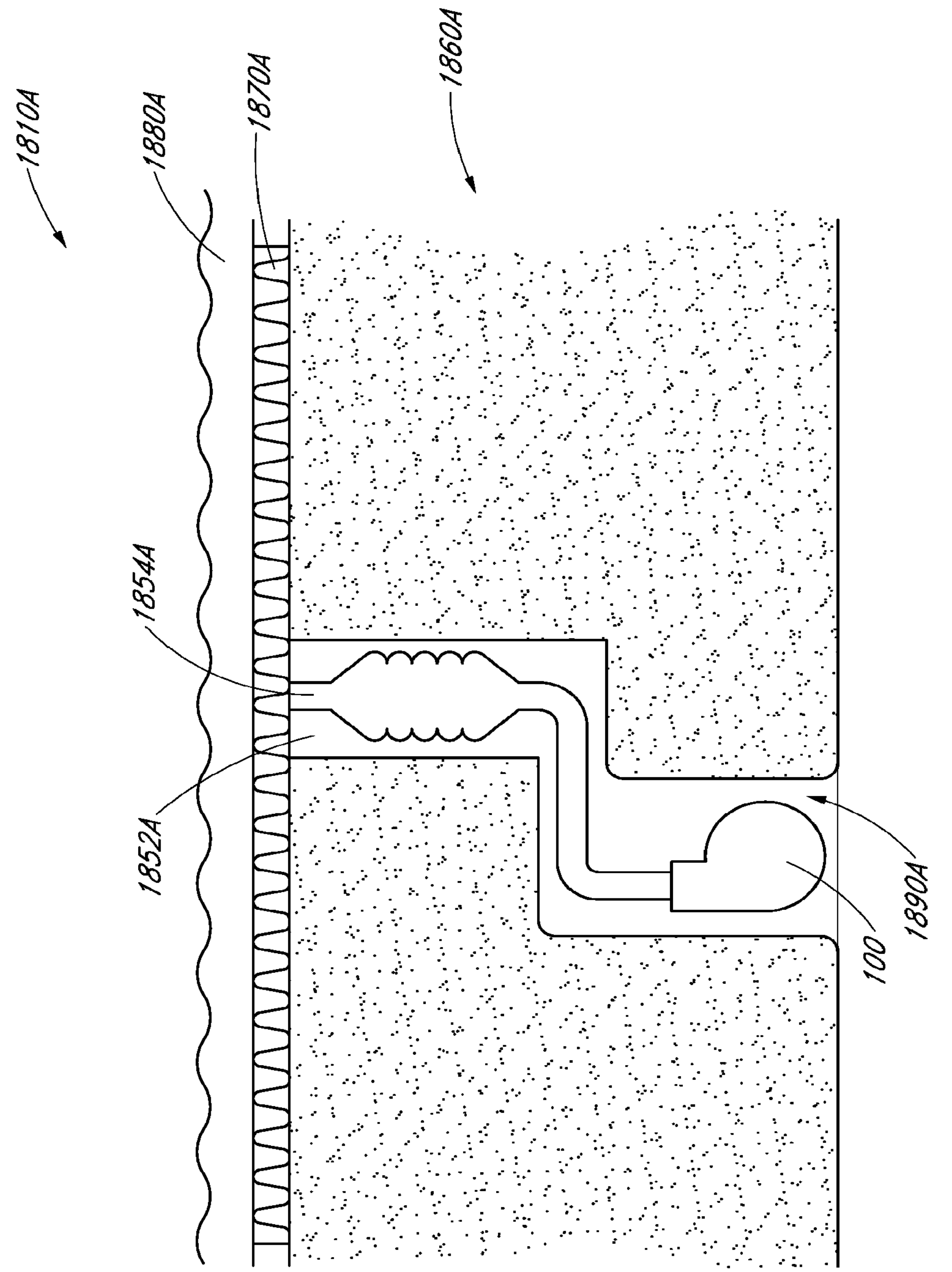
FIG. 24A schematically illustrates a cross-sectional view of a core configured to house a fluid module according to one embodiment.

In some embodiments, as illustrated in FIG. 24A, a fluid module 100 (e.g., a blower or other fluid transfer device, a thermoelectric device, etc.) can be positioned (e.g., partially or completely) within a recess area 1890A or other cavity of the core 1860A. As a result, the fluid module 100 can be placed in fluid communication with one or more passageways 1852A of the core 1860A. In the illustrated arrangement, air or other fluid being transferred by the fluid module 100 (e.g., toward or away from the top of the bed assembly 1810A) is conveyed within an insert 1854A that is generally positioned within the recess area 1890A and/or the passageway 1852A. As shown, the insert 1854A can include bellows or other similar features to accommodate movements in the core 1860A when the bed assembly 1810A is in use. As with other embodiments discussed herein, air or other fluid can be conveyed from the fluid module 100 to a top surface of the bed assembly 1810A through one or more fluid distribution members 1870A (e.g., spacer), comfort layers 1880A and/or any other layers or members positioned above the core 1860A. Alternatively, air can be drawn away from a top area of the bed assembly 1810A.

Such a configuration can help eliminate the need for a separate lower portion or other component that houses one or more fluid modules. For example, the climate controlled bed 1810A illustrated in FIG. 24A can be positioned directly on a box spring, the floor or any other surface. The fluid module 100 can be secured to the core 1860A and/or any other portion of the bed assembly 1810A using adhesives, fasteners and/or any other attachment device or method.

Figure 24B:
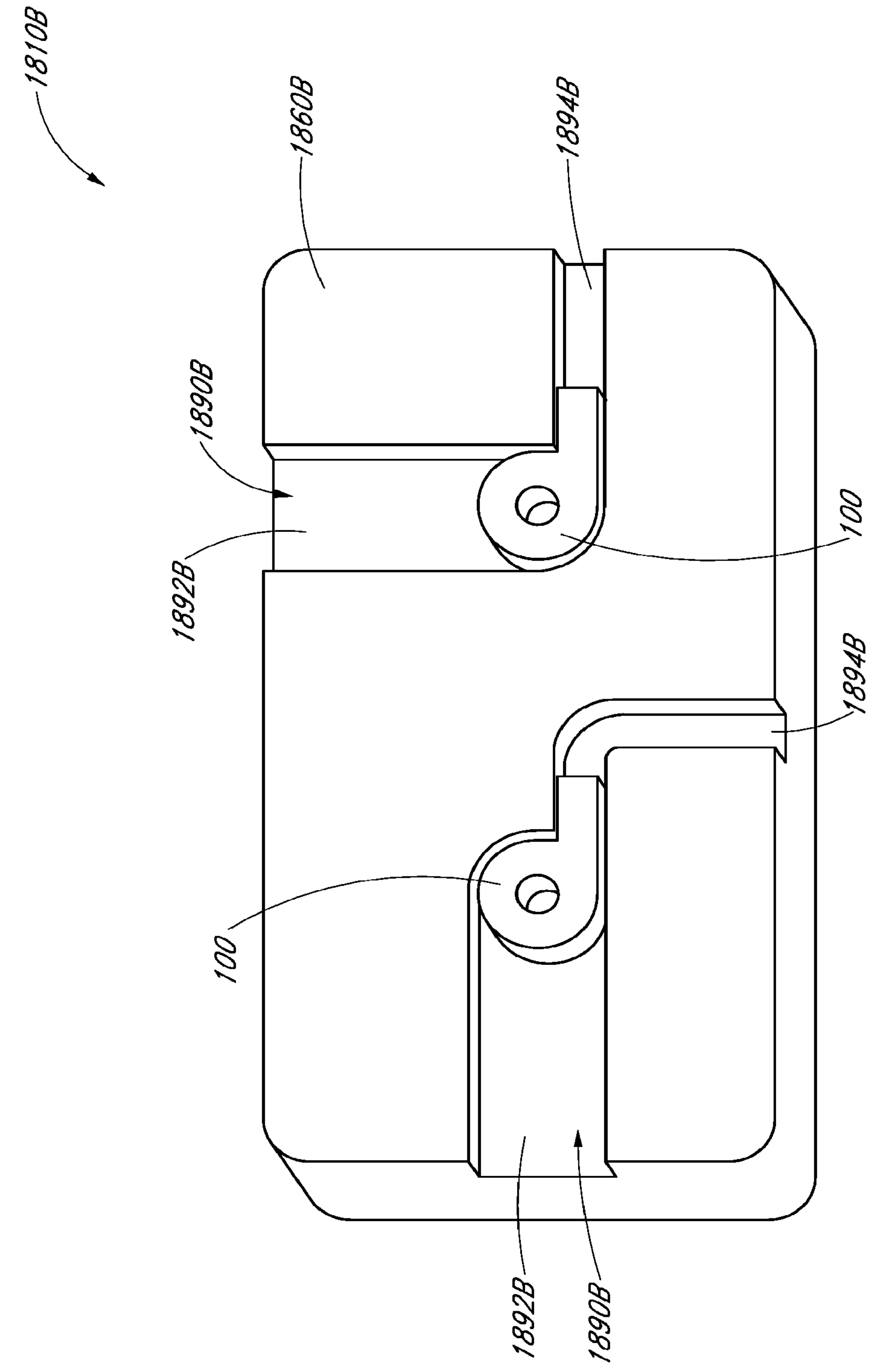
FIG. 24B schematically illustrates a perspective bottom view of a core configured to house a fluid module according to another embodiment.

Another embodiment of a core 1860B being configured to accommodate one or more fluid modules 100 is schematically illustrated in FIG. 24B. As shown, the fluid modules 100 can be positioned within recess areas 1890B or other cavities formed along the bottom surface of the core 1860B. In other embodiments, the fluid modules 100 are positioned along a different surface or within another portion of the core 1860B. As discussed, such a configuration can help eliminate the need for a separate lower portion or other bed component that is adapted to house the fluid modules 100. Consequently, the core 1860B may be positioned on a standard box spring, a floor or any other surface.

With continued reference to FIG. 24B, the core 1860B can include inlet channels 1892B through which air or other fluid may be drawn into the inlet of the fluid modules 100. Likewise, the core 1860B can comprise outlet channels 1894B that are configured to remove a volume of air or other fluid away from the bed assembly 1810B. For example, in embodiments where the fluid module 100 comprises a thermoelectric device, the outlet channels 1894B can be used to remove the waste air stream (e.g., heated air when cooled air is being delivered to the top of the bed assembly 1810B, or vice versa) away from the core 1860B.

In some embodiments, the channels 1892B, 1894B are lined (e.g., using films, coatings, liners, inserts, etc.) to reduce the likelihood that air will enter the core 1860B, to structurally reinforce the channels 1892B, 1894B and/or for any other purpose. In addition, the inlet channels 1892B can include one or more filters to ensure that no dust, debris, particulates or other undesirable substances enter the fluid modules. Further, if the bed assembly 1810B is being operated so that air is being drawn away from occupants positioned thereon, air can be discharged through the inlet channels 1892B and/or the outlet channels 1894B. It will be appreciated that the size, shape, quantity, spacing, location, orientation and/or other details about the recesses 1890B, inlet channels 1892B and/or outlet channels 1894B can be varied, as desired or required.

Figure 25:
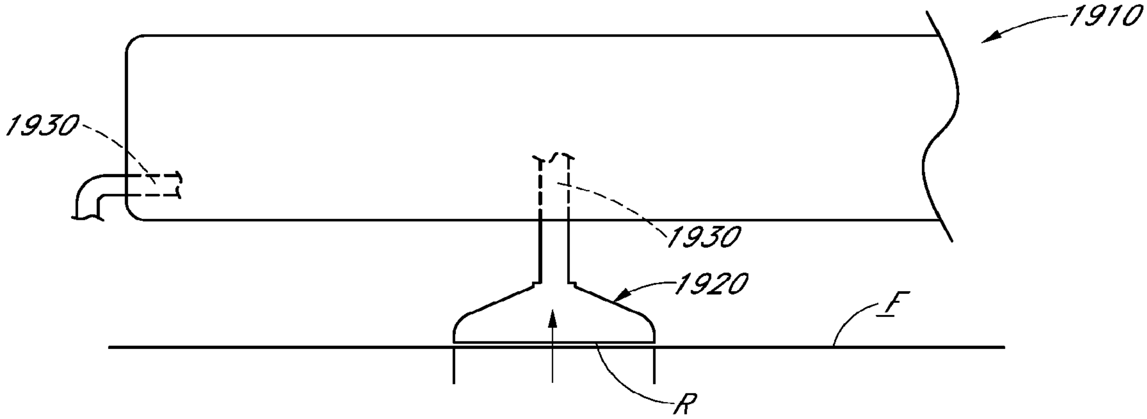
FIG. 25 schematically illustrates a side view of a climate controlled bed assembly in fluid communication with a home HVAC system according to one embodiment.
Figure 26:
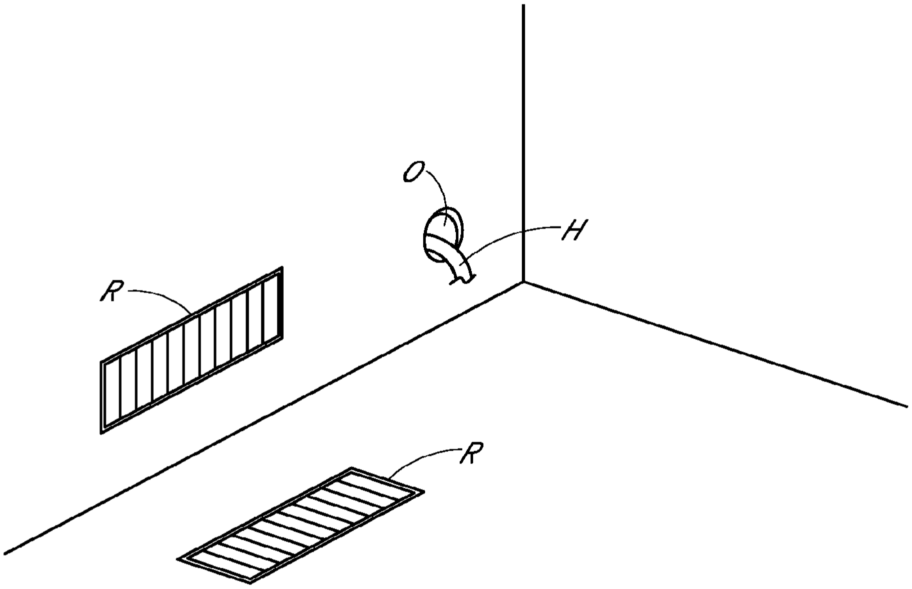
FIG. 26 illustrates a perspective view of registers or other outlets to a home HVAC system according to one embodiment.

As illustrated in FIGS. 25-30, a climate-conditioned bed assembly according to any of the embodiments disclosed herein can be placed in fluid communication with the HVAC system of a home or other facility (e.g., hotel, hospital, school, airplane, etc.). With reference to FIGS. 25 and 26, one or more passageways 1930 or other inlets of a bed assembly 1910 can be placed in fluid communication with a register R or other outlet of a main HVAC system (e.g., central air) or other climate control system, using an interconnecting duct 1920 or other conduit. Such an interconnecting duct 1920 can be configured to secure to (or replace) a standard register R, a non-standard register, other outlet and/or the like. In other embodiments, the interconnecting duct 1920 is flexible or substantially flexible to facilitate the connection to the register R and/or to accommodate movement of the bed 1910 relative to the floor or walls.

With continued reference to FIG. 25, an interconnecting duct 1920 can be connected to a passageway 1930 (or other internal or external conduit) along the bottom, side and/or any other portion of the bed assembly 1910. Such a duct 1920 can be connected to passageways 1930 of the bed assembly that are in fluid communication with one or more of climate zones, as desired or required. As shown in FIG. 26, a register R or other outlet of the HVAC system can be positioned along the floor, wall or any other area of a room. Alternatively, a bed assembly can be placed in fluid communication with a hose Hor other conduit that receives conditioned air from a main HVAC system or other climate control system. In the arrangement illustrated in FIG. 26, such a hose H can be routed through an opening O of the wall. However, in other embodiments, the hose H or other conduit can be accessed through an opening positioned along the floor, ceiling or any other location. In some arrangements, a home or other facility can be built or retrofitted with such HVAC connections and other components (e.g., hoses, other conduits, openings, etc.) in mind.

Figure 27:
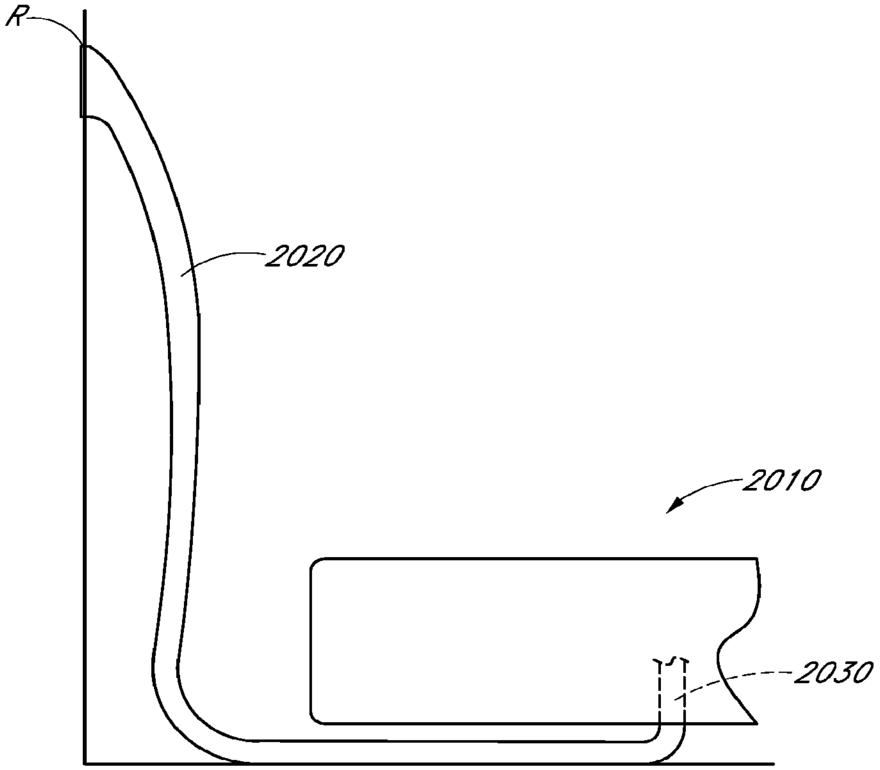
FIG. 27 schematically illustrates a side view of a climate controlled bed assembly in fluid communication with a home HVAC system according to another embodiment.

FIG. 27 illustrates another embodiment of a climate controlled bed assembly 2010 which is in fluid communication with a home's or other facility's HVAC system using an interconnecting duct 2020. As shown, the interconnecting duct 2020 can be connected to a register R that is positioned along an adjacent wall. In some embodiments, the interconnecting duct 2020 can comprise a tube or other conduit that can be easily flexed or otherwise manipulated to complete the necessary connections between the register R and the passageways 2030 of the bed 2010. For example, the interconnecting duct 2020 can comprise plastic, rubber and/or any other flexible materials. In other embodiments, the interconnecting duct 2020 comprises bellows, corrugations and/or other features that provide it with the desired flexible properties.

Figure 28A:
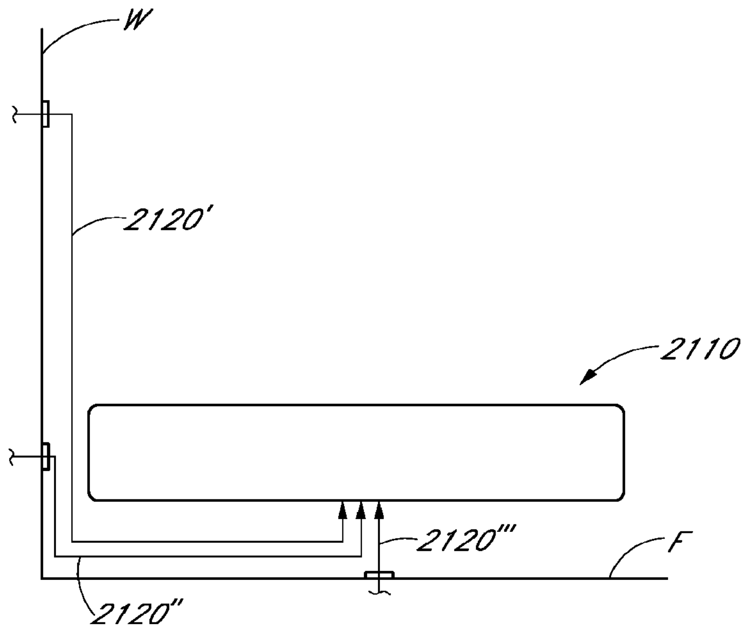
FIG. 28A schematically illustrates a climate controlled bed assembly in fluid communication with a home HVAC system according to one embodiment.

Placing one or more climate zones of a bed assembly in fluid communication with a HVAC system or other climate control system can offer certain advantages, regardless of the manner in which such a connection is accomplished. For example, under such systems, the need for separate fluid modules as part of the bed assembly can be eliminated. Thus, heated, cooled, dehumidified and/or otherwise conditioned air can be delivered directly to the bed assembly. Consequently, a less complicated and more cost-effective bed assembly can be advantageously provided. Further, the need for electrical components can be eliminated. One embodiment of such a bed assembly 2110 is schematically illustrated in FIG. 28A. As shown, one or more interconnecting ducts 2120', 2120", 2120'" can be used to place the bed 2110 in fluid communication with a main HVAC system. As discussed, the ducts can be secured to registers, outlets, hoses and/or other conduits positioned along a wall W and/or the floor F of a particular room.

Figure 28B:
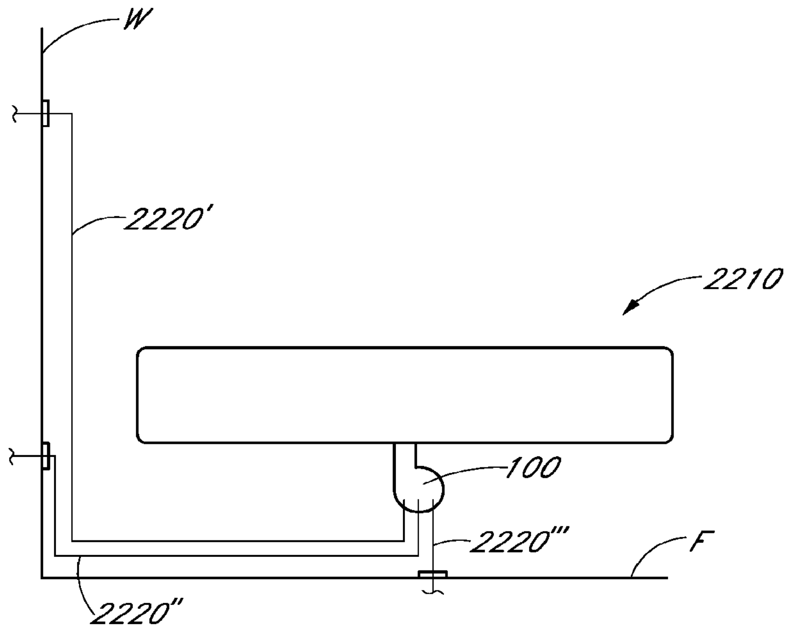
FIG. 28B schematically illustrates a climate controlled bed assembly in fluid communication with a home HVAC system according to another embodiment.

In other embodiments, conditioned air can be provided from a home's or other facility's HVAC system into the inlet of one or more fluid modules of the bed assembly. This can result in a more energy efficient and cost effective system, as the amount of thermal conditioning (e.g., heating, cooling, etc.) required by the fluid modules or other components of the bed assembly may be reduced. FIG. 28B schematically illustrates one embodiment of such a climate controlled bed assembly 2210. As shown, one or more interconnecting ducts 2220', 2220", 2220'" can be used to direct air from a main HVAC system to one or more fluid modules. In some embodiments, as discussed in greater detail herein, the fluid modules are positioned within a lower portion of a bed assembly. Thus, the interconnecting ducts can deliver conditioned air into the interior of such a lower portion. In other arrangements, however, conditioned air is delivered directly into the inlet of one or more fluid modules.

Figure 29A:
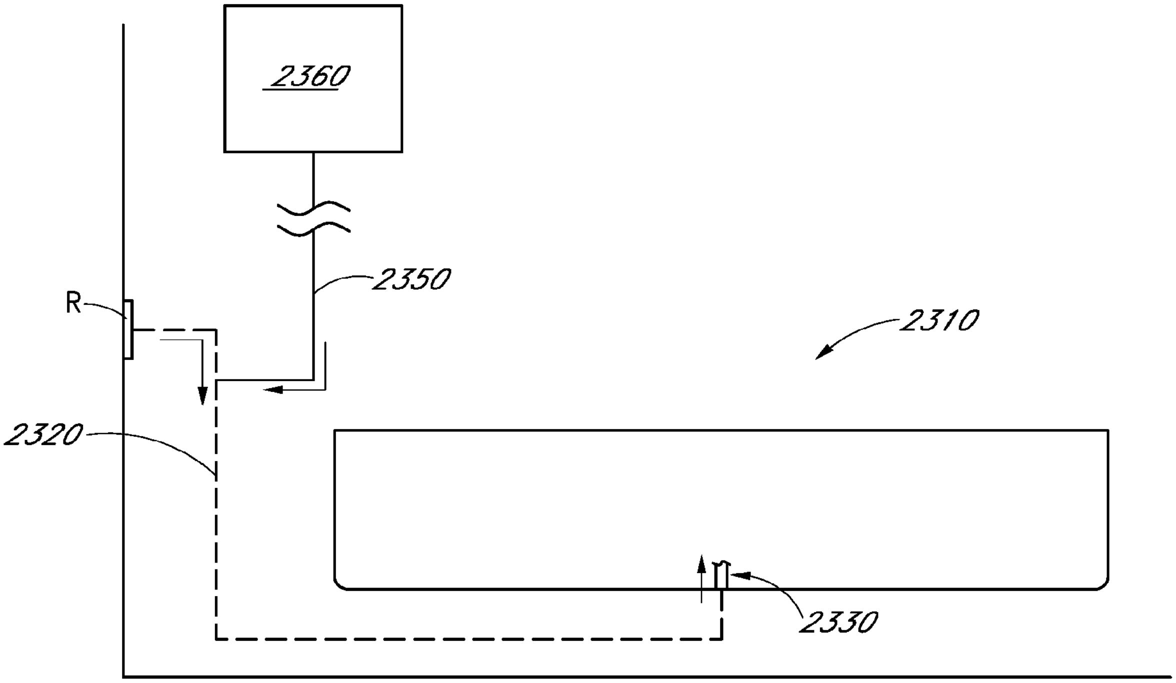
FIG. 29A schematically illustrates a climate controlled bed assembly in fluid communication with a home HVAC system and a separate fluid source according to one embodiment.

As schematically illustrated in FIG. 29A, an interconnecting duct 2320 can be configured to receive one or more additional fluid sources 2360. Consequently, the air being transferred from a register R or other outlet of a central HVAC system can be selectively combined with an external source 2360 of fluids and/or other substances, as desired or required. This additional fluid and/or other substance being delivered to the bed 2310 can provide certain benefits. For example, in some embodiments, one or more medications are selectively combined with HVAC air and delivered to a fluid distribution system of the bed 2310 (e.g., inlet, internal passageways 2330, etc.). Any type of pharmaceuticals (e.g., prescription, over-the-counter), homeopathic materials, other therapeutic substances and/or other medicaments can be delivered to the bed 2310, including, but not limited to, asthma medications, anti-fungal or anti-bacterial medications, high-oxygen content air, sleep medication and/or the like. In embodiments where the bed includes a medical bed, wheelchair or other seating assembly located within a hospital or other medical facility, physicians, nurses or other medical professionals can oversee the administration of one or more medications and other substances for therapeutic, pain-relief or any other purpose.

In other embodiments, the bed is adapted to receive other types of fluids or substances from the fluid source 2360, either in addition to or in lieu of HVAC air and/or medicaments. For example, insect repellent (e.g., citronella, Deet, etc.) can be provided to a bed situated in an environment in which bugs present health risks or a general nuisance. In certain arrangements, fragrances and/or other cosmetic substances are delivered to the bed to help create a desired sleeping or comfort environment. Any other liquid, gas, fluid and/or substance can be selectively provided to a climate control bed, as desired or required.

With continued reference to FIG. 29A, delivery conduit 2350 can be used to place the fluid source 2360 in fluid communication with the interconnecting duct 2320. In the illustrated embodiment, the fluid source 2360 and the delivery conduit 2350 are positioned at a location exterior to the bed assembly 2310. Alternatively, the fluid source 2360 and/or the delivery conduit 2350 can be positioned at least partially within one or more portions of the bed 2310 or other seating assembly. For example, the fluid source 2360 and/or the accompanying delivery conduit 2350 can be positioned within or on a side of the bed 2310 (e.g., mattress or other upper portion, box spring or other lower portion, etc.). Thus, the fluid source 2360 and/or the accompanying delivery conduit 2350 can be configured to not tap or otherwise connect into a HVAC interconnecting duct. In some embodiments, such as the one illustrated in FIG. 29C, a fluid source 2360' is configured to be placed within a dedicated compartment 2362', so that it is generally hidden from view. Additional details regarding such an arrangement are provided below.

According to some arrangements, a fluid transfer device (e.g., pump) is used to transfer a desired volume of a fluid from the fluid source 2360 to the conduit 2350 and/or other hydraulic components (e.g., interconnecting duct 2320, fluid distribution system of a bed or other seating assembly, etc.). Alternatively, the fluids and/or other materials contained within a fluid source 2360 can be delivered to the bed or other seating assembly using one or more other devices or methods, such as, for example, an ejector (or other Bernoulli-type device), gravity or the like.

Figure 29B:
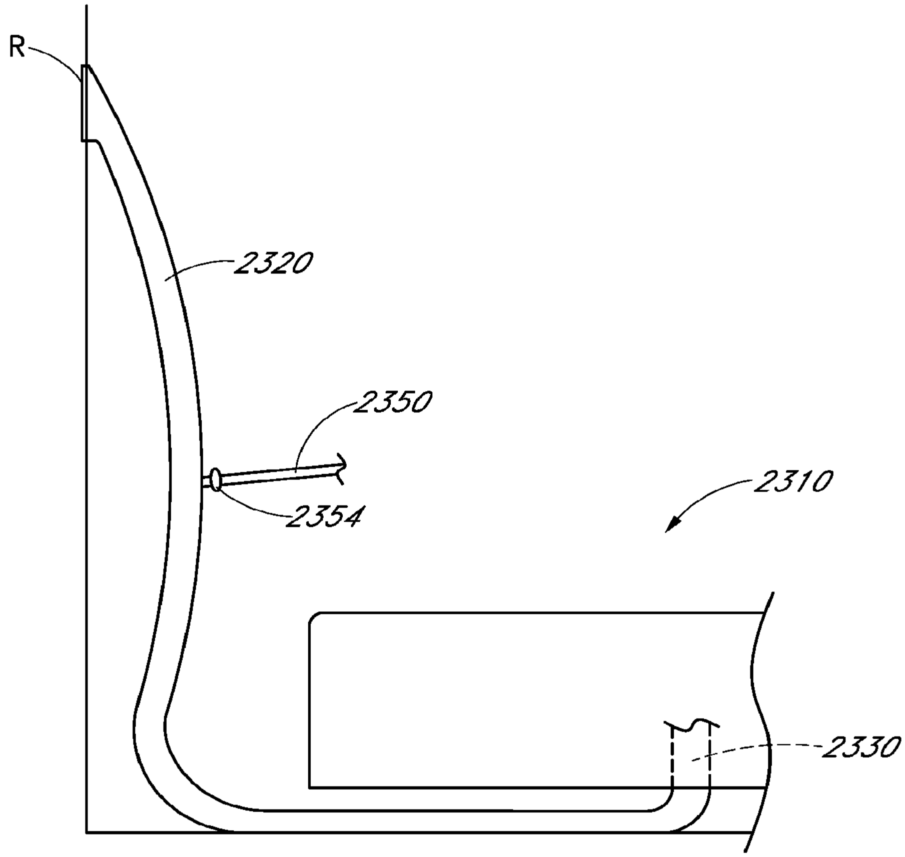
FIG. 29B schematically illustrates a climate controlled bed assembly in fluid communication with a home HVAC system and a separate fluid source according to another embodiment.

As discussed herein and illustrated in the arrangement of FIG. 29B, a delivery conduit 2350 can be used to place a fluid source in fluid communication with an interconnecting duct 2320. In depicted embodiment, the interconnecting duct 2320 is configured to convey air from a register R or other outlet of a main HVAC system to an inlet passageway 2330 of a climate controlled seating assembly 2310 (e.g., a bed, a seat, a wheelchair, etc.). In some arrangements, a coupling 2354 (e.g., quick-connect, other type of coupling, etc.) is located at or near the connection point between the delivery conduit 2350 and the interconnecting duct 2320. Such a coupling or other device can facilitate the manner in which the delivery conduit 2350 is connected to or detached from the interconnecting duct 2320. Thus, in some embodiments, the delivery conduit 2350 can be placed in fluid communication with the fluid distribution system of a bed or other seating assembly (e.g., via an interconnecting duct 2320) only when the addition of a medicant and/or any other substance of a fluid source 2360 are desired or required. Further, the system can include one or more check valves, other flow-control or flow-regulating devices and/or other hydraulic components to ensure that fluids are not inadvertently routed in undesirable directions through the various conduits and other components of the system.

Figure 29C:
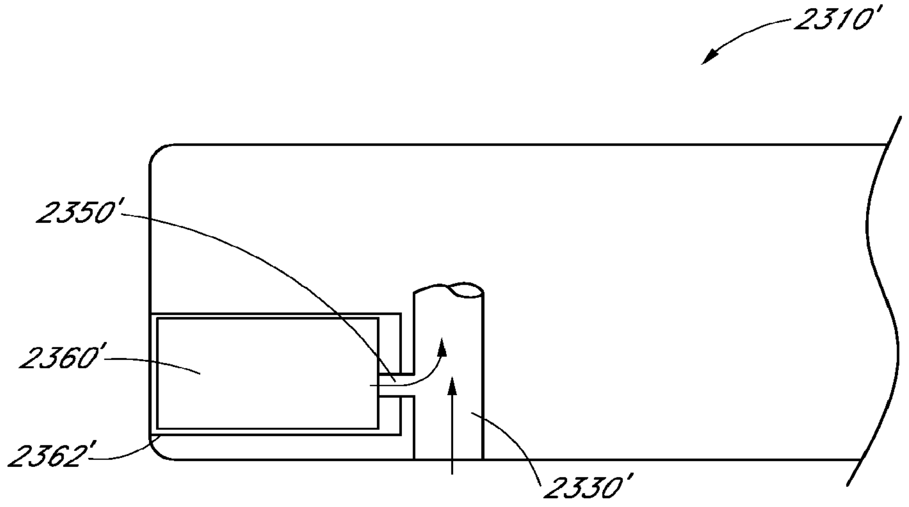
FIG. 29C schematically illustrates a climate controlled bed assembly in fluid communication with a separate fluid source according to one embodiment.

FIG. 29C schematically illustrates one embodiment of a fluid source 2360' contained within an internal compartment 2362', cavity or other interior portion of a bed 2310' or other seating assembly. As shown, the fluid source 2360' can be placed in fluid communication with a fluid distribution system 2330' (e.g., channel, conduit, passageway, etc.) of the bed using a delivery conduit 2350'. As discussed herein with reference to other embodiments, the medications, other fluids and/or any other substance contained within the fluid source 2360' can be selectively transferred to the fluid distribution system 2330' of the bed assembly using a fluid transfer device (e.g., a pump), an ejector or other Bernoulli-type mechanism, gravity and/or any other device or method.

Further, the bed assembly 2310' can comprise one or more valves and/or other flow-regulating devices or features to help ensure that fluids and other materials are delivered to the distribution system 2330' of the bed in accordance with a desired or required manner.

Figure 30:
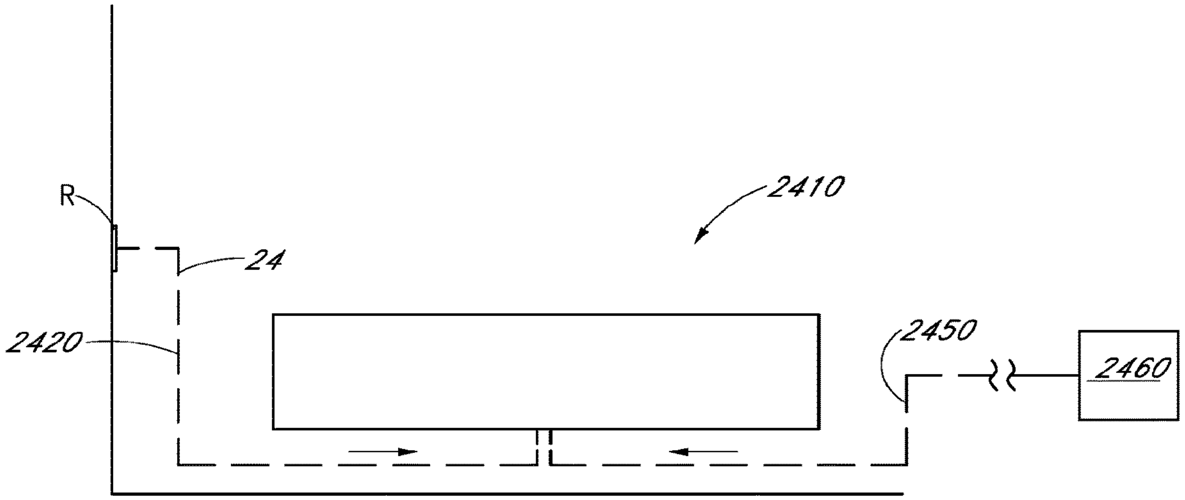
FIG. 30 schematically illustrates a climate controlled bed assembly in fluid communication with a home HVAC system and a separate fluid source according to another embodiment.

As discussed above, a separate fluid source does not need to be connected to a HVAC system configured to provide environmentally-conditioned air (e.g., heated or cooled air, ambient air, humidity-modified air, etc.) to a seating assembly. For example, as illustrated in FIG. 30, a bed assembly 2410 can include separate conduits 2420, 2450 that are configured to place a register R or other outlet of a HVAC system and a separate fluid source 2460 in fluid communication with the assembly. Further, in any of the embodiments disclosed herein, a bed or other climate controlled seating assembly can be configured to receive medications and/or other materials from a separate fluid source 2460 without being adapted to receive air from a HVAC system.

In any of the various embodiments disclosed herein, or variations thereof, a fluid source can include a container (e.g., a tank, reservoir, bottle, vial, ampoule, gel-pack, etc.) that is otherwise configured to be used with a climate controlled seating assembly. For example, such a container can be sized and shaped to fit within the internal compartment 2362' of the assembly illustrated in FIG. 29C. Further, such containers can be adapted to be quickly and easily installed, removed and/or replaced by users, thereby permitting users to change the medication, insect repellent, fragrance and/or any other substance being delivered to and through the seating assembly (e.g., bed).

In some arrangements, information regarding the temperature, flowrate, humidity level and/or other characteristics or properties of conditioned air being conveyed in a HVAC system can be detected and transmitted (e.g., using hardwired or wireless connections) to a control module (e.g., ECU) of the bed's climate control system. Accordingly, the bed's climate control system can adjust one or more devices or settings to achieve a desired cooling and/or heating effect one or more bed occupants. The interconnecting ducts can include one or more valves (e.g. modulating valves, bleed valves, bypass valves, etc.) or other devices to selectively limit the volume of air being delivered to the bed assembly. For example, the entire stream of pre-conditioned air may need to be diverted away from the climate controlled bed assembly in order to achieve a desired cooling or heating condition along the top surface of the bed. Any of the embodiments of a climate controlled bed assembly disclosed herein, or equivalents thereof, can be placed m fluid communication with a main HVAC system.

According to certain embodiments, the various control modules of the bed's climate control system are configured to receive information (e.g., temperature, flowrate, humidity, etc.) regarding the air being delivered from a main HVAC system to one or more climate zones of the bed assembly. As a result, the climate module can use this information to achieve the desired cooling, heating and/or ventilation effect for each climate zone, either with or without the assistance from the various thermal modules. In some arrangements, the air being delivered to the bed's climate control system can be regulated (e.g., by dampers, valves, bleed-offs, modulators, etc.) in order to achieve the desired thermal conditioning along one or more portions of the bed assembly.

In some arrangements, data or information related to the temperature and/or humidity of the room in which the bed assembly is transmitted to the bed's climate control system. In one embodiment, such data can be provided to the user via a user input device and/or any other component or device. In alternative arrangements, information regarding a bed's climate zone(s), the operation of the fluid modules and/or any other operational aspect of the bed can be transmitted and/or displayed by a controller (e.g., thermostat) of the home's main HVAC system. Accordingly, one or more environmentally conditioned bed assemblies can be advantageously controlled using a home's thermostat or other controller. Similarly, one or more user input devices can be used to adjust or otherwise control the operation of the home's main HVAC system.

According to some embodiments, a climate control bed or other seating assembly can constitute merely one component of a larger zonal cooling system. As discussed herein, a bed can be placed in fluid and/or data communication with one or more HVAC systems (e.g., central heating and cooling unit, furnace, other thermal conditioning device, etc.) or other thermal conditioning devices or systems of a home or other facility (e.g., hospital, clinic, convalescent home or other medical facility, a hotel, etc.). As a result, the climate control system of the bed or other seating assembly located within a particular room or area can be operatively connected to the control system of one or more other climate control systems (e.g., main HVAC system). Thus, such configurations can be used to operate the climate controlled bed (or other seating assembly, e.g., medical bed, wheelchair, sofa, other chair, etc.) and a building's other climate control system in a manner that helps achieve one or more objectives. For example, under an energy efficiency mode, when a climate controlled bed is in operation, the level of cooling, heating or ventilation occurring within the corresponding room or area of a building can be advantageously reduced or eliminated. In such an embodiment, the bed or other seating assembly can be viewed as a smaller climate control zone within a larger climate control zone (e.g., the room).

Alternatively, when the bed is not being used, the home's or other facility's HVAC control system can be configured to operate in a manner that achieves a desired comfort level (e.g., temperature, humidity, etc.) within the entire room or area in which the seating assembly is positioned.

In other arrangements, a room (or other defined or undefined area) is operated so as to achieve a first conditioning effect (e.g., cooling, heating, ventilation, etc.) within the entire room and a second conditioning effect specific only to a bed or other seating assembly positioned within that room. Thus, depending on the control algorithm being used, a main HVAC system may or may not be operating at the same time as a climate control system for a bed (or other seating assembly). In certain embodiments, however, regardless of the exact operational scheme being utilized, the climate control system of a seating assembly is operatively connected to and working in cooperation with the control system of a home's or other facility's HVAC system (e.g., central air, furnace, etc.).

A climate controlled bed or other seating assembly can include one or more sensors (e.g., temperature sensors, moisture sensors, humidity sensors, etc.). As discussed in greater detail herein, such sensors can be used to operate the climate control system of the assembly within a desired range or zone. However, the use of such sensors on, within or near a bed or other seating assembly can provide additional benefits and advantages. For example, one or more temperature sensors can be positioned along an upper portion of a bed, medical bed, wheelchair or other seating assembly (e.g., at or near the location where an occupant is expected to be positioned). Such sensors can help detect the body temperature of an occupant. In some embodiments, such measurements can be transmitted to an alarm, display, other output, control unit, processor and/or other device or component, so as to alert the occupant and/or interested third parties of the occupant's body temperature.

Such arrangements can be particularly beneficial in hospitals or other medical facilities where it is important to closely monitor patients' vital signs (e.g., to notify the proper personnel of a patient's fever, hypothermia, etc.). Further, such a configuration can be used in a home or other setting to monitor the body temperature of infants, toddlers, young children, the elderly, the infirmed and/or the like. In other embodiments, a bed or other seating assembly is configured to use the body temperature measurements to make corresponding changes to the assembly's climate control system (e.g., increase or decrease the heating, cooling or ventilation effect), as desired or required by a particular control scheme.

In other arrangements, a seating assembly (e.g., bed, medical bed, wheelchair, etc.) includes one or more moisture sensors. Such sensors can be positioned along the top of the seating assembly, along an interior of the top portion (e.g., mattress) and/or at any other location. Regardless of their exact quantity, type, location and other details, such moisture sensors can be configured to detect the presence of water, sweat, urine, other bodily fluids and/or any other liquid or fluid. As discussed herein with reference to body temperature sensors, moisture sensors can also be operatively connected to one or more alarms, monitors, control units, other processors and/or the like. Accordingly, the occupant and/or interested third parties can be promptly informed about the presence of moisture at or near one or more sensors. Such embodiments can be particularly helpful in monitoring people (e.g., children, elderly, infirmed, etc.) who are prone to wetting their beds or other seating assemblies (e.g., wheelchair, chair, etc.). Further, such arrangements can be desired where it is desired to detect the presence of sweat or other fluids that may be discharged by an occupant.

Figure 31:
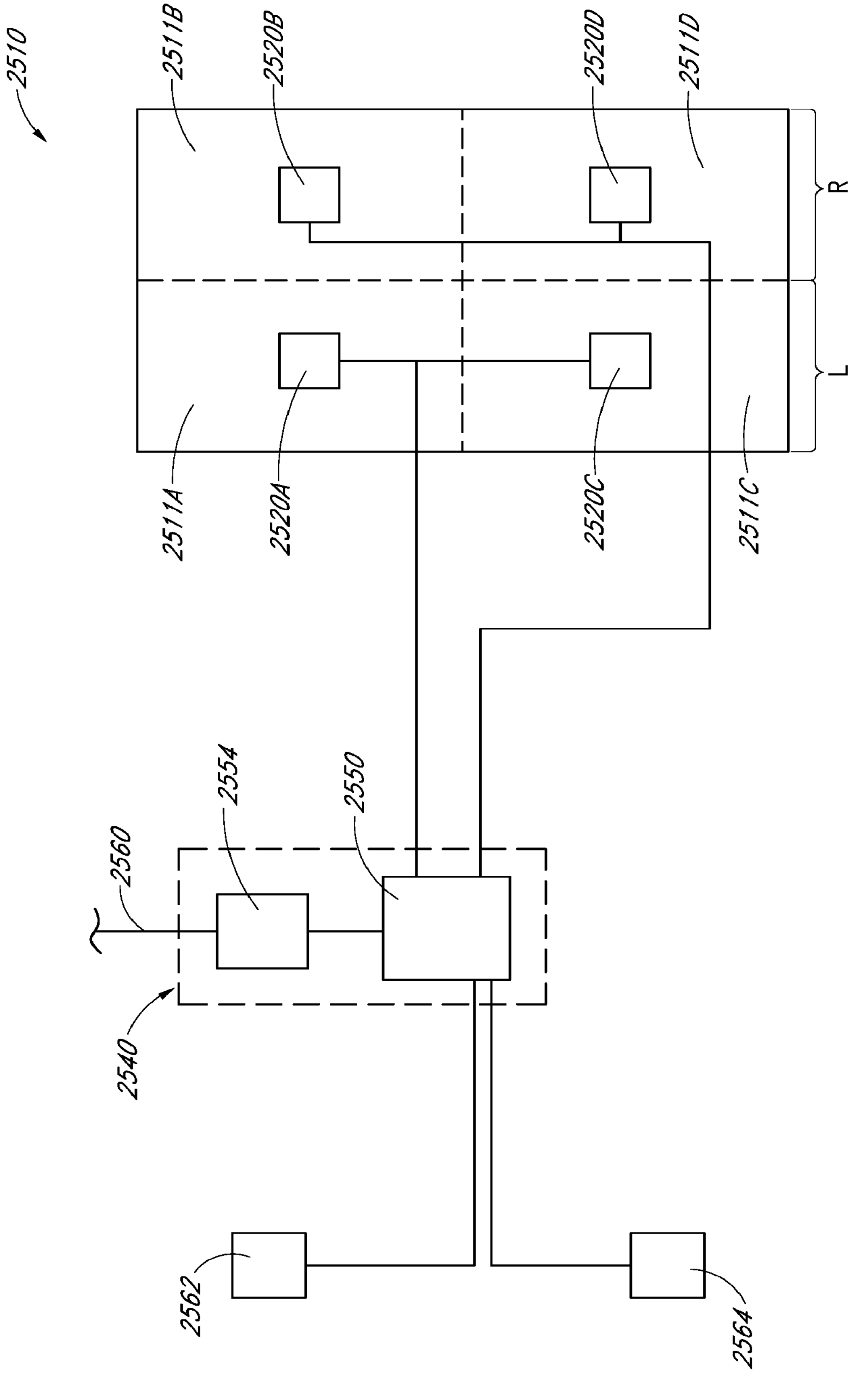
FIG. 31 illustrates a schematic of a climate-controlled bed and its various control components according to one embodiment.

FIG. 31 schematically illustrates one embodiment of a climate controlled bed assembly 2510 and various components and systems that are operatively connected to it. The bed can be configured according to any of the embodiments presented herein or equivalents thereof. As shown, the bed 2510 can include two or more different zones, areas or portions that may be operated independently of one another. In the depicted arrangement, the bed 2510 comprises a total of four climate zones 2511A-2511D. Alternatively, a bed 2510 or other seating assembly can include more or fewer climate zones, as desired or required.

With continued reference to FIG. 31, two of the climate zones 2511A, 2511C are positioned along the left side L of the bed 2510, whereas two of the climate zones 2511B, 2511D are situated along the right side R of the bed 2510. In the depicted embodiment, each side of the bed (e.g., the left side Land the right side R) is further divided into two zones or areas. By way of example, the left side L includes a first climate zone 2511A located along an upper portion of the bed 2510 and a second climate zone 2511C located along a lower portion of the bed 2510. Such zones can permit an occupant to selectively adjust the climate control effect on his or her side of the bed, as desired or required. For instance, a bed occupant positioned along the left side L may choose to operate the first climate zone 2511A at a warmer or cooler setting than the second climate zone 2511B. Such configurations can advantageously allow a user to customize the heating, cooling and/or ventilation effect on his or her side of the bed 2510 without influencing the desired heating, cooling and/or ventilation effect of a second user.

According to some embodiments, air or other fluid is supplied to each climate zone 2511A-2511D using one or more thermal modules 2520A-2520D. For example, in FIG. 31 each climate zone 2511A-2511D comprises one thermal module 2520A-2520D. Accordingly, each occupant can regulate the flow of thermally-conditioned and/or ambient air or other fluids that are delivered toward his or her side of the bed assembly 2510. Further, as discussed, two or more climate zones can be provided along a portion of the bed intended to support a single occupant. Thus, an occupant can advantageously adjust the cooling, heating and/or ventilation effect along various regions of his or her side of the bed 2510 (e.g., head or neck area, leg area, main torso area, etc.), as desired.

As discussed in greater detail herein with reference to other embodiments, each thermal module 2520A-2520D can comprise a fluid transfer device (e.g., a blower, fan, etc.), a thermoelectric device (e.g., a Peltier circuit) or any other heating or cooling device capable of thermally conditioning a fluid (e.g., a convective heater), one or more sensors, other control features and/or any other component or feature, as desired or required. For convenience and ease of installation, some or all of these components can be included within a single housing or other enclosure. As discussed in greater detail, each thermal module 2520A-2520D can be advantageously adapted to selectively provide thermally-conditioned (e.g., cooled, heated, etc.) and/or thermally-unconditioned (e.g., ambient) air or other fluids toward one or more bed occupants.

Figure 32A:
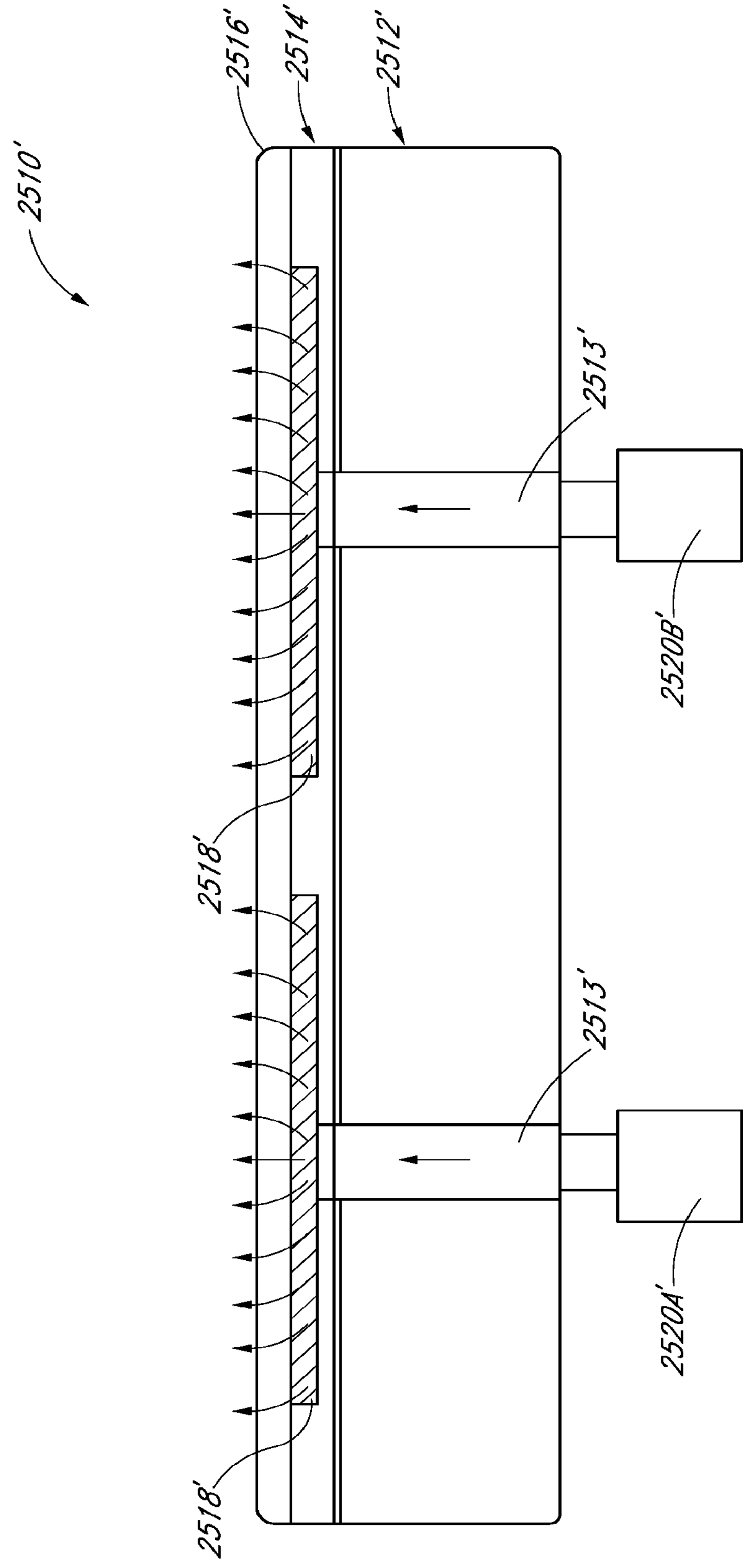
FIG. 32A schematically illustrates a cross-sectional view of one embodiment of a climate-conditioned bed having separate climate zones.

For example, with reference to the cross-sectional view of FIG. 32A, a mattress 2512' or other upper portion of the bed assembly 2510' can include one or more internal passages 2513' or conduits through which fluids may be directed. In some embodiments, as shown in FIG. 252A, the thermal modules 2520A', 2520B' are positioned generally below the mattress 2512' or other upper portion and are placed in fluid communication with one or more of the internal passages 2513'. Accordingly, fluids can be selectively delivered from each thermal module 2520A', 2520B' to a fluid distribution member 2518' located at or near an upper portion of the bed assembly 2510' to create the desired heating, cooling and/or ventilation effect along that corresponding region or area of the bed. In any of the arrangements disclosed herein, adjacent climate zones 2511A-2511D of a bed assembly can be partially or completely isolated (e.g., thermally, hydraulically, etc.) from each other, as desired or required. Alternatively, adjacent climate zones can be configured to generally blend with one another, without the use of specific thermal or hydraulic barriers separating them. In other embodiments, the manner in which environmentally (e.g., thermally) conditioned and/or unconditioned fluids are directed to an upper portion of a bed assembly can be different than illustrated in FIG. 32A.

Alternatively, as discussed in greater detail herein, one or more of the passages or conduits of a bed assembly can be configured to receive air or other fluids from a home's main HVAC system (e.g., home air-conditioning and/or heating vent) and to selectively deliver such fluids toward one or more occupants situated on the bed. Additional disclosure and other details regarding different embodiments of climate controlled beds can be found in U.S. Publication No. 2008/0148481, titled AIR-CONDITIONED BED, the entirety of which is hereby incorporated by reference herein.

Regardless of their exact design, thermally-controlled bed assemblies can be configured to selectively provide air or other fluids (e.g., heated and/or cooled air, ambient air, etc.) to one or more occupants positioned thereon. Thus, the incorporation of various climate zones 2511A-2511D in a bed 10 can generally enhance an occupant's ability to control the resulting heating, cooling and/or ventilation effect. For example, such a bed can be adapted to create a different thermally-conditioned environment for each occupant. In addition, a particular occupant can vary the heating, cooling and/or ventilation scheme within his or her personal region or space (e.g., the head area of the bed can be operated differently than the midsection or lower portion of the bed).

With continued reference to the schematic of FIG. 31, the thermal modules 2520A-2520D of the bed assembly 2510 can be operatively connected to a climate control module 2550 or other electronic control unit (ECU). As shown, the control module 2550 can be in a location remote to the bed 2510. Alternatively, the control module 2550, ECU and/or other control unit can be incorporated into one or more portions of the bed assembly (e.g., backer board of the foundation, box spring, other support member, etc.). In turn, the control module 2550 can be operatively connected to a power source 2554 that is configured to supply the necessary electrical current to the various electronic components of the climate control system, such as, for example, the fluid transfer device, the thermoelectric device and/or other portion of the thermal modules 2520A-2520D, the control module 2550 itself, the user input devices 2562, 2564 and/or any other item, device or system.

According to certain arrangements, the power source 2554 comprises an AC adapter having a cable 2560 that is configured to be plugged into a standard wall outlet, a DC adapter, a battery and/or the like. As illustrated schematically in FIG. 31, the control module 2550 and the electrical power source 2554 can be provided within a single housing or other enclosure 2540. However, in alternative embodiments, the control module 2550 and the power source 2554 can be provided in separate enclosures, as desired or required.

As illustrated in FIG. 31, two or more thermal modules 2520A-2520D of a bed assembly 2510 can be operatively connected to each other. Such cross-connections can facilitate the transmission of electrical current and/or data from the thermal modules 2520A-2520D to other portions of the climate control system, such as, for example, the control module 2550 or other ECU, a power source 2554, a user input device 2562, 2564 and/or the like. The connections between the different electrical devices, components and/or systems of a climate control bed assembly can be hardwired (e.g., using a cable, cord, wire, etc.) and/or wireless (e.g., radio frequency, Bluetooth, etc.), as desired or required by a particular application or use. According to some embodiments, the thermal modules adapted to deliver fluids to a single side of the bed 2510 (e.g., the left side L, the right side R, etc.) are connected to each using one or more hardwired and/or wireless connections. For instance, in FIG. 31, the two thermal modules 2520A, 2520C on the left side L of the bed 2510 are operatively connected to each other. Likewise, the two thermal modules 2520B, 2520D on the right side R are also connected to one another. Thus, as depicted, a single connection can be used to transfer electrical power, other electrical signals or communications and/or the like to and/or from each paring or other grouping of thermal modules 2520A-2520D. The manner in which the various thermal modules, control units and/or other components of the climate control system are arranged can vary.

With continued reference to FIG. 31, the bed's climate control system can additionally include one or more user input devices 2562, 2564. Such user input devices 2562, 2564, which in the depicted embodiment are operatively connected to the control module 2550, are configured to permit a user to selectively regulate the manner in which the climate control system is operated. As with other electrical components of the climate control system, the user input devices 2562, 2564 can be connected to the control module 2550 and/or any other component using a hardwired and/or wireless (e.g., radio frequency, Bluetooth, etc.) connection.

According to certain embodiments, a user input device 2562, 2564 comprises at least one controller that is configured to regulate one or more operational parameters of the climate controlled bed assembly 2510. A user input device 2562, 2564 can include one or more buttons (e.g., push buttons), switches, dials, knobs, levers and/or the like. Such controllers can permit a user to select a desired mode of operation, a general heating, cooling and/or ventilation scheme, a temperature setting or range and/or any other operational parameter. For instance, in some arrangements, the input device 2562, 2564 allows users to select between "heating," "cooling" or "ventilation." In other embodiments, the controllers of the input device can be adjusted to select a particular level of heating, cooling or ventilation (e.g., low, medium, high, etc.) or a preferred temperature for the fluid being delivered toward an occupant positioned along an upper surface of the bed 2510.

Alternatively, an input device 2562, 2564 can be configured to provide various data and other information to the user that may be relevant to the operation of the bed 2510. For example, the input device can comprise a display (e.g., LCD screen) that is adapted to show the current mode of operation, a real-time temperature or humidity reading, the date and time and/or the like. In certain embodiments, the input device comprise a touchscreen display that is configured to both provide information to and receives instructions from (e.g., using softkeys) a user. As discussed in greater detail herein, a user input device 2562, 2564 can be configured to also control one or more other devices, components and/or systems that are generally unrelated or only remotely-related to the operation of the climate control system, such as, for example, a digital music player, a television, an alarm, a lamp, other light fixture, lights and/or the like, as desired or required. In some arrangements, the user input devices 2562, 2564 of a bed assembly 10 can be operatively connected to such other devices, components or systems using one or more hardwired and/or wireless connections.

In some arrangements, a user input device is customized according to a customer's needs or desires. As discussed herein, for example, the user input device can be configured to allow an occupant to regulate one or more aspects of the bed's climate control system (e.g., setting a target thermal conditioning or temperature setting along a top surface of the bed). Further, a user input device 2562, 2564 can be adapted to regulate other devices or systems, even if such devices or systems are not directly related to the bed assembly 2510. For instance, an input device can control one or more aspects of a digital medial player (e.g., iPod, mp3 player, etc.), a television, a lamp, a home's lighting system, an alarm clock, a home's main HVAC system (e.g., central air-conditioning and/or heating system) and/or the like. A user input device can include one or more hardwired and/or wireless connections in order to properly communicate with such other devices or systems. According to some embodiments, input devices are supplied to end users already configured to be used with one or more other devices and/or systems. Alternatively, however, a user may need to at least partially program or otherwise set-up an input device to operatively connect it to one or more ancillary devices or systems (e.g., usmg specific manufacturers' codes of the devices or systems with which the input device will be operatively connected).

Moreover, a user input device 2562, 2564 can include a touchscreen or other display that is configured to provide information about the climate control bed assembly and/or any other device or system that is controlled or otherwise operatively connected to the input device. For example, such a display can indicate the specific operational mode under which the climate control system is operating, a target temperature setpoint or range that the climate control system is programmed to achieve, the temperature, humidity and/or other measurements related to the ambient environment of the room in which the bed is located, the date and time, the status of an alarm or other feature with which the bed's control unit is operatively connected, information regarding a digital media player or television to which the input device is operatively connected (e.g., a song title, television program title and other information, etc.) and/or the like. In addition, a user input device can be further personalized using skins or other decorative features, as desired or required.

A climate control bed assembly can be alternatively controlled, at least in part, by one or more other devices or systems, either in lieu of or in addition to a user input device. For example, in certain embodiments, a user can regulate the operation of the bed assembly (e.g., select a mode of operation, select an operating temperature or range, initiate a specific operating scheme or protocol, etc.) and/or control any other devices or systems with which the bed assembly is operatively connected using a desktop device (e.g., a personal computer), a personal digital assistant (PDA), a smartphone or other mobile device and/or the like. In other arrangements, the climate control system of a climate conditioned bed can be in data communication with a wall-mounted device, such as, for example, a thermostat for a home HVAC system. Thus, a single controller can selectively modify the operation of a home's central air-conditioning and heating system and one or more climate controlled bed assemblies. Moreover, as discussed in greater detail herein with reference to FIGS. 25-30, the home's HVAC system can be placed in fluid communication with one or more fluid passages, conduits or other portions of a bed assembly.

A climate control system for a bed assembly 2510 can be additionally configured to continuously or intermittently communicate with one or more networks to receive firmware and/or other updates that help ensure that the system is operating correctly. For example, the control module 2550, user input devices 2562, 2564 and/or any other component of the climate control system can be designed to connect to a network (e.g., internet). In some embodiments, the bed assembly is operatively connected to a manufacturer's or supplier's website to receive the necessary updates or patches. In other arrangements, such network connections can facilitate the repair, maintenance or troubleshooting of the climate control bed assembly, without the need for an on-site visit by a technician.

A user input device can be adapted for use with different climate control systems for beds or other seating assemblies. For instance, a user input device can comprise a cable or other hardwired connection that is sized, shaped and otherwise adapted to be received by a corresponding port or coupling of a control module or other portion of the climate control system. Likewise, in embodiments where the user input device is wireless (e.g., remote control, other handheld, etc.), the input device can be configured to operate with two or more different climate control systems. This can help create a modular system in which one or more components of a thermally-conditioned bed or other seating assembly are combined without the need for complicated and/or time-consuming re-designs.

According to certain arrangements, each user input device 2562, 2564 is adapted to regulate one or more thermal modules, climate zones and/or other devices or components of a climate controlled bed assembly 2510. For example, with continued reference to the schematic of FIG. 31, a first user input device 2562 can regulate the operation of the thermal modules 2520A, 2520C, and thus, the corresponding climate zones 2511A, 2511C, situated along the left side L of the bed 2510. Likewise, a second user input device 2564 can regulate the operation of the thermal modules 2520B, 2520D, and thus, the corresponding climate zones 2511B, 2511D, situated along the right side R of the bed 2510. Consequently, each bed occupant can selectively regulate the heating, cooling and/or ventilation scheme along his or her side of the bed 2510. Moreover, as discussed herein, a bed can include two or more different thermal modules 2520A-2520D and/or climate zones 2511A-2511D within a region sized and otherwise configured to receive a single occupant. Accordingly, in certain embodiments, an input device 2562, 2564 is capable of regulating one thermal module (or climate zone) separately and independently from another thermal module (or climate zone), as desired. Thus, as depicted in FIG. 31, an input device 2562, 2564 can be advantageously configured to control one, two or more thermal modules or climate zones generally located along one side (e.g., the left side L, right side S, etc.) or any other region of the bed assembly 2510.

According to certain arrangements, the various devices, components and features of a climate controlled bed assembly 10 are configured to adjust the type and/or level of heating, cooling and/or ventilation by modifying the operation of the thermal modules 2520A-2520D. For example, the rate at which fluids are transferred toward an occupant (e.g., using a blower, fan or other fluid transfer device) can be advantageously controlled. Further, the amount and direction of electrical current delivered to the thermoelectric device can be altered to achieve a desired level of heat transfer to or from the fluid transferred by the fluid transfer device. One or more other aspects of the systems can also be modified to achieve a desired operational scheme.

In order to achieve a desired thermal conditioning effect in each climate zone 2511A-2511D, the thermal modules 2520A-2520D, other components of the climate control system and/or other portions of the bed 2510 can comprise one or more sensors. Such sensors can include temperature sensors, humidity sensors, occupant-detection sensors and/or the like. Accordingly, the climate control system can advantageously maintain a desired level of thermal conditioning (e.g., a setting, temperature value or range, etc.). The temperature sensors can be positioned within a thermoelectric device (e.g., on or along the substrate of the thermoelectric device), within or on other portions or components of the thermal module, upstream or downstream of a thermal module (e.g., within or near a fluid path to detect the amount of thermal conditioning occurring within the thermal module), along one or more top surfaces of the bed assembly 2510 and/or at other location.

According to one embodiment, a thermally-conditioned bed assembly 2510 comprises a closed-loop control scheme, under which the function of one or more thermal modules (e.g., blower or other fluid transfer device, thermoelectric device or other heating/cooling device and/or the like) is automatically adjusted to maintain a desired operational setting. For example, the climate control system can be regulated by comparing a desired setting (e.g., a target temperature value or range, a target cooling, heating or ventilation effect, etc.) to data retrieved by one or more sensors (e.g., ambient temperature, conditioned fluid temperature, relative humidity, etc.).

In certain arrangements, a climate control system for a bed or other seating assembly can comprise a closed-loop control scheme with a modified algorithm that is configured to reduce or minimize the level of polarity switching occurring in one or more of the thermoelectric devices of the thermal modules 2520A-2520D. As a result, the reliability of the overall climate control system can be advantageously improved.

As discussed in greater detail herein, a thermally-conditioned bed 2510 or other seating assembly can include one, two or more different climate zones 2511A-2511D. In some embodiments, as illustrated schematically in FIG. 31, such a bed 2510 includes separate climate zones for each occupant. Further, the area or other portion associated with each occupant (e.g., left side L, right side R, etc.) can include two or more distinct climate zones 2511A-2511D, allowing an occupant to further customize a heating, cooling and/or ventilation scheme according to his or her preferences. Thus, as discussed above, a user can configure his or her side of a bed assembly 2510 to provide varying levels of thermal conditioning to different portions of the bed (e.g., top or head area, midsection area, lower or leg area, etc.), as desired or required.

A climate controlled bed or other seating assembly can be operated under a number of different schemes. For example, in a simple configuration, a user selects a desired general setting or mode (e.g., "heating," "cooling," "ventilation," "high," "medium," "low," etc.) and the climate control system maintains such a setting or mode for a particular time period or until the user instruct the system otherwise. In other arrangements, a user chooses a target temperature value or range or some other desired cooling, heating or ventilation effect, and the climate control system automatically makes the necessary adjustments to maintain such a value, range or effect. Under such a scheme, the climate control system can comprise one or more sensors (e.g., temperature sensors, humidity sensors, etc.) that are adapted to facilitate the system to achieve the desired settings (e.g., using feedback loops). In other embodiments, the various components of a climate controlled bed can be operated according to a predetermined schedule or protocol. Such schedules or protocols can be based on time of day, the time when a user typically or actually goes to bed, projected or actual wake-up time, the ambient temperature within or outside the room where the bed is located and/or any other factor. Accordingly, the control module 50 and/or other component of the climate control system can comprise or be operatively connected to a control algorithm that helps execute a particular protocol.

In any of the embodiments disclosed herein, the control system can be operatively connected to one or more input devices 2562, 2564 that advantageously permit users to selectively modify the operation of the environmentally conditioned bed or other seating assembly. As discussed in greater detail herein, such input devices can allow a user to customize the manner in which the bed or other assembly is controlled, in accordance with the user's desires or preferences.

According to certain embodiments, a climate control system for a bed or other seating assembly can be adapted to provide a desired level of thermal pre-conditioning. Such a pre-conditioning feature can allow a user to program a bed so that it achieves a particular temperature or setting prior to use. For example, a user can use an input device to direct the climate control system to cool, heat and/or ventilate the bed prior to the user's anticipated sleep time. Likewise, a user can selectively program a climate control system to regulate the temperature or thermal-conditioning effect during the anticipated sleep period. In such arrangements, a user can set a different target temperature, thermal conditioning effect, desired comfort level and/or any other setting for a specific time period. Such setpoints can be programmed for various desired or required time intervals (e.g., 10 minutes, 15 minutes, 30 minutes, 1 hour, 2 hours, 3 hours, 4 hours, etc.). Accordingly, a user can customize the operation of a climate controlled bed assembly according to his or her specific needs and preferences.

Further, the control system can be configured to change the heating, cooling and/or ventilation settings of the bed to help a user wake up, as desired or required. For example, the flowrate, temperature and/or other properties of the air delivered to the top surfaces of a bed can be increased or decreased to help awaken an occupant or to urge an occupant to get out of bed.

Moreover, a climate control system for a bed or other seating assembly can be adapted to shut down after the passage of a particular time period and/or in response to one or more other occurrences or factors. In certain arrangements, the operation of one or more thermal modules is altered (e.g., the speed of the fluid transfer device is reduced or increased, the heating and/or cooling effect is reduced or increased, etc.) or completely terminated at a specific time or after a predetermined time period following an occupant initially becomes situated on a bed or other seating assembly. Accordingly, in some embodiments, the bed or other seating assembly includes one or more occupant sensors to accurately detect the presence of an occupant thereon.

As discussed herein, a climate-conditioned bed or other seating assembly can include one or more humidity sensors. Such humidity sensors can be positioned along any component of the bed's climate control system (e.g., user input devices, control module, thermal modules, etc.), any other portion of the bed assembly (e.g., mattress or upper portion, foundation or lower portion, etc.) and/or the like. Regardless of their exact configuration, location and other details, humidity sensors can be operatively connected to the climate control system to provide additional control options to a user.

According to certain arrangements, the relative humidity of the air or other fluids passing through the fluid modules, passages and/or other portions of a bed assembly can be detected to protect against the undesirable and potentially dangerous formation of condensate therein. For instance, if relatively humid air is sufficiently cooled by a thermal module, condensation may form along one or more components or portions of the assembly's climate control system. If not removed or otherwise handled, such condensation can cause corrosion and/or other moisture-related problems. Further, any condensation that results may negatively affect one or more electrical circuits or other vulnerable components of the climate control system.

Accordingly, in certain arrangements, a climate control system for a bed or other seating assembly is configured to make the necessary operational changes so as to reduce the likelihood of condensate formation. For example, the amount of cooling provided by the thermal modules (e.g., the thermoelectric devices or other cooling devices) to the air delivered through the bed assembly can be reduced. Alternatively, the control system can be configured to cycle between heating and cooling modes in an effort to evaporate any condensate that may have formed. In some arrangements, the temperature, relative humidity and other ambient conditions can be advantageously shown on a screen or display to alert the user of a potentially undesirable situation.

According to other embodiments, an environmentally-conditioned bed or other seating assembly is configured to collect and remove condensation that is formed therein. For example, such condensation can be evaporated or other channeled away from the bed or other seating assembly, as desired or required. Additional information regarding the collection and/or removal of condensate from seating assemblies is provided in U.S. patent application Ser. No. 12/364,285, filed on Feb. 2, 2009 and titled CONDENSATION AND HUMIDITY SENSORS FOR THERMOELECTRIC DEVICES, the entirety of which is hereby incorporated by reference herein.

In addition, the use of relative humidity sensors can permit an environmentally-conditioned bed or other seating assembly to operate within a desired comfort zone. One embodiment of such a comfort zone (generally represented by cross-hatched area 2610) is schematically illustrated in the graph 2600 of FIG. 32B. As shown, a desired comfort zone 2610 can be based, at least in part, on the temperature and relative humidity of a particular environment (e.g., ambient air, thermally conditioned air, air which has had its humidity level modified and/or other fluid being delivered through a climate controlled bed or other seat assembly, etc.). Thus, if the relative humidity is too low or too high for a particular temperature, or vice versa, the comfort level to an occupant situated within such an environment can be diminished or generally outside a target area.

Figure 32B:
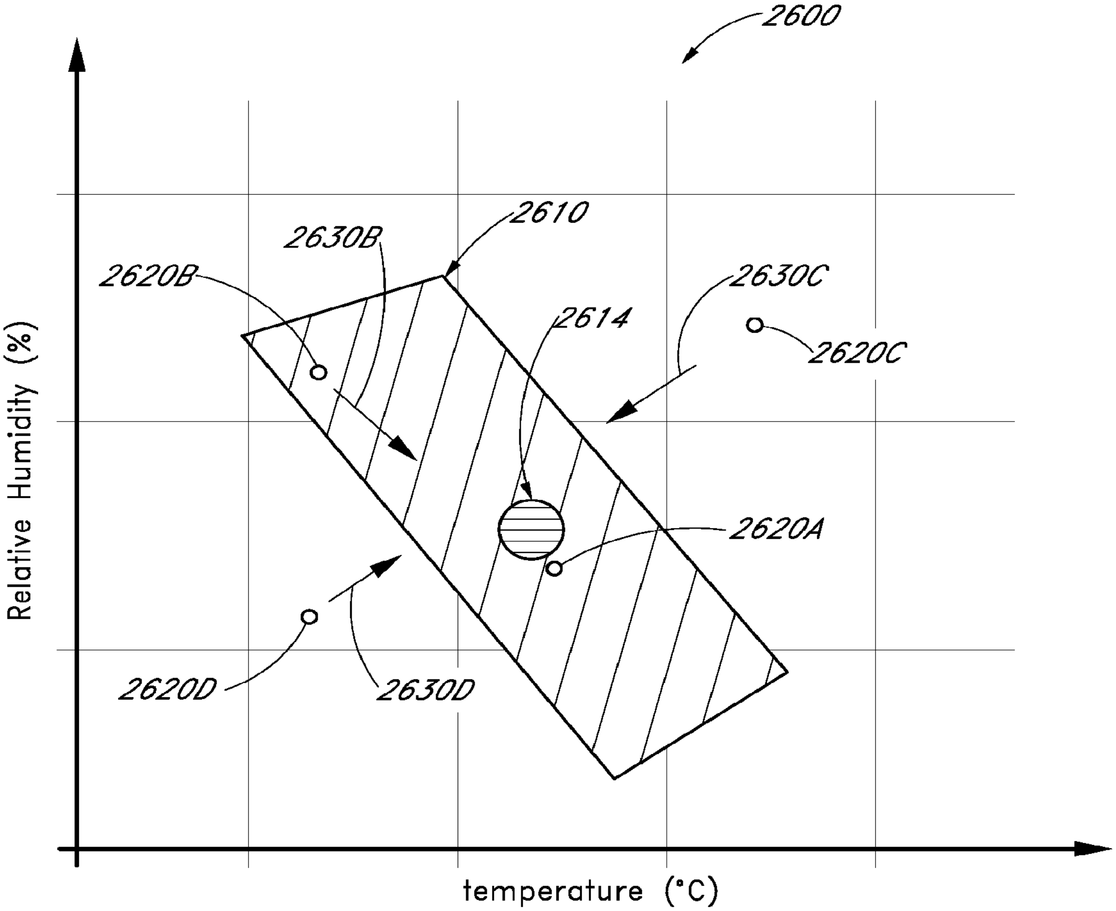
FIG. 32B illustrates a chart showing one embodiment of a comfort zone in relation to temperature and relative humidity.

For example, with reference to a condition generally represented as point 2620C on the graph 2600 of FIG. 32B, the relative humidity is too high for the specific temperature. Alternatively, it can be said that the temperature of point 2620C is too high for the specific relative humidity. Regardless, in some embodiments, in order to improve the comfort level of an occupant who is present in that environment, a climate control system can be configured to change the surrounding conditions in an effort to achieve the target comfort zone 2610 (e.g., in a direction generally represented by arrow 2620C). Likewise, a climate control system for a bed or other seating assembly situated in the environmental condition represented by point 2620D can be configured to operate so as to change the surrounding conditions in an effort to achieve the target comfort zone 2610 (e.g., in a direction generally represented by arrow 2620D). In FIG. 32B, environmental conditions generally represented by points 2620A and 2620B are already within a target comfort zone 2610. Thus, in some embodiments, a climate control system can be configured to maintain such surrounding environmental conditions, at least while an occupant is positioned on the corresponding bed or other seating assembly.

In some embodiments, a climate control system for a bed is configured to include additional comfort zones or target operating conditions. For example, as illustrated schematically in FIG. 32B, a second comfort zone 2614 can be included as a smaller area within a main comfort zone 2610. The second comfort zone 2614 can represent a combination of environmental conditions (e.g., temperature, relative humidity, etc.) that are even more preferable that other portions of the main comfort zone 2610. Thus, in FIG. 32B, although within the main comfort zone 2610, the environmental condition represented by point 2620B falls outside the second, more preferable, comfort zone 2614. Thus, a climate control system for a bed or other seating assembly situated in the environmental condition represented by point 2620B can be configured to operate so as to change the surrounding conditions toward the second comfort zone 2614 (e.g., in a direction generally represented by arrow 2620B).

In other embodiments, a climate control system can include one, two or more target comfort zones, as desired or required. For example, a climate control system can include separate target zones for summer and winter operation. In such arrangements, therefore, the climate control system can be configured to detect the time of year and/or the desired comfort zone under which a climate controlled bed or other seat assembly is to be operated.

The incorporation of such automated control schemes within a climate control system can generally offer a more sophisticated method of operating a climate-conditioned bed or other seat assembly. Further, such schemes can also help to simplify the operation of a climate controlled bed and/or to lower costs (e.g., manufacturing costs, operating costs, etc.). This can be particularly important where it is required or highly desirable to maintain a threshold comfort level, such as, for example, for patients in hospital beds, other types of medical beds and/or the like. Further, such control schemes can be especially useful for beds and other seating assemblies configured to receive occupants that have limited mobility and/or for beds or other seating assemblies where occupants are typically seated for extended time periods (e.g., beds, hospital beds, convalescent beds, other medical beds, etc.).

According to some embodiments, data or other information obtained by one or more sensors are used to selectively control a climate control system in order to achieve an environmental condition which is located within a desired comfort zone 2610, 2614 (FIG. 32B). For instance, a climate control system can include one or more temperature sensors and/or relative humidity sensors. As discussed in greater detail herein, such sensors can be situated along various portions of a bed or other seating assembly (e.g., thermoelectric device, thermal module, fluid distribution system, inlet or outlet of a fluid transfer device, fluid inlet, surface of an assembly against which an seated occupant is positioned, etc.) and/or any other location within the same ambient environment as the bed or other seating assembly (e.g., a bedroom, a hospital room, etc.). In other embodiments, one or more additional types of sensors are also provided, such as, for example, an occupant detection sensor (e.g. configured to automatically detect when an occupant is positioned on a bed or other seating assembly).

Regardless of the quantity, type, location and/or other details regarding the various sensors included within a particular assembly, the various components of the climate control system can be configured to operate (in one embodiment, preferably automatically) in accordance with a desired control algorithm. According to some embodiments, the control algorithm includes a level of complexity so that it automatically varies the amount of heating and/or cooling provided at the bed assembly based, at least in part, on the existing environmental conditions (e.g., temperature, relative humidity, etc.) and the target comfort zone.

Accordingly, m some embodiments, a control system for an environmentally-conditioned bed or other seating assembly is configured to receive, as inputs into its control algorithm, data and other information regarding the temperature and relative humidity from one or more locations. For example, a climate controlled bed can include fluid distribution systems 2518' (FIG. 32A) located along the top of the support member (e.g., mattress) or any other portion. Each fluid distribution system 18' can be in fluid communication with a thermal module 2520A-2520D (e.g., a fluid transfer device, a thermoelectric device and/or the like).

Under some operational scenarios, such as, for example, when two or more thermal modules 2520A-2520D are working at the same time, the noise level generated by a climate-conditioned bed may create a nuisance or otherwise become bothersome. Accordingly, in some embodiments, the control module or other portion of the climate control system is programmed to ensure that the thermal modules 2520A-2520D are activated, deactivated, modulated and/or otherwise operated in a manner that ensures that the overall noise level originating from the bed or other seating assembly remains below a desired or required threshold level. For example, with reference to the bed assembly depicted in FIG. 31, the thermal modules 2520A-2520D associated with each climate zone 2511A-2511D can be cycled (e.g., turned on or off) to remain below such a threshold noise level. In some embodiments, the threshold or maximum noise level is determined by safety and health standards, other regulatory requirements, industry standards and/or the like. In other arrangements, an occupant is permitted to set the threshold or maximum noise level, at least to the extent provided by standards and other regulations, according to his or her own preferences. Such a setting can be provided by the user to the climate control system (e.g., control module) using a user input device.

Relatedly, the climate control system of a bed or other seating assembly can also be configured to cycle (e.g., turn on or off, modulate, etc.) the various thermal modules 2520A-2520D in according to a particular algorithm or protocol to achieve a desired level of power conservation. Regardless of whether the thermal module cycling is performed for noise reduction, power conservation and/or any other purpose, the individual components of a single thermal module 2520A-2520D, such as, for example, a blower, fan or other fluid transfer device, a thermoelectric device and/or the like, can be controlled independently of each other. Additional details regarding such operational schemes can be found in U.S. Publication No. 2009/0064411, titled OPERATIONAL CONTROL SCHEMES FOR VENTILATED SEAT OR BED ASSEMBLIES, the entirety of which is hereby incorporated by reference herein.

According to some embodiments, the power source 2554 (e.g., AC power supply) of the environmentally-conditioned bed or other seat assembly is sized for enhanced, improved or optimal cooling performance. As a result, such a design feature can help to further lower power consumption and allow the climate control system to operate more efficiently, as the amount of wasted electrical energy is reduced or minimized.

As discussed herein, any of the embodiments of a climate conditioned bed or other seating assembly disclosed herein can comprise a "thermal alarm." For example, a climate control system can be configured to make a relatively rapid change in temperature and/or airflow to help awaken one or more of the bed's occupants. Depending on people's personal tendencies and sleep habits, such a thermal alarm can succeed in awakening a bed occupant as a result of decreasing comfort, raising awareness and/or in any other manner. In some arrangements, the thermal alarm includes raising the temperature along the top surface of the bed assembly. Such a feature can allow an occupant to wake up for naturally or gradually. Alternatively, depending on a user's preferences, the thermal alarm can include lowering the temperature to gradually or rapidly decrease an occupant's comfort level. A climate-conditioned bed assembly can also include one or more other types of alarms (e.g., a conventional audible alarm, an alarm equipped with a radio, digital media player or the like, etc.). In some arrangements, such alarm features and/or devices can be operatively connected to the control module of the climate control system to allow a user to regulate their function through an input device 2562, 2564 or any other controller.

Figure 33:
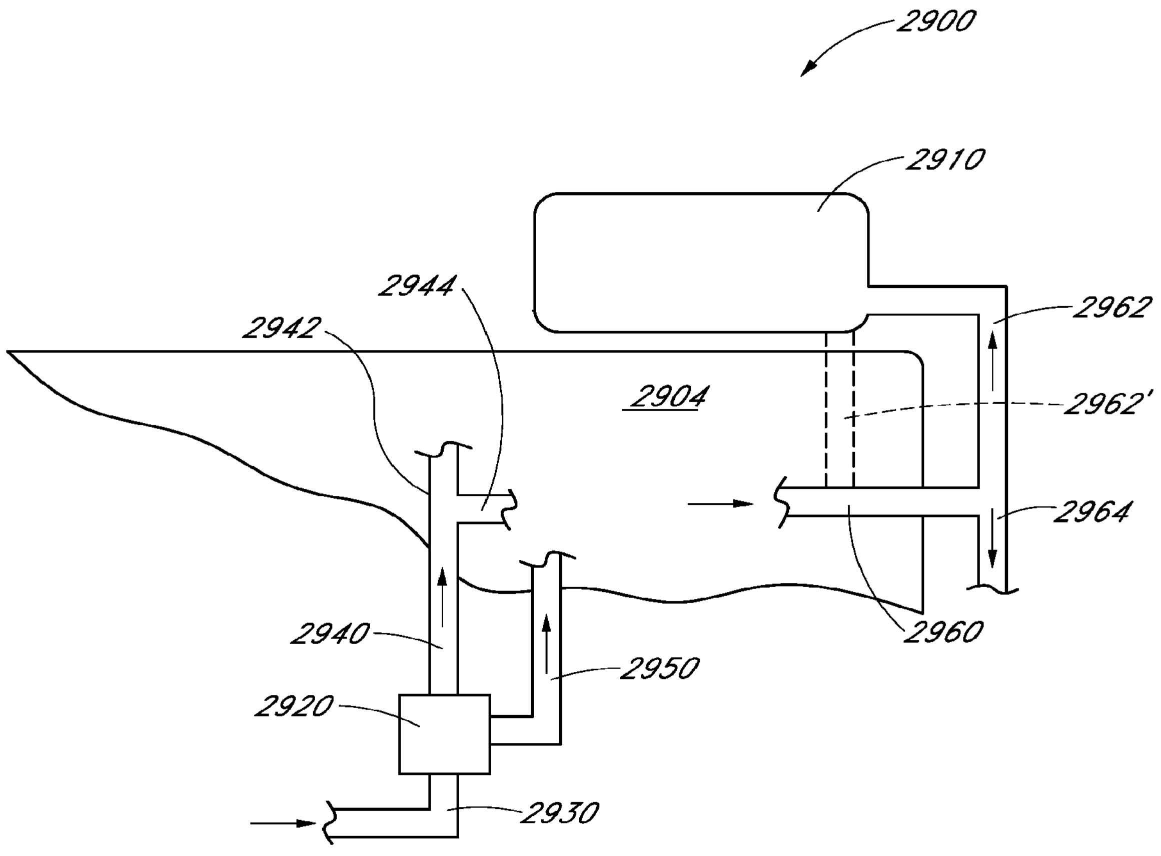
FIG. 33 schematically illustrates a cooled pillow for a climate controlled bed assembly according to one embodiment.

According to certain embodiments, an environmentally-controlled bed assembly can be configured to advantageously provide thermally-conditioned air or other fluid along one or more regions of an occupant. For example, as schematically illustrated in FIG. 33, a bed assembly 2900 can include a pillow 2910 or other member that is configured to be placed in proximity to an occupant's head when the occupant is properly positioned thereon. Under certain circumstances, it may be desirable to provide cooled air toward an occupant's head and neck region (or any other portion of the bed), regardless of whether the bed is being operated under a heating or cooling mode.

As discussed with reference to other embodiments disclosed herein, the bed assembly 2900 can include one or more fluid modules 2920 that are adapted to selectively transfer fluids to target portions or areas of the bed and/or to selectively thermally-condition (e.g., heat, cool, etc.) such fluids before they are transferred. In the schematic of FIG. 33, the fluid module 2930 comprises an inlet 2930 through which ambient air or other fluids enter into a blower, other fluid transfer device and/or any other component of the module 2920. In certain arrangements, fluid flow is generally separated at, within, near or downstream of the fluid module 2920 into a main fluid stream 2940 and a waste fluid stream 2950. For example, when the bed is operated to provide cooled air to one or more upper surfaces, the main fluid stream 2950 is relatively cold while the waste fluid stream 2960 is relatively hot. The opposite is generally true when the bed is operated to provide heated air to an occupant.

Thus, when the bed assembly is being cooled, at least a portion of the conditioned air being delivered through the main fluid stream 2940 can be directed into an inlet of the pillow 2910 (e.g., through conduit branch 2944 and other downstream conduits 2960, 2962, 2962'). As shown in FIG. 33, the various conduits that are configured to deliver thermally-conditioned air to the pillow 2910 can be routed internally or externally to the mattress 2904 or other bed portion. Conveniently, when the bed is being heated, at least a portion of the waste fluid stream, which is relatively cold, can be directed to the pillow 2910. For simplicity, the conduits that place the fluid module 2920 in fluid communication with the cooled pillow 2910 can be shared by the downstream lines of the main and waste fluid streams 2940, 2950. A similar configuration can be used to provide heated and/or cooled air to one or more other portions of the bed (e.g., foot or leg region, main torso region, etc.), as desired or required.

Figure 34:
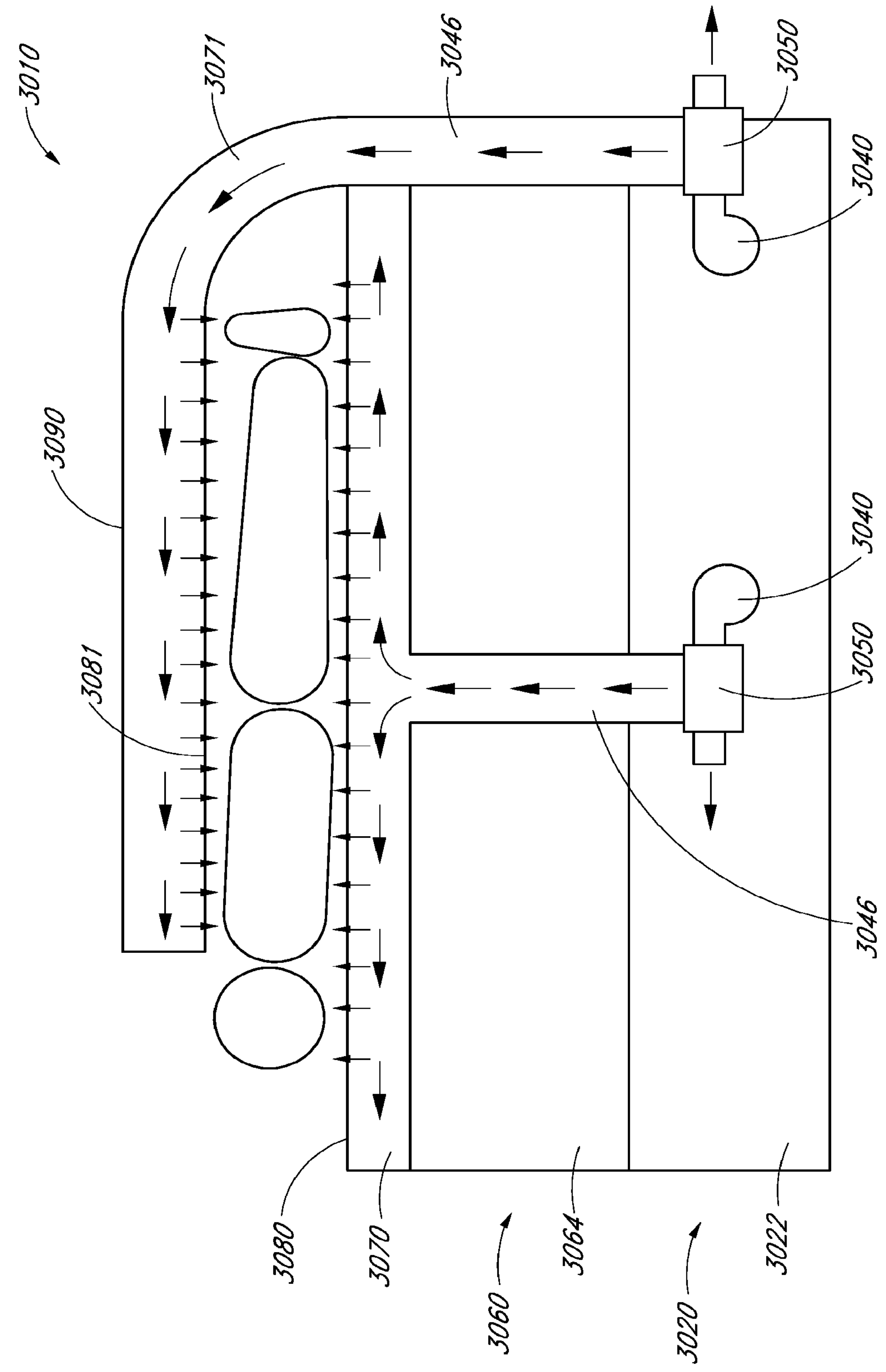
FIG. 34 schematically illustrates a cross-sectional view of a climate controlled bed assembly configured to selectively provide conditioned fluid to multiple sides of an occupant, according to one embodiment.

FIG. 34 illustrates a schematic of one embodiment of a climate-conditioned bed 3010. As shown, the bed 3010 can include an upper portion 3060 and a lower portion 3020. Further, the bed 3010 can have a fluid distribution layer 3070 and a top member 3080. The top member 3080 can be made of an air-permeable material. Moreover, as shown in FIG. 34, the bed 3010 can additionally include a second fluid distribution layer 3071. According to certain embodiment, such a second fluid distribution layer 3071 comprises an underside layer 3081. The second fluid distribution layer 3071 can also have a topside layer 3090. The second fluid distribution layer 3071, underside layer 3081 and topside layer 3090 can be configured to direct a flow of fluid, such as air, to an occupant. Further, the underside layer 3081 can have properties similar to the described top member 3080 of the various embodiments. For example, the underside layer 3081 can comprise one or more air-permeable material. As illustrated in FIG. 34, the top member 3080 can be configured to direct fluid toward an occupant's back when the occupant is in the supine position, whereas the underside layer 3081 can be configured to direct fluid toward the occupant's front.

The topside layer 3090 can be made of an air-impermeable material so that a fluid is not likely to escape through the topside layer 3090. In other embodiments, the topside layer 3090 can generally provide more fluid flow resistance through the layer 3090 than the underside layer 3081. Accordingly, the topside layer 3090 can encourage the flow of fluid through the underside layer 3081 rather than through itself. In some embodiments, the topside layer 3090, the underside layer 3081 and/or the second fluid distribution layer 3071 cooperate to help maintain an occupant at a desired temperature. In one arrangement, the topside layer 3090 can act as an insulator that allows no or substantially no fluid flow to pass therethrough.

According to certain arrangements, in order to further enhance comfort, promote safety and/or offer additional advantages, one or more topper members or layers 3080 can be selectively positioned above the cushion member 3064 and the flow conditioning members 3070. Similarly, one or more or underside members or layers 3081 can be positioned below the flow conditioning members 3071. For example, in some embodiments, a lower topper layer can be configured to distribute air generally in a lateral direction, while an upper topper layer can be configured to distribute air in a vertical direction (e.g., toward an occupant). It will be appreciated, however, that more or fewer topper layers and/or underside layers can be included in a particular bed assembly. In addition, the topper layers and/or underside layers can be configured to distribute or otherwise flow condition air differently than discussed herein. For example, one or more of the layers can be configured to distribute air both vertically and laterally.

With continued reference to FIG. 34, the bed 3010 can include two independent sets of fluid transfer devices 3040 and thermoelectric devices 3050 serving each fluid distribution layer 3070, 3071 through conduits 3046. According to some embodiments, one fluid module (e.g., a single fluid transfer device 3040 and its corresponding thermoelectric device 3050) generally serves the bed 3010. In some embodiments, two or more fluid modules (e.g., fluid transfer devices, thermoelectric devices and/or other components) serve the fluid distribution layer or layers of the bed 3010, as desired or required.

The depicted embodiment of a climate-conditioned bed 3010 can be configured to provide different levels of fluid conditioning to various areas of the bed. This can be accomplished, at least in part, by allowing users to selectively control the thermal conditioning effect (e.g., cooling, heating, ventilation, etc.) for each of the various established zones or regions in the bed. Further, the climate control system can be configured so that users are also able to selectively control the rate of fluid flow being directed to one or more regions of the bed 3010.

Figure 35:
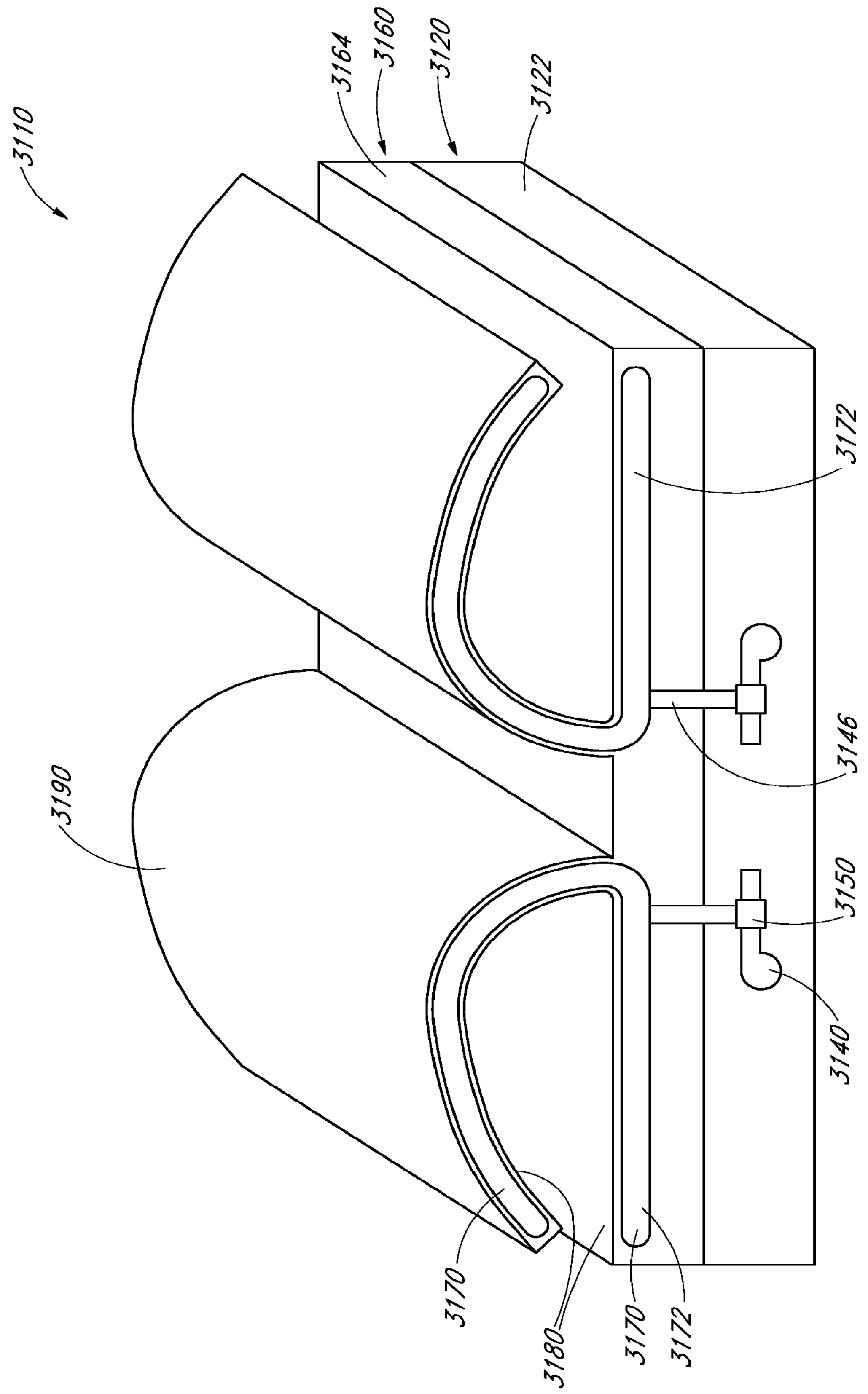
FIG. 35 schematically illustrates a front view of a climate controlled bed assembly having wrap-around distribution layers according to one embodiment.

As illustrated in FIG. 35, in some embodiments, one fluid distribution layer 70 can provide a conditioned fluid to both the front and back of an occupant. FIG. 35 generally illustrates a bed 3110 having fluid distribution layers 3170 that could be characterized as wrap-around fluid distribution layers 3172. The depicted arrangement shows a cross-sectional view of a bed 3110 with two wrap-around distribution layers 3172. Such configurations can advantageously provide enhanced cooling and/or heating control to certain portions of the bed. For example, when two or more users share a bed, each user can customize a temperature-conditioning effect in accordance with his or her own preferences by directing conditioned and/or unconditioned fluid through only one of the wrap-around fluid distribution layers 3172.

By providing cooling to both a front side and a back side of an occupant, a climate-conditioned bed can provide a multi-directional flow of fluid to better provide conditioned fluid to one or more occupants. In climate-conditioned beds comprising only one side that is configured to provide conditioned fluid, a temperature gradient can persist between an occupant's front side and back side, which may result in some level of discomfort. A wrap-around fluid conditioning layer or multiple fluid conditioning layers, as illustrated in FIGS. 34 and 35 can alleviate such concerns.

In any of the embodiments illustrated herein, such as, for example, the climate controlled beds shown in FIGS. 34 and 35, the climate controlled bed can comprise legs or other support members to provide additional clearance between the bottom of the lower portion and the floor on which the bed is positioned. This can also help permit fluid inlets or other openings to be discretely positioned on a bottom surface of the lower portion.

With continued reference to FIGS. 34 and 35, in some embodiments stitching, barrier members (e.g., window border designs), glue beads, laminations and/or the like can be used to improve fluid flow through the flow conditioning members 3070, 3071, 3072 and 3170, 3171, 3172. For example, engineered stitching can be provided along the perimeter and/or any other area to better control the flow of air or other fluid within the flow conditioning members. In some arrangements, the system uses particular stitching patterns, diameters, needle sizes, thread diameters and/or other features to control the flow of conditioned and/or unconditioned fluids therethrough.

Stitching or other flow blocking devices or features can also be used to control unwanted lateral flow of fluids. For example, stitches can be added around the perimeter of the device to prevent or substantially prevent fluid from moving outside one or more desired conditioned areas. The use of the proper stitching compression, patterns and/or other features can help provide a path for the fluid (e.g., air) to flow toward one or more occupants. The size of the stitching and the density of the stitches can be modified or otherwise controlled to provide even fluid distribution to an occupant. Thus, by using only a single sheet of spacer fabric and controlling the flow of fluid using stitching, lamination and/or other systems, a more cost effective upper portion 3060, 3160 or topper assembly can be realized. Accordingly, engineered stitching and/or other similar features can allow for improved fluid flow while enhancing the comfort level for an occupant.

As discussed in relation to other embodiments, herein, in order to accommodate for the vertical translation of a climate-controlled bed assembly, bellows, or other movable members can be used to provide the desired flexibility and/or insulation properties. It may be desirable to account for the movement of certain components of the bed and/or for the relative movement between adjacent bed components in order to protect fluid conduits, fluid transfer devices and/or other items that comprise the climate control system.

One important consideration associated with moving fluids within an air conditioned bed is accommodating fluid intakes and exhausts. Thus, in some embodiments of the devices and systems illustrated and disclosed herein, the fluid delivery system advantageously includes a relatively efficient means of receiving fluids from the surrounding environment and delivering them to the bed or other seating assembly.

For any of the embodiments disclosed herein, or equivalents thereof, climate control systems can be advantageously configured and/or controlled to reduce capital and/or operating (e.g., energy) costs. For example, the climate control system of a bed assembly can include fewer fluid modules (e.g., blowers, other air transfer devices, thermoelectric devices, etc.). Further, in some embodiments, the climate control system can be operated according to one or more control routines which are adapted to reduce energy consumption. In addition, such energy and cost saving measures can be implemented while maintaining or improving the performance of the climate controlled bed assembly.

The energy consumption of the control system can be reduced by advantageously controlling the operation of one or more of the blowers, thermoelectric devices and/or any other fluid modules or components thereof. For example, one or more thermoelectric devices can be turned on or off according to an energy-reducing control scheme. In other embodiments, the electrical current delivered to one or more thermoelectric devices is modulated to achieve a desired level of cooling and/or heating for the air passing therethrough.

In some embodiments, a blower or other air transfer device is configured to continuously operate as other components of the fluid modules (e.g., thermoelectric devices) are turned on/off or modulated. Alternatively, however, one or more of the fluid transfer devices can be configured to turn on or off during the operation of the climate control system. In other embodiments, the volume of air being delivered to the blower or other fluid transfer device can be varied by controlling the speed of the blower, by modulating one or more valves or by some other method.

In some embodiments, a desired operational sequence is configured to automatically begin and/or end based on the time of day, a timer (e.g., elapsed time from a particular event or occurrence) or the like. For example, the climate controlled bed assembly can be configured to provide a greater cooling or heating effect during the early part of a sleep cycle and gradually reduce such thermal effect as time elapses. In other embodiments, a user can selectively customize the bed to operate according to a desired scheme. In still other configurations, a particular operational scheme can be activated and/or deactivated using feedback received from one or more sensors. For example, a temperature sensor, humidity sensor, motion sensor, pressure sensor, another type of occupant-detection sensor or the like can be used to detect the presence of an individual on or near the climate controlled bed assembly. Thus, such assemblies can be configured to function in a desired manner when a user triggers a sensor or other activation device.

Moreover, a climate controlled bed can be configured to function under two or more operational modes. For example, a climate controlled bed can permit one or more of its occupants to select a level of cooling and/or heating (e.g., "Low-Medium-High", "1-2-3-4-5", etc.). Alternatively, beds can be configured with climate control systems that allow users to enter an actual temperature setting. In other embodiments, users can select a desired setting, temperature and/or other operational mode using a knob, lever, switch, keypad or the like (e.g., the control devices illustrated in, inter alia, FIGS. 5, 18A-18E and 31). In still other arrangements, users are permitted to program an operational scheme for a climate controlled bed assembly that satisfies their unique preferences and/or requirements.

As discussed, control of the fluid modules and/or any other components of the climate control system can be based, at least partially, on feedback received from one or more sensors. For example, a climate controlled bed can include one or more thermal sensors, humidity sensors, optical sensors, motion sensors, audible sensors, pressure sensors and/or the like. In some embodiments, such sensors can be positioned on or near a surface of the climate controlled bed to determine whether cooling and/or heating of the assembly is required or desired. For instance, thermal sensors can help determine if the temperature at a surface of the bed assembly is above or below a desired level. Alternatively, one or more thermal sensors and/or humidity sensors can be positioned in or near a fluid module, a fluid conduit (e.g., fluid passageway) and/or a layer of the upper portion of the bed (e.g., fluid distribution member, comfort layer, etc.) to detect the temperature and/or humidity of the discharged fluid. Likewise, pressure sensors can be configured to detect when a user has been in contact with a surface of the bed for a prolonged time period. Depending on their type, sensors can contact a portion of the bed assembly. As discussed, in some embodiments, sensors are located within and/or on the surface of the bed assembly. However, in other arrangements, the sensors are configured so they do not contact any portion of the bed at all. Such operational schemes can help conserve power, enhance comfort and provide other advantages. For additional details regarding the use of sensors, timers, control schemes and the like for climate controlled assemblies, please refer to U.S. patent application Ser. No. 12/208,254, filed Sep. 10, 2008 and published as U.S. Publication No. 2009/0064411, the entirety of which is hereby incorporated by reference herein.

To assist in the description of the disclosed embodiments, words such as upward, upper, downward, lower, vertical, horizontal, upstream, downstream, top, bottom, soft, rigid, simple, complex and others have and used above to discuss various embodiments and to describe the accompanying figures. It will be appreciated, however, that the illustrated embodiments, or equivalents thereof, can be located and oriented in a variety of desired positions, and thus, should not be limited by the use of such relative terms.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while the number of variations of the inventions have been shown and described in detail, other modifications, which are within the scope of these inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combined with, or substituted for, one another in order to perform varying modes of the disclosed inventions. Thus, it is intended that the scope of the present inventions herein disclosed should not be limited by the particular disclosed embodiments described above, but should be determined only by a fair reading of the claims.

What is claimed is:

1. A climate controlled bed comprising:
- an upper portion comprising:
  - a core having a top core surface and a bottom core surface;
  - a passageway routed around the core and configured to deliver fluid from a location lower than the bottom core surface to a location higher than the top core surface and/or from the location higher than the top core surface to the location lower than the bottom core surface;
  - at least one fluid distribution member in fluid communication with the passageway, the fluid distribution member comprising at least one spacer; and
  - at least one comfort layer positioned adjacent to the fluid distribution member;
- a lower portion configured to support the upper portion; and
- at least one fluid module configured to selectively transfer fluid to or from the fluid distribution member of the upper portion through the passageway.

2. The climate controlled bed of claim 1, wherein the upper portion further comprises a barrier layer positioned underneath the at least one spacer, the barrier layer being generally impermeable to fluids.

3. The climate controlled bed of claim 1, wherein the fluid distribution member is divided into at least two hydraulically isolated zones, each of said zones comprising at least part of the at least one spacer.

4. The climate controlled bed of claim 1, further comprising means to control operation of the fluid module.

5. The climate controlled bed of claim 1, further comprising means to allow a user to selectively adjust at least one operating parameter of the bed.

6. The climate controlled bed of claim 1, wherein the upper portion comprises a foam mattress, wherein said foam mattress comprises a plurality of foam layers including at least five different layers including at least an open-cell foam layer, a memory foam layer and another synthetic material.

7. The climate controlled bed of claim 1, wherein the fluid distribution member comprises first and second fluid distribution members and wherein the passageway is one of multiple passageways configured to be positioned outside of the core from the fluid module to the first and second fluid distribution members.

8. The climate controlled bed of claim 7, wherein the first and second fluid distribution members are secured to the comfort layer and the core at least in part using adhesive, stitching, and fasteners.

9. The climate controlled bed of claim 7, wherein the first and second fluid distribution members are wrapped in an enclosure.

10. The climate controlled bed of claim 7, wherein the first and second fluid distribution members are wrapped in a layer of fabric.

11. The climate controlled bed of claim 7, wherein the multiple passageways are configured to be connected to the first and second fluid distribution members at a head edge of the core.

12. The climate controlled bed of claim 7, wherein the upper portion comprises one or more first covering layers or materials and the lower portion comprises one or more second covering layers or materials.

13. The climate controlled bed of claim 7, wherein the upper portion comprises more than one first covering layer or material and the lower portion comprises more than one second covering layer or material.

14. The climate controlled bed of claim 7, wherein the first and second fluid distribution members are configured to be wrapped by multiple layers including a layer of fabric and a layer of other covering material.

15. The climate controlled bed of claim 1, wherein there are no internal openings through the core.

16. The climate controlled bed of claim 1, wherein the fluid comprises a liquid.

17. The climate controlled bed of claim 1, wherein the fluid comprises a gas.

18. The climate controlled bed of claim 1, wherein the comfort layer and the fluid distribution member are part of a top member configured to be positioned on top of the core, wherein the core comprises a mattress, and wherein the lower portion comprises a foundation having at least a panel and fabric covering.

19. The climate controlled bed of claim 1, wherein the fluid module is configured to be positioned in the lower portion.

20. The climate controlled bed of claim 1, wherein the fluid module is part of the lower portion and configured to be positioned at least partially below the upper portion.

21. The climate controlled bed of claim 1, wherein the at least one spacer is positioned in at least one recess in the fluid distribution member.

22. The climate controlled bed of claim 1, wherein the fluid distribution member comprises a plurality of conduits through which fluids may be directed, wherein the fluids comprise a fluid other than air.

23. The climate controlled bed of claim 22, wherein the plurality of conduits in the fluid distribution member are formed using molding technologies.

24. The climate controlled bed of claim 1, wherein the core comprises a mattress comprising foam and a cover of the mattress.

25. A climate controlled bed comprising:
- an upper portion comprising:
  - a core having a top core surface and a bottom core surface;
  - a passageway routed around the core and configured to deliver fluid from one of the top core surface and the bottom core surface to the other of the top core surface and the bottom core surface;
  - a fluid distribution member in fluid communication with the passageway, the fluid distribution member comprising at least one means to distribute fluid; and
  - a comfort layer positioned adjacent to the fluid distribution member;
- a lower portion configured to support the upper portion; and
- means configured to selectively transfer fluid to or from the fluid distribution member through the passageway.

26. The climate controlled bed of claim 25, wherein the fluid distribution member comprises first and second fluid distribution members and wherein the passageway is one of multiple passageways configured to be positioned outside of the core and to connect to one or both of the first and second fluid distribution members at a head edge of the core, wherein the upper portion comprises one or more first covering layers or materials and the lower portion comprises one or more second covering layers.

27. The climate controlled bed of claim 26, wherein the first and second fluid distribution members are secured to the comfort layer and the core at least in part using adhesive, stitching, and fasteners.

28. The climate controlled bed of claim 26, wherein the upper portion comprises more than one first covering layer or material and the lower portion comprises more than one second covering layer or material.

29. The climate controlled bed of claim 26, wherein the first and second fluid distribution members are configured to be wrapped by one or more layers of fabric or other covering material.

30. The climate controlled bed of claim 25, wherein the comfort layer and the fluid distribution member are part of a top member configured to be positioned on top of the core, wherein the core comprises a mattress, and wherein the lower portion comprises a foundation having at least a panel.

31. The climate controlled bed of claim 25, wherein the means to distribute fluid comprises a plurality of conduits through which fluids may be directed.

32. The climate controlled bed of claim 25, and further comprising:

a temperature sensor;

a moisture sensor;

a timer; and a controller configured to control operation of the climate controlled bed based upon the temperature sensor, the moisture sensor, and the timer.

33. The climate controlled bed of claim 32, wherein the controller is configured to detect an occupant presence based on occupant sensor data, wherein the controller is configured to output an alarm to alert an occupant of the climate controlled bed, wherein the controller is configured to selectively program the climate controlled bed to regulate temperature during an anticipated sleep period by setting a different target temperature at different time periods.

34. The climate controlled bed of claim 32, wherein at least some sensors are positioned along the upper portion at an interior of the upper portion.

35. The climate controlled bed of claim 32, wherein the controller is configured to control different zones to different temperatures and to selectively program the climate controlled bed to regulate temperature during an anticipated sleep period by setting a different target temperature at different time periods.

36. The climate controlled bed of claim 32, wherein the controller is configured to pre-condition the climate controlled bed to allow a user to program the climate controlled bed to achieve a particular temperature prior to use of the climate controlled bed as a function of the timer.

* * * * *